United States Patent
Li et al.

(10) Patent No.: US 11,856,632 B2
(45) Date of Patent: Dec. 26, 2023

(54) METHOD AND APPARATUS FOR IMPLEMENTING A FORWARDING PATH ON A USER PLANE FUNCTION NETWORK ELEMENT

(71) Applicant: HUAWEI TECHNOLOGIES CO., LTD., Guangdong (CN)

(72) Inventors: Hancheng Li, Shanghai (CN); Wenfu Wu, Shanghai (CN); Han Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 242 days.

(21) Appl. No.: 17/110,815

(22) Filed: Dec. 3, 2020

(65) Prior Publication Data

US 2021/0092792 A1 Mar. 25, 2021

Related U.S. Application Data

(63) Continuation of application No. PCT/CN2019/096594, filed on Jul. 18, 2019.

(30) Foreign Application Priority Data

Jul. 19, 2018 (CN) .......................... 201810799264.6

(51) Int. Cl.
*H04W 76/25* (2018.01)
*H04W 28/20* (2009.01)
(Continued)

(52) U.S. Cl.
CPC ........... *H04W 76/25* (2018.02); *H04W 28/20* (2013.01); *H04W 76/11* (2018.02); *H04W 80/02* (2013.01)

(58) Field of Classification Search
CPC ..... H04W 76/20; H04W 76/25; H04W 28/16; H04W 28/18; H04W 28/20; H04W 80/02
See application file for complete search history.

(56) References Cited

U.S. PATENT DOCUMENTS 6,910,074 B1 * 6/2005 Amin .................. H04L 12/2856
709/227
7,620,389 B2 * 11/2009 Kallio ................... H04W 12/02
455/433

(Continued)

FOREIGN PATENT DOCUMENTS

| CN | 105519230 A | 4/2016 |
|---|---|---|
| WO | 2018034337 A1 | 2/2018 |
| WO | 2018070436 A1 | 4/2018 |

OTHER PUBLICATIONS

3GPP TR 23.725 V0.2.0 (Jun. 2018), 3rd Generation Partnership Project; Technical Specification Group Services and System Aspects;Study on enhancement of URLLC supporting in 5GC(Release 16), total 28 pages.

(Continued)

*Primary Examiner* — Jenee Holland
(74) *Attorney, Agent, or Firm* — WOMBLE BOND DICKINSON (US) LLP

(57) ABSTRACT

In an embodiment, a session management function (SMF) network element obtains first information identifying a data stream, where the first information is used to instruct a transmit end to send a user stream using the data stream and to instruct a receive end to receive the user stream using the data stream; and the receive end is an access network element, and the transmit end is a user plane function network element, or vice versa; the SMF network element sends the first information to the user plane function network element and/or the access network element; the SMF network element obtains second information, where the second (Continued)

information is used to indicate a forwarding rule of transmitting the user stream by the user plane function network element on a data network side; and the SMF network element sends the second information to the user plane function network element.

19 Claims, 37 Drawing Sheets

(51) Int. Cl.
*H04W 76/11* (2018.01)
*H04W 80/02* (2009.01)
*H04L 67/562* (2022.01)
*H04L 67/563* (2022.01)
*H04L 67/60* (2022.01)
*H04W 76/12* (2018.01)
*H04L 45/00* (2022.01)
*H04L 67/14* (2022.01)

(56) References Cited

U.S. PATENT DOCUMENTS

| | | | | |
|---|---|---|---|---|
| 2007/0118629 A1* | 5/2007 | Kerdraon | ............. | H04Q 3/0041 709/223 |
| 2009/0276386 A1* | 11/2009 | Greening | ................ | H04L 47/70 709/224 |
| 2015/0110095 A1* | 4/2015 | Tan | ....................... | H04W 12/00 370/338 |
| 2017/0289898 A1* | 10/2017 | Youn | ..................... | H04W 64/00 |
| 2017/0317894 A1* | 11/2017 | Dao | ................... | H04L 41/5009 |
| 2017/0332421 A1* | 11/2017 | Sternberg | ............. | H04W 76/11 |
| 2017/0339609 A1* | 11/2017 | Youn | .................... | H04W 76/11 |
| 2017/0359749 A1* | 12/2017 | Dao | .................... | H04L 47/2416 |
| 2017/0359768 A1* | 12/2017 | Byun | ................. | H04W 72/0406 |
| 2018/0063018 A1* | 3/2018 | Bosch | .................. | H04L 47/822 |
| 2018/0097657 A1* | 4/2018 | Dao | ........................ | H04L 47/12 |
| 2018/0098251 A1* | 4/2018 | Li | ..................... | H04W 36/0016 |
| 2018/0123961 A1* | 5/2018 | Farmanbar | .......... | H04L 41/5054 |
| 2018/0139107 A1* | 5/2018 | Senarath | ............. | H04L 41/5003 |
| 2018/0192289 A1 | 7/2018 | Dao | | |
| 2018/0192471 A1* | 7/2018 | Li | ........................... | H04W 4/60 |
| 2018/0199115 A1* | 7/2018 | Prasad | ............. | H04N 21/64707 |
| 2018/0199243 A1* | 7/2018 | Bharatia | ........... | H04W 36/0066 |
| 2018/0199398 A1* | 7/2018 | Dao | ....................... | H04W 76/27 |
| 2020/0107225 A1* | 4/2020 | Zhang | ................... | H04W 72/52 |

OTHER PUBLICATIONS

S. Homma et al. ,"Co-existence of 3GPP 5GS and Identifier Locator Separation Architecture draft-homma-dmm-5gs-id-loc-coexistence-01", Internet-Draft, May 15, 2018, total 37 pages.

K. Bogineni et al., "Optimized Mobile User Plane Solutions for 5G draft-bogineni-dmm-optimized-mobile-user-plane-00.txt", Internet-Draft, Mar. 5, 2018, total 39 pages.

SA WG2 Meeting #128, S2-186431:"Support for VLAN ID learning to enable IEEE 802.1CB (Frame Replication and Elimination for Reliability) combined with IEEE 802.1Q", Qualcomm Incorporated, Jul. 2-6, 2018, Vilnius, Lithuania, total 9 pages.

SA WG2 Meeting #128, S2-187317:"Support for VLAN ID learning to enable IEEE 802.1CB (Frame Replication and Elimination for Reliability) combined with IEEE 802.1Q", Qualcomm Incorporated, Jul. 2-6, 2018, Vilnius, Lithuania, total 9 pages.

Ericsson, "QoS rule structure improvement", 3GPP TSG SA WG2 Meeting #127bls S2-186006,May 28-Jun. 1, Newport Beach, California, USA, Total 29 Pages.

Arne Neumann et al.,"Towards Integration of Industrial Ethernet with 5G Mobile Networks", 2018 IEEE, Total 4 Pages.

* cited by examiner

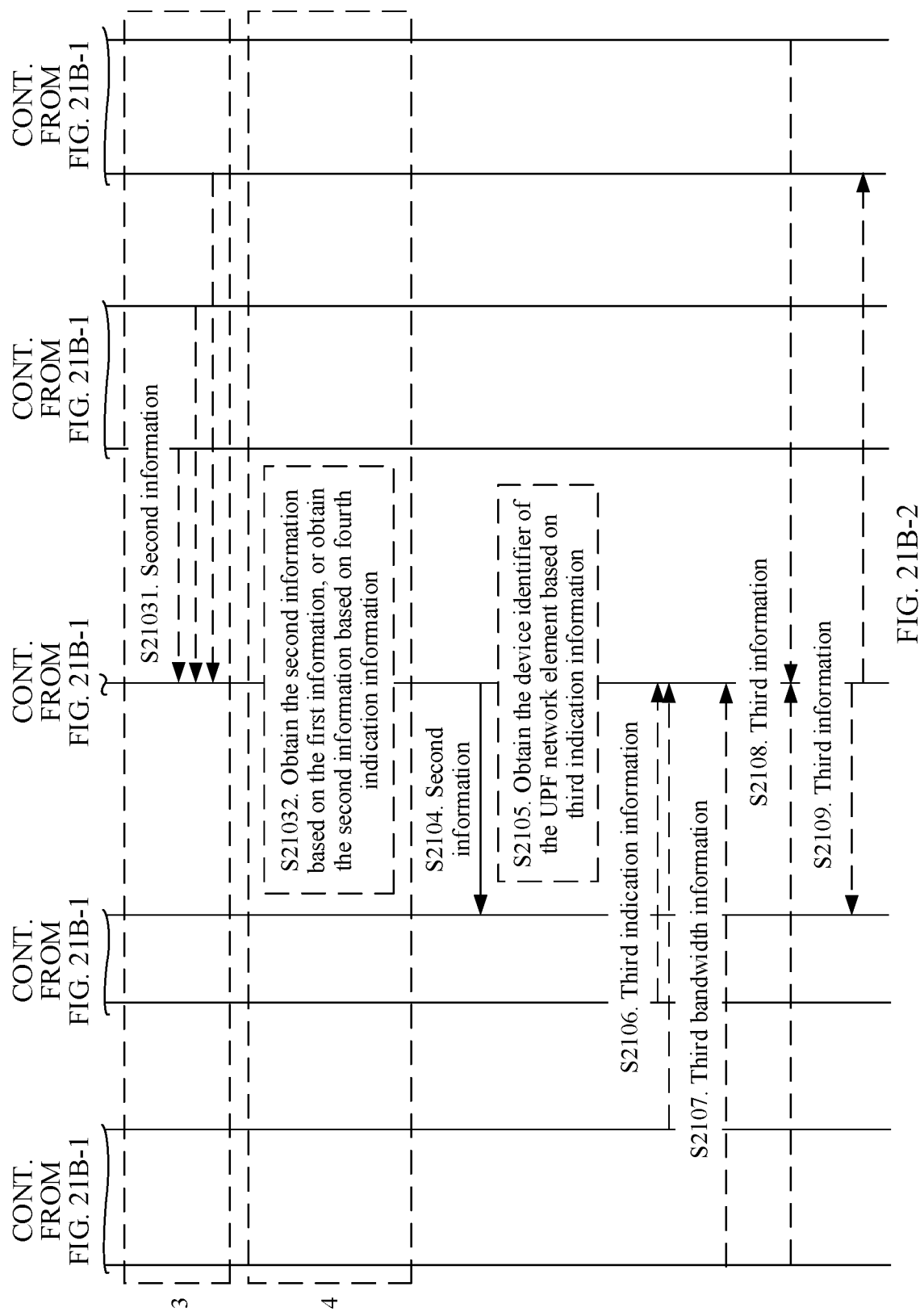

METHOD AND APPARATUS FOR IMPLEMENTING A FORWARDING PATH ON A USER PLANE FUNCTION NETWORK ELEMENT

CROSS-REFERENCE TO RELATED APPLICATIONS

This application is a continuation of International Application No. PCT/CN2019/096594, filed on Jul. 18, 2019, which claims priority to Chinese Patent Application No. 201810799264.6, filed on Jul. 19, 2018. The disclosures of the aforementioned applications are hereby incorporated by reference in their entireties.

TECHNICAL FIELD

This application relates to the communications field, and in particular, to a communication method and apparatus.

BACKGROUND

In a forwarding process in a conventional Ethernet network, when a large quantity of data packets arrive at a forwarding port in an instant, a problem such as a large forwarding latency or a packet loss is caused. Therefore, the conventional Ethernet network cannot provide a service with high reliability and a guaranteed transmission latency, and cannot meet requirements of fields such as vehicle control and the Industrial Internet. The institute of electrical and electronics engineers (IEEE) defines a related latency sensitive network (TSN) network standard based on a requirement for reliable-latency transmission. The identifier is based on layer 2 switching to provide a reliable-latency transmission service, to ensure reliability of data transmission of a latency sensitive service and a predictable end-to-end transmission latency.

A TSN network may be established between an access (AN) network element and a user plane function (UPF) network element, and a user packet is transmitted in the TSN network by using a data stream. The data stream may be based on the general packet radio service (GPRS) tunneling protocol-user plane (GTP-U) protocol shown in FIG. 1 or based on a layer 2 protocol. The user packet is also transmitted between the UPF network element and a data network (DN) (or another UPF network element) by using a data stream. The UPF network element is responsible for forwarding the user packet between the AN network element and the DN.

Because the data stream between the AN network element and the UPF network element and the data stream between the UPF network element and the DN are independent of each other, for a data stream from one side, the UPF network element cannot match a corresponding data stream on the other side to transmit the user packet. Due to the foregoing reason, the UPF network element cannot establish a forwarding path between the AN network element and the DN to forward the user packet.

SUMMARY

Embodiments of this application provide a communication method and apparatus, to implement a forwarding path between an AN network element and a DN on a UPF network element.

To achieve the foregoing objective, the following technical solutions are used in the embodiments of this application.

According to a first aspect, a session management function (SMF) network element obtains first information identifying a data stream, where the first information is used to instruct a transmit end to send a user stream by using the data stream and is further used to instruct a receive end to receive the user stream by using the data stream; and the receive end is an access network element, and the transmit end is a user plane function network element, or the receive end is the user plane function network element, and the transmit end is the access network element; the session management function network element sends the first information to the user plane function network element and/or the access network element; the session management function network element obtains second information, where the second information is used to indicate a forwarding rule of transmitting the user stream by the user plane function network element on a data network side; and the session management function network element sends the second information to the user plane function network element.

According to the communication method provided in an embodiment of this application, the SMF network element obtains the first information and the second information. The first information is used to instruct the transmit end to send the user stream by using the data stream and is further used to instruct the receive end to receive the user stream by using the data stream; and the receive end is the AN network element, and the transmit end is the UPF network element, or the receive end is the UPF network element, and the transmit end is the AN network element. The second information is used to indicate the forwarding rule of transmitting the user stream by the UPF network element on the DN side. In other words, the first information indicates a data stream transmitted between the AN network element and the UPF network element. The SMF network element sends the first information and the second information to the UPF network element, so that the UPF network element can determine, based on the first information, how to transmit the data stream between the AN network element and the UPF network element, and determine, based on the second information, how to transmit the data stream between the UPF network element and the DN. In this way, a forwarding path between the AN network element and the DN is implemented on the UPF network element.

In an embodiment, the session management function network element sends a device identifier of the access network element, a device identifier of the user plane function network element, and first indication information to a control device, where the first indication information is used to indicate that the access network element is the transmit end or the receive end; and the session management function network element receives, from the control device, the first information corresponding to the following: the device identifier of the access network element, the device identifier of the user plane function network element, and the first indication information. This implementation provides a manner in which the session management function network element obtains the first information identifying the data stream.

In an embodiment, the session management function network element sends first bandwidth information to the control device, where the first bandwidth information is bandwidth information of a user stream transmitted between the access network element and the user plane function network element; and that the session management function network element receives, from the control device, the first information corresponding to the following: the device identifier of the access network element, the device identifier of the user plane function network element, and the first indication information includes: the session management function network element receives, from the control device, the first information corresponding to the following: the device identifier of the access network element, the device identifier of the user plane function network element, the first indication information, and the first bandwidth information. This implementation provides another manner in which the session management function network element obtains the first information identifying the data stream.

In an embodiment, the session management function network element receives second bandwidth information from a terminal device, where the second bandwidth information is bandwidth information of a user stream of the terminal device; and the session management function network element obtains the first bandwidth information based on the second bandwidth information. This implementation provides a manner in which the session management function network element obtains the first bandwidth information.

In an embodiment, the session management function network element obtains the first indication information based on second indication information, where the second indication information is used to instruct the terminal device to send or receive the user stream. This implementation provides a manner in which the session management function network element obtains the first indication information.

In an embodiment, the session management function network element receives the second indication information from the terminal device. This implementation provides a manner in which the session management function network element obtains the second indication information.

In a possible implementation, that a session management function network element obtains first information identifying a data stream includes: the session management function network element receives the first information from a control device. This implementation provides still another manner in which the session management function network element obtains the first information identifying the data stream.

In an embodiment, the session management function network element obtains the device identifier of the user plane function network element based on third indication information, where the third indication information includes at least one of the following information: the device identifier of the access network element, an identifier of a reliable-latency transmission network between the access network element and the user plane function network element, an identifier of a reliable-latency transmission network of the user stream on the data network side, and service information of the user stream in a network on the data network side. This implementation provides a manner in which the session management function network element obtains the device identifier of the user plane function network element.

In an embodiment, the session management function network element sends the third indication information to a first network element; and the session management function network element receives, from the first network element, the device identifier that is of the user plane function network element and that is corresponding to the third indication information, where the first network element is a network function repository function network element or the control device. This implementation provides another manner in which the session management function network element obtains the device identifier of the user plane function network element.

In an embodiment, the session management function network element receives the third indication information from the access network element or an access and mobility management network element. This implementation provides a manner in which the session management function network element obtains the third indication information.

In an embodiment, the session management function network element receives the second information from at least one of the following network elements: the network function repository function network element, the control device, and an application function network element on the data network side or a centralized user configuration network element on the data network side. This implementation provides a manner in which the session management function network element obtains the second information.

In an embodiment, the session management function network element obtains the second information based on information identifying the user stream or the service information of the user stream in the network on the data network side. This implementation provides another manner in which the session management function network element obtains the second information.

In an embodiment, the second information includes the identifier of the reliable-latency transmission network of the user stream on the data network side, or an identifier of a port for transmitting the user stream by the user plane function network element on the data network side, where the identifier of the reliable-latency transmission network of the user stream on the data network side is associated with the identifier of the port of the user plane function network element on the data network side. This implementation provides specific information that may be included in the second information.

In an embodiment, the session management function network element receives third bandwidth information from the terminal device, where the third bandwidth information is bandwidth information of a user stream transmitted between the user plane function network element and the data network side. This implementation provides a manner in which the session management function network element obtains the third bandwidth information.

In an embodiment, the session management function network element receives third information from the terminal device or a server on the data network side, where the third information includes at least one of the following information: an identifier of the user stream, a destination media access control (MAC) address of the user stream, and a stream feature of the user stream; and the session management function network element sends the third information to the user plane function network element, the application function network element on the data network side, or the centralized user configuration network element on the data network side. In this implementation, the user plane function network element, the application function network element on the data network side, or the centralized user configuration network element on the data network side can distinguish between user streams.

According to a second aspect, a terminal device sends first indication information to a session management function network element, where the first indication information is used to instruct the terminal device to send or receive a user stream and is used to determine whether an access network element is a transmit end or a receive end that transmits the user stream by using a data stream, and the first indication information is used to create the user stream; and the terminal device sends, to the session management function network element, at least one of the following information: an identifier of the user stream, a destination MAC address of the user stream, and a stream feature of the user stream. According to the communication method provided in this embodiment of this application, the terminal device sends, to the session management function network element, the information instructing the terminal device to send or receive the user stream, that is, a direction of the user stream is indicated, and the terminal device further sends, to the session management function network element, information identifying the user stream (the identifier of the user stream, the destination MAC address of the user stream, and the stream feature of the user stream), so that a core network side device can determine a direction of the data stream based on the direction of the user stream, and identify the user stream based on the information identifying the user stream.

In an embodiment, the terminal device sends first bandwidth information to the session management function network element, where the first bandwidth information is bandwidth information of a user stream of the terminal device or bandwidth information of a user stream transmitted between a user plane function network element and a data network side. This implementation provides a manner in which the session management function network element obtains the first bandwidth information.

In an embodiment, the terminal device sends, to the session management function network element, an identifier of a reliable-latency transmission network of the user stream on the data network side and/or service information of the user stream in a network on the data network side. This implementation provides a manner in which the session management function network element obtains the identifier of the reliable-latency transmission network of the user stream on the data network side and/or the service information of the user stream in the network on the data network side.

According to a third aspect, a control device obtains, based on a device identifier of an access network element, a device identifier of a user plane function network element, and first indication information, first information identifying a data stream, where the first indication information is used to indicate that the access network element is a transmit end or a receive end that performs communication by using the data stream, and the first information is used to instruct the transmit end to send the data stream by using the data stream and is further used to instruct the receive end to receive a user stream by using the data stream; and the control device sends the first information to a session management function network element. According to the communication method provided in this embodiment of this application, the control device obtains the first information and sends the first information to the SMF network element. The first information is used to instruct the transmit end to send the user stream by using the data stream and is further used to instruct the receive end to receive the user stream by using the data stream; and the receive end is the AN network element, and the transmit end is the UPF network element, or the receive end is the UPF network element, and the transmit end is the AN network element. The first information may indicate a data stream transmitted between the AN network element and the UPF network element. In this way, the AN network element and the UPF network element can determine, based on the first information, how to transmit the data stream between the AN network element and the UPF network element.

In an embodiment, the control device obtains first bandwidth information, where the first bandwidth information is bandwidth information of a user stream transmitted between the access network element and the user plane function network element; and that a control device obtains, based on a device identifier of an access network element, a device identifier of a user plane function network element, and first indication information, first information identifying a data stream includes: the control device obtains the first information based on the device identifier of the access network element, the device identifier of the user plane function network element, the first indication information, and the first bandwidth information. This implementation provides a manner in which the control device obtains the first information.

In an embodiment, the control device receives the device identifier of the access network element, the device identifier of the user plane function network element, and the first indication information from the session management function network element. This implementation provides a manner in which the control device obtains the device identifier of the access network element, the device identifier of the user plane function network element, and the first indication information.

In an embodiment, the control device receives second indication information from the session management function network element, where the second indication information includes at least one of the following information: the device identifier of the access network element, an identifier of a reliable-latency transmission network between the access network element and the user plane function network element, an identifier of a reliable-latency transmission network of the user stream on a data network side, and service information of the user stream in a network on the data network side; and the control device sends, to the session management function network element, the device identifier that is of the user plane function network element and that is corresponding to the second indication information. This implementation provides a manner in which the session management function network element obtains the device identifier of the user plane function network element.

According to a fourth aspect, a user plane function network element receives, from a session management function network element, first information identifying a data stream, where the first information is used to instruct a transmit end to send a user stream by using the data stream and is further used to instruct a receive end to receive the user stream by using the data stream; and the access end is an access network element, and the transmit end is the user plane function network element, or the access end is the user plane function network element, and the transmit end is the access network element; and the user plane function network element receives second information from the session management function network element, where the second information is used to indicate a forwarding rule of transmitting the user stream by the user plane function network element on a data network side. According to the communication method provided in this embodiment of this application, the UPF network element can determine, based on the first information, how to transmit a data stream between the AN network element and the UPF network element, and determine, based on the second information, how to transmit the data stream between the UPF network element and the DN.

In this way, a forwarding path between the AN network element and the DN is implemented on the UPF network element.

In an embodiment, the second information includes an identifier of a reliable-latency transmission network of the user stream on the data network side, or an identifier of a port for transmitting the user stream by the user plane function network element on the data network side, where the identifier of the reliable-latency transmission network of the user stream on the data network side is associated with the identifier of the port of the user plane function network element on the data network side. This implementation provides specific information that may be included in the second information.

In an embodiment, when the second information includes the identifier of the reliable-latency transmission network of the user stream on the data network side, the communication method further includes: the user plane function network element obtains, based on the identifier of the reliable-latency transmission network of the user stream on the data network side, the identifier of the port for transmitting the user stream by the user plane function network element on the data network side. This implementation provides a manner in which the user plane function network element determines the identifier of the port for transmitting the user stream on the data network side.

In an embodiment, the user plane function network element sends, to the session management function network element, the identifier of the port for transmitting the user stream by the user plane function network element on the data network side. This implementation provides a manner in which the session management network element obtains the identifier of the port for transmitting the user stream by the user plane function network element on the data network side.

According to a fifth aspect, a communication method is provided, including: a network function repository function network element receives first indication information from a session management function network element, where the first indication information includes at least one of the following information: a device identifier of an access network element, an identifier of a reliable-latency transmission network between the access network element and a user plane function network element, an identifier of a reliable-latency transmission network of a user stream on a data network side, and service information of the user stream in a network on the data network side; and the access network element is a receive end that transmits the user stream by using a data stream, and the user plane function network element is a transmit end that transmits the user stream by using the data stream, or the access network element is the transmit end that transmits the user stream by using the data stream, and the user plane function network element is the receive end that transmits the user stream by using the data stream; and the network function repository function network element sends, to the session management function network element, a device identifier that is of the user plane function network element and that is corresponding to the first indication information. According to the communication method provided in this embodiment of this application, the session management function network element can select the user plane function network element to establish a forwarding path between the AN network element and the DN.

In an embodiment, the network function repository function network element sends first information to the session management network element, where the first information is used to indicate a port for transmitting the user stream by the user plane function network element on the data network side. This implementation provides a manner in which the session management network element obtains the first information.

According to a sixth aspect, an embodiment of this application provides a communications apparatus, configured to perform the communication method in the first aspect and the possible implementations of the first aspect.

According to a seventh aspect, an embodiment of this application provides a communications apparatus, configured to perform the communication method in the second aspect and the possible implementations of the second aspect.

According to an eighth aspect, an embodiment of this application provides a communications apparatus, configured to perform the communication method in the third aspect and the possible implementations of the third aspect.

According to a ninth aspect, an embodiment of this application provides a communications apparatus, configured to perform the communication method in the fourth aspect and the possible implementations of the fourth aspect.

According to a tenth aspect, an embodiment of this application provides a communications apparatus, configured to perform the communication method in the fifth aspect and the possible implementations of the fifth aspect.

According to an eleventh aspect, an embodiment of this application provides a communications system, including the communications apparatus in the sixth aspect, the communications apparatus in the eighth aspect, the communications apparatus in the ninth aspect, and the communications apparatus in the tenth aspect.

According to a twelfth aspect, an embodiment of this application provides a communications apparatus, including a processor and a memory. The memory is configured to store a program, and the processor invokes the program stored in the memory, to perform the communication method in the first aspect and the possible implementations of the first aspect, or perform the communication method in the second aspect and the possible implementations of the second aspect, or perform the communication method in the third aspect and the possible implementations of the third aspect, or perform the communication method in the fourth aspect and the possible implementations of the fourth aspect, or perform the communication method in the fifth aspect and the possible implementations of the fifth aspect.

According to a thirteenth aspect, an embodiment of this application provides a storage medium. The storage medium stores a computer program, and when the computer program is executed by a processor, the communication method in the first aspect and the possible implementations of the first aspect is performed, or the communication method in the second aspect and the possible implementations of the second aspect is performed, or the communication method in the third aspect and the possible implementations of the third aspect is performed, or the communication method in the fourth aspect and the possible implementations of the fourth aspect is performed, or the communication method in the fifth aspect and the possible implementations of the fifth aspect is performed.

According to a fourteenth aspect, an embodiment of this application provides a computer program product. When the computer program product runs on a communications apparatus, the communications apparatus is enabled to perform the communication method in the first aspect and the possible implementations of the first aspect, or perform the communication method in the second aspect and the possible implementations of the second aspect, or perform the communication method in the third aspect and the possible implementations of the third aspect, or perform the communication method in the fourth aspect and the possible implementations of the fourth aspect, or perform the communication method in the fifth aspect and the possible implementations of the fifth aspect.

According to a fifteenth aspect, an embodiment of this application provides a chip system, including a processor, configured to support a communications apparatus in performing the communication method in the first aspect and the possible implementations of the first aspect, or performing the communication method in the second aspect and the possible implementations of the second aspect, or performing the communication method in the third aspect and the possible implementations of the third aspect, or performing the communication method in the fourth aspect and the possible implementations of the fourth aspect, or performing the communication method in the fifth aspect and the possible implementations of the fifth aspect.

For technical effects of the sixth aspect to the fifteenth aspect, refer to the content in the first aspect to the fifth aspect.

BRIEF DESCRIPTION OF DRAWINGS

FIG. 21B-1 and FIG. 21B-2 are a schematic diagram 12 of a communication method according to an embodiment of this application;

FIG. 21C-1 to FIG. 21C-3 are a schematic diagram 13 of a communication method according to an embodiment of this application;

DESCRIPTION OF EMBODIMENTS

The embodiments of this application are illustrated based on a 5G network scenario in a wireless communications network. It should be noted that the solutions in the embodiments of this application may be further applied to another wireless communications network, and a corresponding name may be replaced with a corresponding function name in the another wireless communications network.

Figure 2:
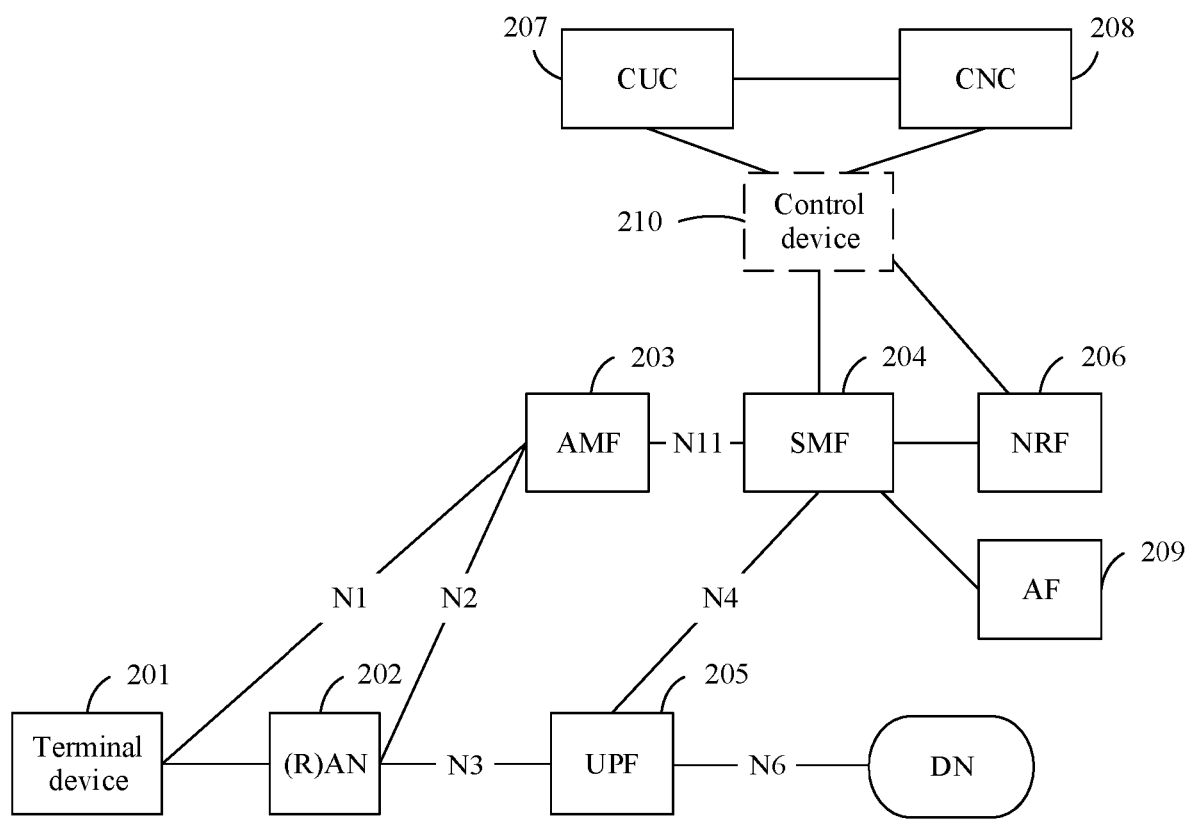
FIG. 2 is a schematic architectural diagram of a communications system according to an embodiment of this application.

As shown in FIG. 2, an architecture of a communications system provided in the embodiments of this application includes a terminal device 201, a radio access network (RAN) element 202, an access and mobility management function (AMF) network element 203, a session management function (SMF) network element 204, a user plane function (UPF) network element 205, a network function repository function (NRF) network element 206, a centralized user configuration (CUC) network element 207, a centralized network configuration (CNC) network element 208, and an application function (AF) network element 209. Optionally, the communications system may further include a control (controller) device 210.

It should be noted that in a possible design, the control device 209 and the SMF network element 204 may be disposed in an integrated manner. In other words, a function of the control device 209 may be performed by the SMF network element 204. In another possible design, the control device 209 and the CUC network element 207 may be disposed in an integrated manner. In other words, the function of the control device 209 may be performed by the CUC network element 207. In addition, the SMF network element 204 and the CUC network element 207 may be disposed in an integrated manner. For example, all functions of the CUC network element 207 may be performed by the SMF network element 204.

It should be noted that a name of an interface between network elements in the figure is merely an example, and the name of the interface in specific implementation may be another name. This is not limited in the embodiments of this application. For example, an interface between the terminal device 201 and the AMF network element 203 may be an N1 interface, an interface between the AN network element 202 and the AMF network element 203 may be an N2 interface, an interface between the AN network element 202 and the UPF network element 205 may be an N3 interface, an interface between the UPF network element 205 and the SMF network element 204 may be an N4 interface, an interface between the AMF network element 203 and the SMF network element 204 may be an N11 interface, and an interface between the UPF network element 205 and a data network (data network, DN) may be an N6 interface.

The terminal device 201 in the embodiments of this application may include a handheld device, a vehicle-mounted device, a wearable device, or a computing device that has a wireless communication function, or another processing device connected to a wireless modem, and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, the devices mentioned above are collectively referred to as the terminal.

Figure 3:
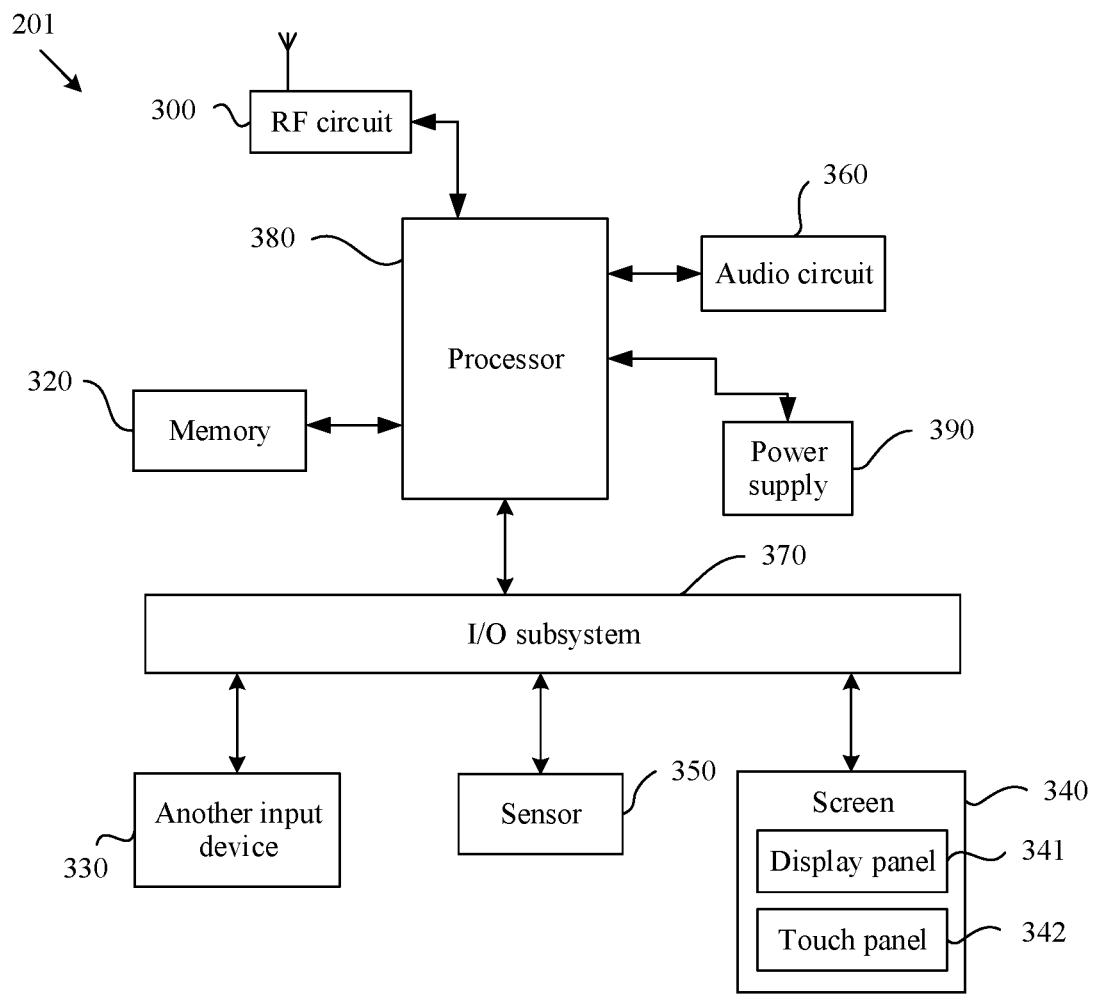
FIG. 3 is a schematic structural diagram of a mobile phone according to an embodiment of this application.

An example in which the terminal device 201 is a mobile phone is used to describe a hardware architecture of the mobile phone. As shown in FIG. 3, a mobile phone 201 may include components such as a radio frequency (RF) circuit 300, a memory 320, another input device 330, a screen 340, a sensor 350, an audio circuit 360, an I/O subsystem 370, a processor 380, and a power supply 390. A person skilled in the art may understand that a structure of the mobile phone shown in the figure does not constitute any limitation on the mobile phone, and may include more or fewer components than those shown in the figure, or combine some components, or split some components, or have different component arrangements. A person skilled in the art may understand that the screen 340 is a user interface (UI), and the screen 340 may include a display panel 341 and a touch panel 342. Although not shown, the mobile phone may further include a function module or a component such as a camera or a Bluetooth module. Details are not described herein.

Further, the processor 380 is separately connected to the RF circuit 300, the memory 320, the audio circuit 360, the I/O subsystem 370, and the power supply 390. The I/O subsystem 370 is separately connected to the another input device 330, the screen 340, and the sensor 350. The RF circuit 300 may be configured to receive and send information, or receive and send a signal during a call, and particularly, after receiving downlink information from a network device, send the downlink information to the processor 380 for processing. The memory 320 may be configured to store a software program and a module. The processor 380 runs the software program and the module stored in the memory 320, to perform various function applications and data processing of the mobile phone, for example, perform a method and a function of the terminal device in the embodiments of this application. The another input device 330 may be configured to: receive entered digit or character information, and generate a keyboard signal input related to user setting and function control of the mobile phone. The screen 340 may be configured to display information entered by a user or information provided for the user, and various menus of the mobile phone, and may further receive a user input. The sensor 350 may be an optical sensor, a motion sensor, or another sensor. The audio circuit 360 may provide an audio interface between the user and the mobile phone. The I/O subsystem 370 is configured to control an external input/output device, and the external device may include another input device controller, a sensor controller, and a display controller. The processor 380 is a control center of the mobile phone 200, uses various interfaces and lines to connect all parts of the entire mobile phone, and performs various functions and processes data of the mobile phone by running or executing the software program and/or the module stored in the memory 320 and invoking data stored in the memory 320, to perform overall monitoring on the mobile phone. The power supply 390 (for example, a battery) is configured to supply power to the foregoing components. Preferably, the power supply may be logically connected to the processor 380 by using a power management system, to implement functions such as charging, discharging, and power consumption management by using the power management system. In an embodiment, the terminal device 201 may receive a signal from the AN network element 202 by using the RF circuit 300.

The AN network element 202 is a device that provides radio access for the terminal device 201. The AN network element 202 includes but is not limited to an eNodeB, a wireless fidelity (Wi-Fi) access point, a worldwide interoperability for microwave access (WiMAX) base station, and the like.

Figure 4:
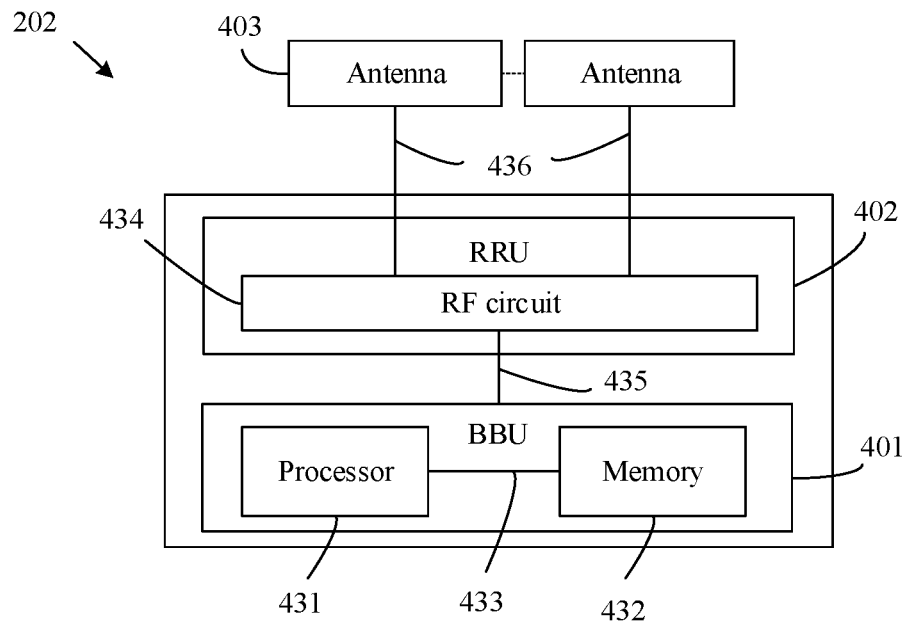
FIG. 4 is a schematic structural diagram of a base station according to an embodiment of this application.

An example in which the AN network element 202 is a base station is used to describe a hardware architecture of the base station. As shown in FIG. 4, a base station 202 may include a building baseband unit (BBU) 401 and a remote radio unit (RRU) 402, the RRU 402 is connected to an antenna system (namely, an antenna) 403, and the BBU 401 and the RRU 402 may be disassembled for use based on a requirement. The BBU 401 may include a processor 431, a memory 432, and a bus system 433. The processor 431 and the memory 432 of the BBU 401 are connected to each other by using the bus system 433. The bus system may be a peripheral component interconnect bus, an extended industry standard architecture bus, or the like. The bus may be classified into an address bus, a data bus, a control bus, and the like. For ease of representation, only one line is used to represent the bus in the figure, but this does not mean that there is only one bus or only one type of bus. The RRU 402 may include an RF circuit 434, and the base station 202 may further include an optical fiber 435 and a coaxial cable 436. The RF circuit 434 in the RRU 402 and the BBU 401 are connected to each other by using the optical fiber 435, and the RF circuit 434 in the RRU 402 and the antenna 403 are connected to each other by using the coaxial cable 436. The base station may include stations in various forms, such as a macro base station, a micro base station (also referred to as a small cell), a relay station, an access point, or the like. The AN network element 202 in the embodiments of this application is configured to transmit data between the terminal device 201 and a core network device.

The AMF network element 203 may be responsible for mobility management in a mobile network, for example, user location update, user network registration, and user handover.

The SMF network element 204 may be responsible for session management in the mobile network, for example, session establishment, modification, and release. Specific functions are, for example, allocating an internet protocol (IP) address to a user, and selecting a UPF network element that provides a packet forwarding function.

The UPF network element 205 may be responsible for processing a user packet, for example, forwarding and charging.

The NRF network element 206 may provide functions such as network function instance registration and discovery.

The CUC network element 207 and the CNC network element 208 are control devices in a latency sensitive network (TSN) network. The CUC network element 207 is configured to manage a terminal and a service, for example, receive registration and switching configuration parameters of a transmit end (talker) and a receive end (listener) in a TSN network element. The CNC network element 208 is configured to manage a switching node in the TSN network, for example, maintain a topology of the TSN network, calculate a scheduling policy on the switching node, and deliver the scheduling policy to the switching node.

The AF network element 209 is configured to provide various application services.

The control device 210 is configured to manage a TSN network between the AN network element 202 and the UPF network element 205.

Network elements such as the AMF network element 203, the SMF network element 204, the UPF network element 205, the NRF network element 206, and the control device 210 may be collectively referred to as core network elements. Structures of these core network elements are described below by using a network device as an example. In the embodiments of this application, each core network element does not need to necessarily have units or components shown in the following figure, and may have more or fewer units or components.

Figure 5:
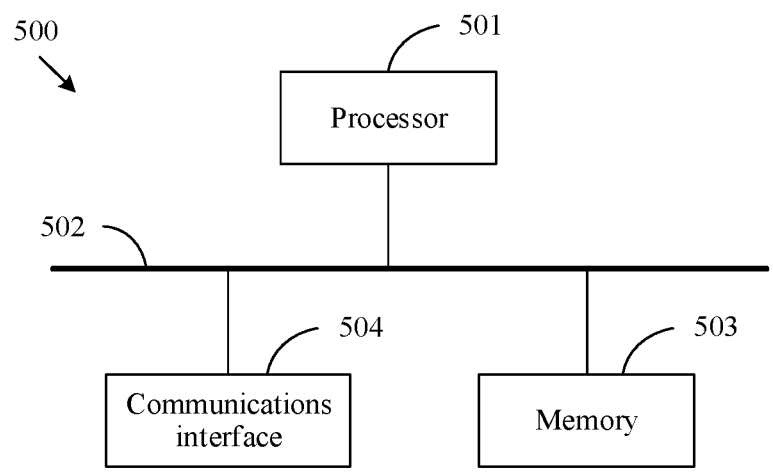
FIG. 5 is a schematic structural diagram of a network device according to an embodiment of this application.

As shown in FIG. 5, a network device 500 may include at least one processor 501, a communications line 502, a memory 503, and at least one communications interface 504.

The processor 501 may be a general-purpose central processing unit (CPU), a microprocessor, an application-specific integrated circuit (ASIC), or one or more integrated circuits configured to control program execution of the solutions in this application. The communications line 502 may include a path for transmitting information between the foregoing components. The communications interface 504 may be any apparatus such as a transceiver, and is configured to communicate with another device or communications network, such as an Ethernet network, a radio access network (RAN), or a wireless local area network (WLAN). The memory 503 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 503 is not limited thereto. The memory may exist independently and is connected to the processor by using the communications line 502. Alternatively, the memory may be integrated with the processor. The memory 503 is configured to store a computer executable instruction (which may be referred to as application program code) for executing the solutions in this application, and the processor 501 controls the execution. The processor 501 is configured to execute the computer executable instruction stored in the memory 503, to implement the method provided in the following embodiments of this application.

In a forwarding process in a conventional Ethernet network, when a large quantity of data packets arrive at a forwarding port of a switching device 210 in an instant, a problem such as a large forwarding latency or a packet loss is caused. Therefore, the conventional Ethernet network cannot provide a service with high reliability and a guaranteed transmission latency, and cannot meet requirements of fields such as vehicle control and the Industrial Internet. The institute of electrical and electronics engineers (IEEE) defines a related TSN network standard based on a requirement for reliable-latency transmission. The identifier is based on layer 2 switching to provide a reliable-latency transmission service, to ensure reliability of data transmission of a latency sensitive service and a predictable end-to-end transmission latency.

Figure 6:
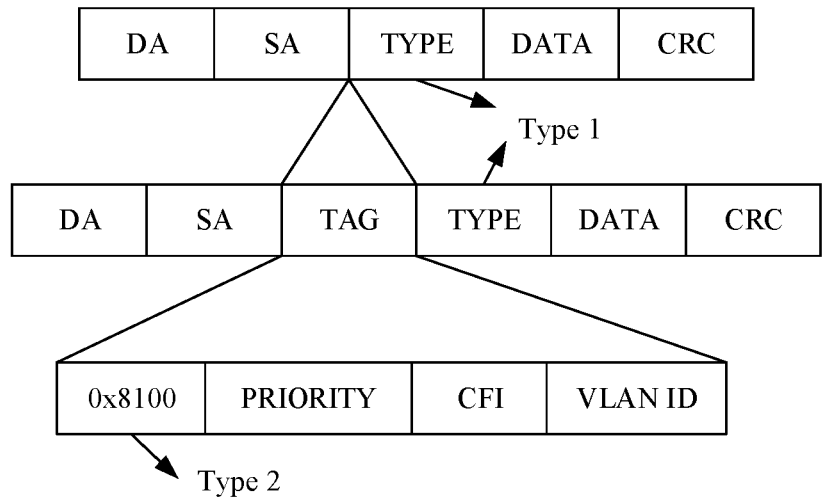
FIG. 6 is a schematic diagram of a format of an Ethernet frame according to an embodiment of this application.

Layer 2 switching belongs to link layer switching, and forwarding is performed based on a media access control (MAC) address. The switching device 210 obtains a forwarding port by querying a MAC learning table, and performs forwarding in a broadcast manner for an address that is not recorded in the MAC learning table. FIG. 6 shows a format of an Ethernet frame of a packet after layer 2 encapsulation, where a destination address (DA) represents a destination MAC address, a source address (SA) represents a source MAC address, a type represents an Ethernet type of the Ethernet frame, data represents a data segment, and cyclic redundancy check (CRC) is used to detect or check an error that may occur after data transmission or storage. When the Ethernet frame carries virtual local area network (VLAN) information, a VLAN tag is added between an SA field and a TYPE field, including an Ethernet type value (type 2) 0x8100, a priority field, a canonical format indicator (CFI) field, and a VLAN ID field. The Ethernet type value 0x8100 is also referred to as a tag protocol identifier (TPID) in the VLAN tag, or may be another value. The Ethernet frame of the packet after the layer 2 encapsulation may have no VLAN tag, or may have at least one VLAN tag. It should be noted that an Ethernet type (type 1) of the Ethernet frame is irrelevant to the Ethernet type value (type 2) in the TAG.

Figure 7:
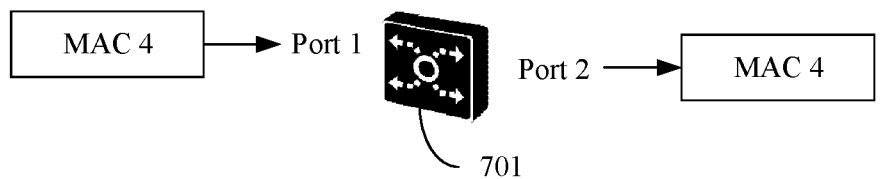
FIG. 7 is a schematic diagram of a principle of layer 2 switching according to an embodiment of this application.

FIG. 7 shows a principle of layer 2 switching. A switching device 701 stores a MAC learning table that records a correspondence between a user MAC address and a port. If forwarding is performed based on a VLAN and a MAC address, corresponding VLAN information is further included. When receiving a packet whose destination address is MAC4 from a port 1, the switching device learns, by querying the MAC learning table, that port information corresponding to MAC4 is a port 2, and then sends the packet from the port 2. An entry of MAC4 in the MAC learning table is learned when the port 2 receives a packet whose source MAC address is MAC4, or may be obtained through configuration.

Figure 8:
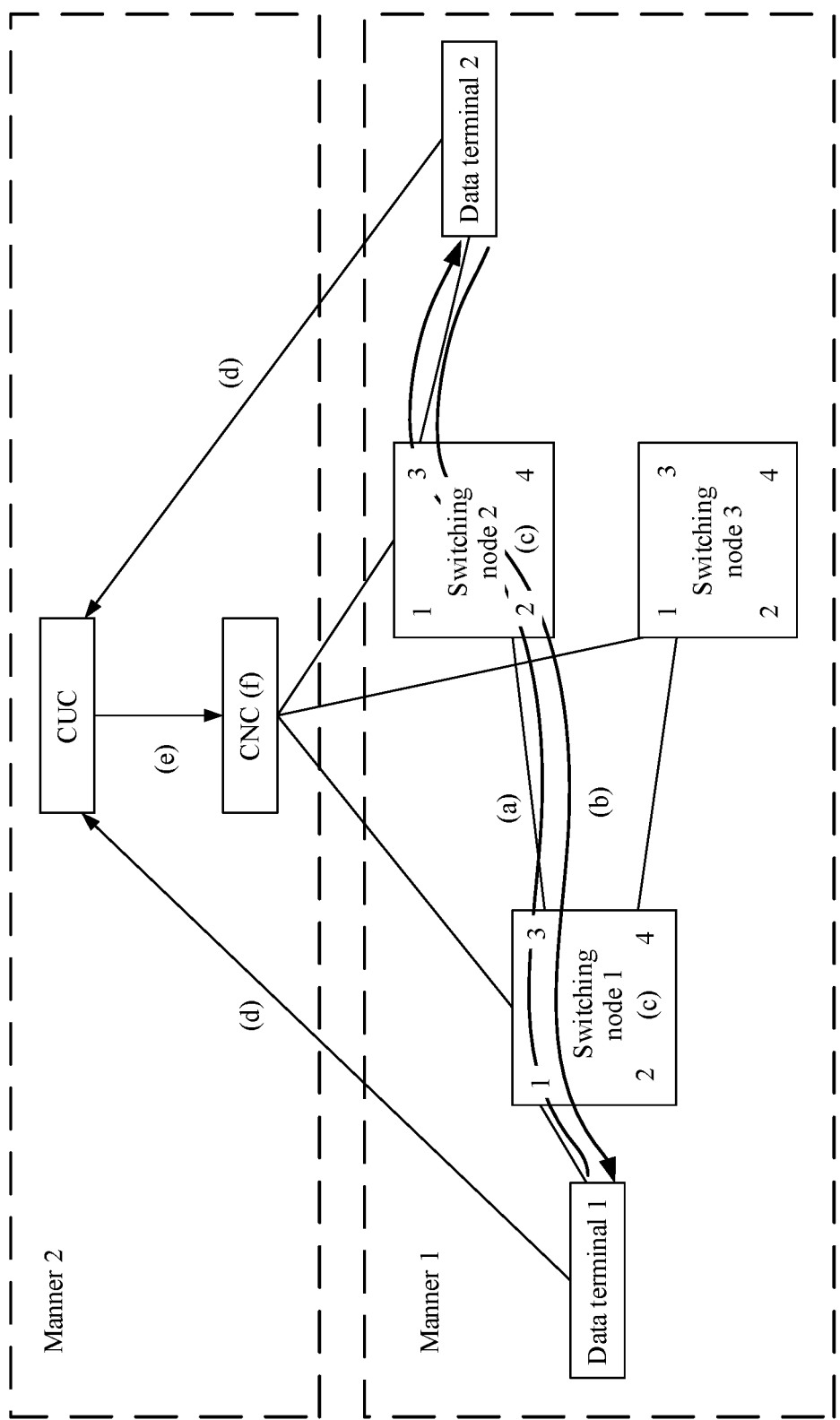
FIG. 8 is a schematic architectural diagram of a TSN network according to an embodiment of this application.

As shown in FIG. 8, a TSN network includes switching nodes (a switching node 1, a switching node 2, and a switching node 3 in the figure) and data terminals (a data terminal 1 and a data terminal 2 in the figure). A data stream in the TSN network is a unidirectional stream. For a data stream, the data terminal includes a transmit end (talker) and a receive end (listener). A TSN standard defines behavior of the data terminal and the switching node and a scheduling manner of forwarding a data stream by the switching node, to implement reliable-latency transmission. The switching node in the TSN network uses a destination MAC address of a packet as information identifying a data stream, and performs resource reservation and scheduling planning based on a latency requirement of a to-be-transmitted user stream, to ensure a latency and reliability of packet transmission according to a generated scheduling policy.

As shown in FIG. 8, the TSN network currently includes two resource reservation and management manners.

Manner 1: A forwarding channel is created by using a stream reservation protocol (SRP). Assuming that the data terminal 1 in the figure is the transmit end (talker), the data terminal 1 performs resource reservation on a switching node between the transmit end and the receive end by using the SRP protocol before sending a data stream. For example, the following procedures may be included.

(a) The data terminal 1 sends an SRP request message to the switching node 1. The SRP request message includes information identifying a data stream, a VLAN, a class of service (CoS), latency information, and the like. The information identifying the data stream may include a stream identifier (ID) and/or a destination MAC address of the data stream. The VLAN and the CoS are used to identify a TSN forwarding domain. The latency information is used to determine whether a forwarding path meets a latency requirement of the data stream. After receiving the SRP request message, the switching node 1 adds an estimated latency of the node to the latency information in the SRP request, and then broadcasts the SRP request message on ports (ports 3 and 4) in the TSN network. Both the switching node 2 and the switching node 3 receive the SRP request message. Because only the switching node 3 and the switching node 1 are currently located in a same TSN network, the switching node 3 does not forward the SRP request message to another switching node. Because the switching node 2 and the data terminal 2 are located in a same TSN network, after receiving the SRP request message, the switching node 2 adds an estimated latency of the switching node 2 to the latency information in the SRP request, and then sends the SRP request message to the data terminal 2 on a port (the port 3) in the TSN network.

(b) After receiving the SRP request message, the data terminal 2 determines, based on the information identifying the data stream in the SRP request message and application information, that the SRP request message corresponds to a data stream that needs to be received by the data terminal 2, and when the latency information meets a preset requirement, sends an SRP response message from a port receiving the SRP request message. The application information may be obtained through configuration or received from another network element.

(c) After receiving the SRP response message, the switching node 2 and the switching node 1 in the TSN network reserve bandwidth and scheduling resources, and then forward the SRP response message from the port receiving the SRP request message.

After the foregoing processes, a forwarding channel is created between the transmit end and the receive end, and each switching node reserves related resources based on the SRP request. Then, when receiving a data stream sent by the transmit end, each switching node performs scheduling and forwarding based on the reserved resources, to ensure a latency and reliability of packet transmission.

Manner 2: A centralized management manner defined in IEEE 802.1QCC is used. A management plane includes a CUC network element and a CNC network element. The CUC network element is configured to manage a terminal and a service, for example, receive registration and switching configuration parameters of the transmit end and the receive end. The CNC network element manages a switching node in the TSN network, for example, maintaining a topology of the TSN network, calculating a scheduling policy on the switching node, and delivering the scheduling policy to the switching node. For example, the following procedures may be included.

(d) The CUC network element receives a registration request in which a data terminal is used as the transmit end or the receive end of the TSN network. The request includes indication information indicating that the data terminal is the transmit end or the receive end, information identifying a data stream, a bandwidth requirement, a latency requirement, and the like.

(e) After receiving the foregoing information, the CUC network element sends a request for creating the data stream to the CNC network element.

(f) Before creating the data stream, the CNC network element generates a topology of the TSN network, for example, a connection topology between switching nodes and a connection topology between a switching node and a data terminal. After receiving the request for creating the data stream from the CUC network element, the CNC network element calculates a forwarding path in the TSN network and a scheduling policy of each switching node on the path based on a bandwidth requirement, a latency requirement, and the like of the data stream, and then delivers the policy to a corresponding switching node.

In an embodiment, the AN network element and the UPF network element are respectively the transmit end and the receive end that perform communication by using the data stream in the TSN network. For ease of description, in the embodiments of this application, forwarding channels for transmitting data streams between the AN network element and the UPF network element are collectively referred to as TSN pipes. The TSN pipes may include a plurality of types of forwarding channels, for example, a GTP-U pipe, a layer 2 pipe, and a virtual transmission pipe.

Figure 9:
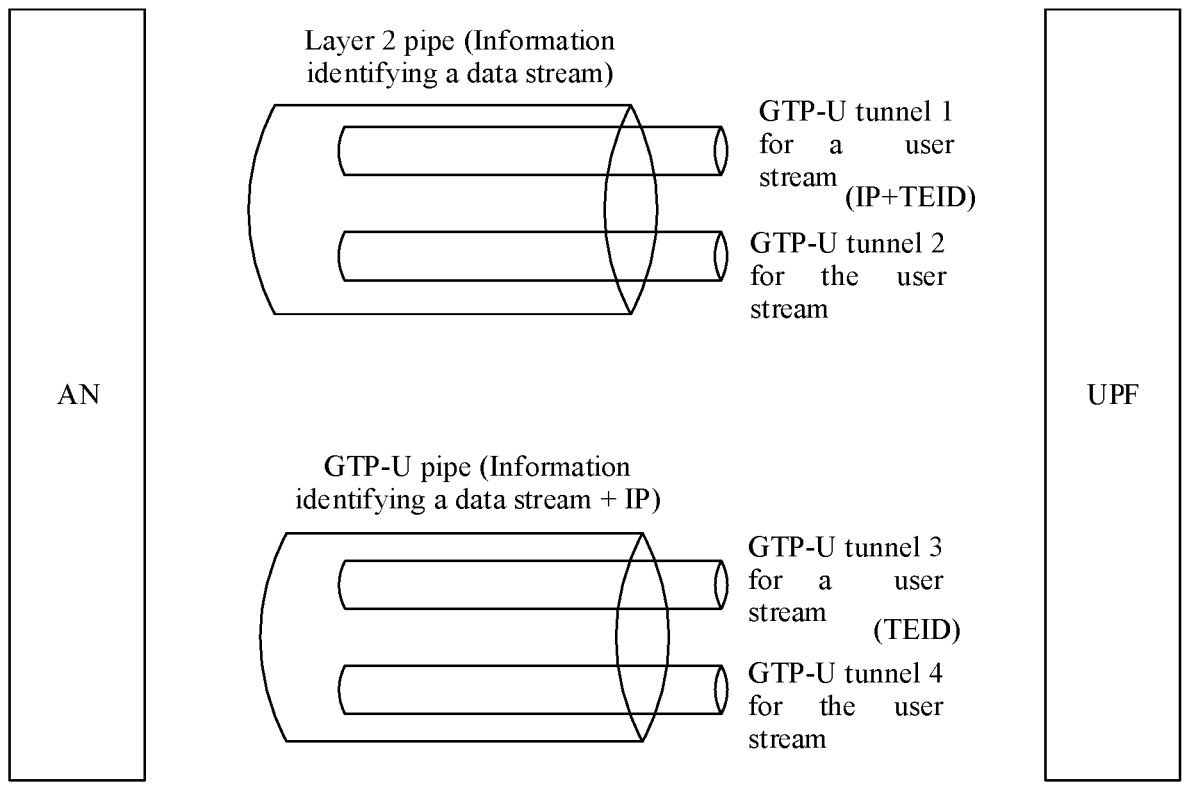
FIG. 9 is a schematic diagram of a GTP-U pipe or a layer 2 pipe that is between an AN network element and a UPF network element and that is created in a TSN network according to an embodiment of this application.

FIG. 9 is a schematic diagram of a GTP-U pipe or a layer 2 pipe that is between the AN network element and the UPF network element and that is created in the TSN network. The GTP-U pipe is a pipe bound to IP address information of a GTP-U tunnel, and the information identifying the data stream is bound to the IP address information of the GTP-U tunnel, that is, the GTP-U pipe is determined by using the information identifying the data stream and the IP address information of the GTP-U tunnel. One GTP-U pipe may include at least one GTP-U tunnel, and each GTP-U tunnel is distinguished by using a tunnel endpoint identifier (TEID). The layer 2 pipe is a pipe bound to layer 2 information (namely, the information identifying the data stream), and the pipe is not bound to the IP address information of the GTP-U tunnel, that is, the layer 2 pipe may be determined by using the information identifying the data stream. One layer 2 pipe may include at least one GTP-U tunnel, and each GTP-U tunnel is distinguished by using a TEID and an IP address of the GTP-U tunnel.

In an embodiment, information about a TSN pipe created by the SMF network element or the control device may be stored in the NRF network element, the control device, or another control plane network element, and is used as a basis for selecting the UPF network element or creating a GTP-U tunnel when a user subsequently creates a data stream or a session with a reliable latency. The information about the TSN pipe may include at least one of the information identifying the data stream, a device identifier of the AN network element, a device identifier of the UPF network element, a port identifier of the AN network element, a port identifier of the UPF network element, an identifier of a reliable-latency transmission network between the AN network element and the UPF network element, and a source IP address and a destination IP address of the GTP-U tunnel.

In an embodiment, information about a TSN pipe may be stored in the corresponding UPF network element and AN network element, and is used as a basis for creating a GTP-U tunnel by the AN network element and the UPF network element when a data stream or a session with a reliable latency is subsequently created.

In an embodiment, the NRF network element, the control device, or another control plane network element may store reachability information of the AN network element and the UPF network element in the TSN network, and use the reachability information as a basis for selecting the UPF network element when a user session is created. The reachability information indicates a transmit end and a receive end that are located in a same reliable-latency transmission network. Optionally, the NRF network element, the control device, or another network element may store reachability information associated with the port identifier of the AN network element and the port identifier of the UPF network element, and the reachability information is used as a basis for selecting a forwarding port when a session or a data stream is created (for example, an N3 forwarding interface is selected for layer 2 forwarding). The reachability information indicates a port of a transmit end and a port of a receive end that are located in a same reliable-latency transmission network. If the port of the transmit end and the port of the receive end are abstracted as devices, the reachability information may be uniformly expressed as follows: The reachability information is used to indicate the transmit end and the receive end that are located in the same reliable-latency transmission network. In this scenario, no GTP-U pipe is created. Therefore, the GTP-U pipe may be considered as a virtual transmission pipe.

Figure 10:
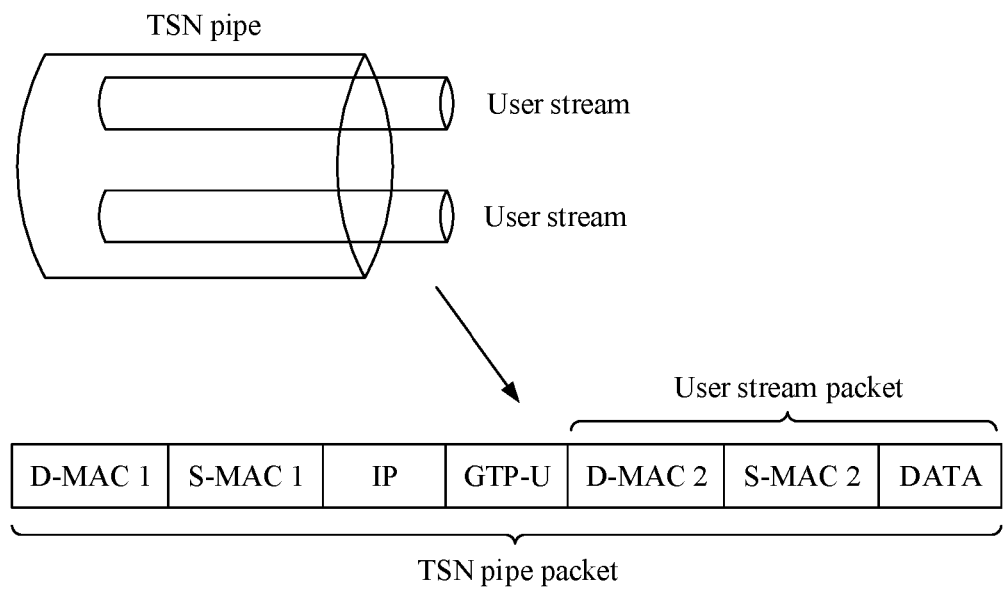
FIG. 10 is a schematic diagram of a TSN pipe packet according to an embodiment of this application.

A TSN pipe packet may carry an IP packet or an Ethernet packet. As shown in FIG. 10, an outer encapsulation part of the TSN pipe packet includes a source MAC address (S-MAC1), a destination MAC address (D-MAC1), an IP address (IP) of a GUP-U tunnel, and a TEID (GTU-U) of the GUP-U tunnel. The source MAC address (S-MAC1) and the destination MAC address (D-MAC1) are MAC addresses used to transmit a packet between the AN network element and the UPF network element, and may be addresses allocated by the control device, the SMF network element, or the CUC network element, or MAC addresses of the AN network element and/or the UPF network element. The IP address and the TEID of the GTP-U tunnel are determined by the SMF network element or the UPF network element, and are used to determine a layer 2 pipe. An inner payload part encapsulated in the TSN pipe packet is a user stream packet. Taking Ethernet encapsulation as an example, the user stream packet includes a destination MAC address (D-MAC2), a source MAC address (S-MAC2), and a data part (DATA), and the source MAC address (S-MAC2) and the destination MAC address (D-MAC2) in the user stream packet are MAC addresses used to transmit a packet in an access network and/or the DN network.

In an embodiment, a data stream is a TSN pipe created between the AN network element and the UPF network element, and a user stream is a stream from the user or sent to the user. When the user stream is transmitted between the AN network element and the UPF network element, the user stream is carried in the data stream. In the embodiments of this application, information identifying the data stream includes a stream identifier (ID) of the data stream and/or a destination MAC address (D-MAC1) of a TSN pipe packet. For example, the stream identifier (ID) may include a source MAC address (S-MAC1) of the TSN pipe packet and a number of two bytes used as the identifier. In the embodiments of this application, the information identifying the user stream includes an identifier of the user stream, a destination MAC address of the user stream, and a stream feature of the user stream.

In an embodiment, an identifier of a reliable-latency transmission network of the user stream on the DN side is an identifier of a reliable-latency transmission network between the UPF network element and a network element on the DN side. An identifier of a port for transmitting the user stream by the UPF network element on the DN side is a port identifier corresponding to a port for transmitting the user stream by the UPF network element and the network element on the DN side. The identifier of the reliable-latency transmission network of the user stream on the DN side corresponds to the identifier of the port for transmitting the user stream by the UPF network element on the DN side.

In an embodiment, information instructing the terminal device to send or receive the user stream may also be represented as information indicating that the terminal device is the transmit end (talker) or the receive end (listener). Information indicating that the AN network element is the transmit end or the receive end may be represented as information indicating that the UPF network element is the transmit end or the receive end. When the user stream is an uplink user stream, the terminal device sends the user stream, and the terminal device is the transmit end. For the AN network element and the UPF network element, the AN network element is the transmit end, and the UPF network element is the receive end. When the user stream is a downlink user stream, the terminal device receives the user stream, and the terminal device is the receive end. For the AN network element and the UPF network element, the AN network element is the receive end, and the UPF network element is the transmit end.

In an embodiment, for the GTP-U pipe described above, the TSN pipe is bound to the GTP-U tunnel, and the AN network element and the UPF network element serve as two endpoints of the GTP-U tunnel and have specific IP addresses and/or tunnel identifiers. An IP address and/or a tunnel identifier of the GTP-U tunnel corresponding to the TSN pipe on the AN network element side correspond/corresponds to an IP address and/or a tunnel identifier of the AN network element, and an IP address and/or a tunnel identifier of the GTP-U tunnel corresponding to the TSN pipe on the UPF network element side correspond/corresponds to an IP address and/or a tunnel identifier of the UPF network element.

According to a communication method and apparatus provided in the embodiments of this application, a forwarding rule of transmitting a user stream between the AN network element and the UPF network element is created on the UPF network element, and a forwarding rule of transmitting a user packet between the UPF network element and the DN is created. Finally, a forwarding rule of transmitting a user packet by the UPF network element is as follows:

For sending of a user stream by a user, the UPF network element receives a user stream with a specific source/destination MAC address (optionally, a specific GTP-U tunnel is encapsulated) from a specific port on the AN network element side, determines a forwarding port (optionally, the encapsulation of the GTP-U tunnel is removed) based on information identifying the user stream (for example, an identifier of the user stream/a destination MAC address of the user stream/a stream feature of the user stream), and sends the user stream to the DN through a specific port of the UPF network element on the DN side.

For receiving of a user stream by a user, the UPF network element receives a user stream from a specific port on the DN side, determines a forwarding port (optionally, encapsulation of a specific GTP-U tunnel is added) based on information identifying the user stream, adds a specific source/destination MAC address, and sends the user stream to the AN network element through a specific port of the UPF network element on the AN network element side.

A forwarding rule of transmitting a user stream between the UPF network element and the AN network element is created on the UPF network element in processes in FIG. 11A and FIG. 11B to FIG. 15A and FIG. 15B. In processes in FIG. 16 to FIG. 18, a forwarding channel is finally created on the DN side, and a forwarding rule of transmitting a user stream between the UPF network element and the DN side is created on the UPF network element. Any one of the processes in FIG. 11A and FIG. 11B to FIG. 15A and FIG. 15B may be combined with any one of the processes in FIG. 16 to FIG. 18. In a process in FIG. 19A and FIG. 19B, a forwarding rule of transmitting a user stream between the AN network element and the UPF network element is created on the UPF network element, and a forwarding rule of transmitting a user packet between the UPF network element and the DN is created.

For example, the process of creating the forwarding rule in FIG. 11A and FIG. 11B to FIG. 18 may be implemented in a process of creating a PDU session. The process of creating the forwarding rule in FIG. 19A and FIG. 19B is independent of the process of creating the PDU session.

That a forwarding rule of transmitting a user stream between the UPF network element and the AN network element is created on the UPF network element in the processes in FIG. 11A and FIG. 11B to FIG. 15A and FIG. 15B includes the following:

For sending of a user stream by a user, a user stream with a specific source/destination MAC address (optional, a specific GTP-U tunnel) is received from a specific port of the UPF network element on the AN network element side.

For receiving of a user stream by a user, a user stream (optionally, encapsulation of a specific GTP-U tunnel is added) with a specific source/destination MAC address is sent to the AN network element by using a specific port of the UPF network element on the AN network element side.

It should be noted that, in an embodiment of this application, messages sent by the SMF network element to the UPF network element may be combined for execution. Correspondingly, messages sent by the UPF network element to the SMF network element may also be combined for execution.

Figure 11A:
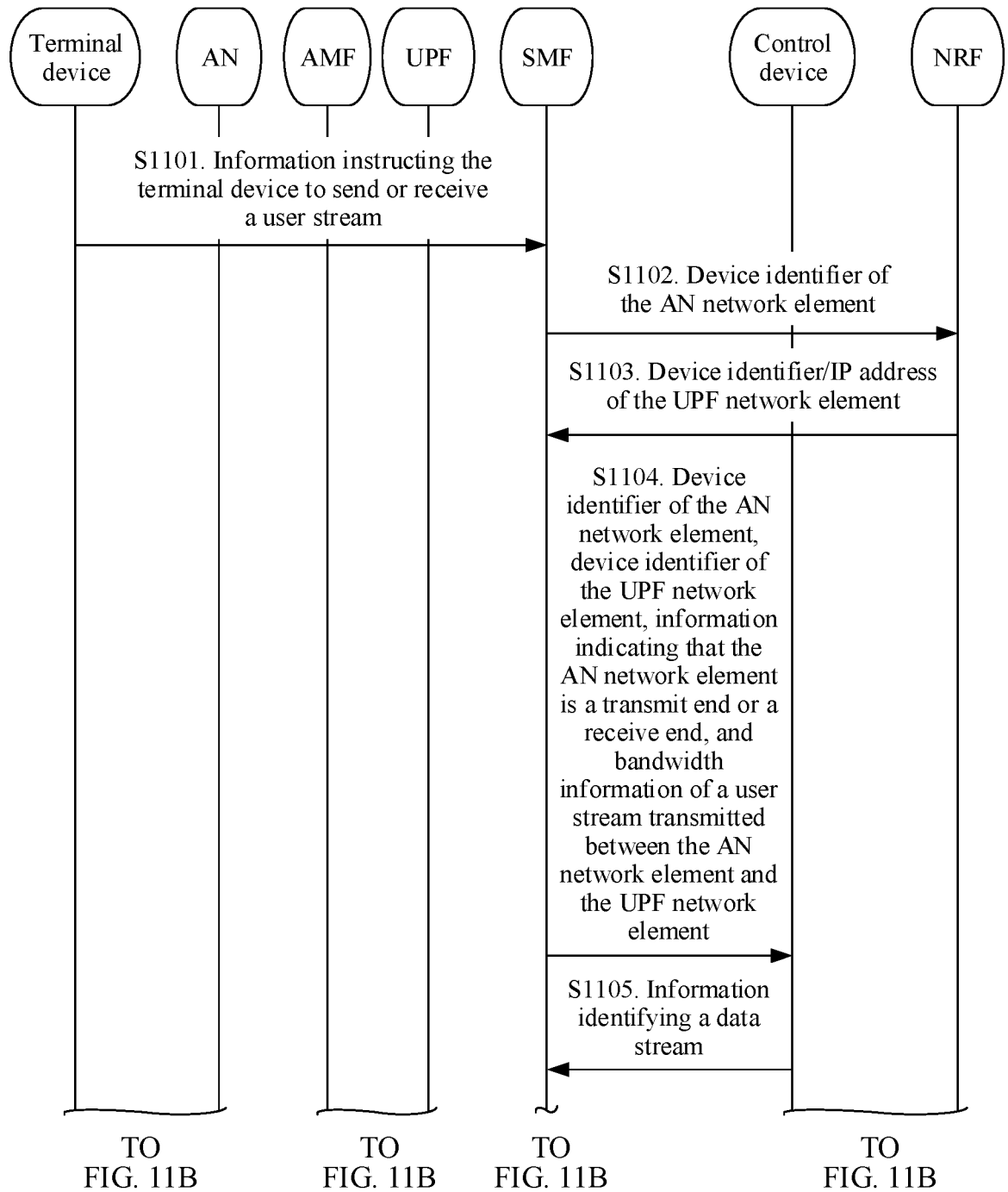
FIG. 11A and FIG. 11B are a schematic diagram 1 of a communication method according to an embodiment of this application.
Figure 11B:
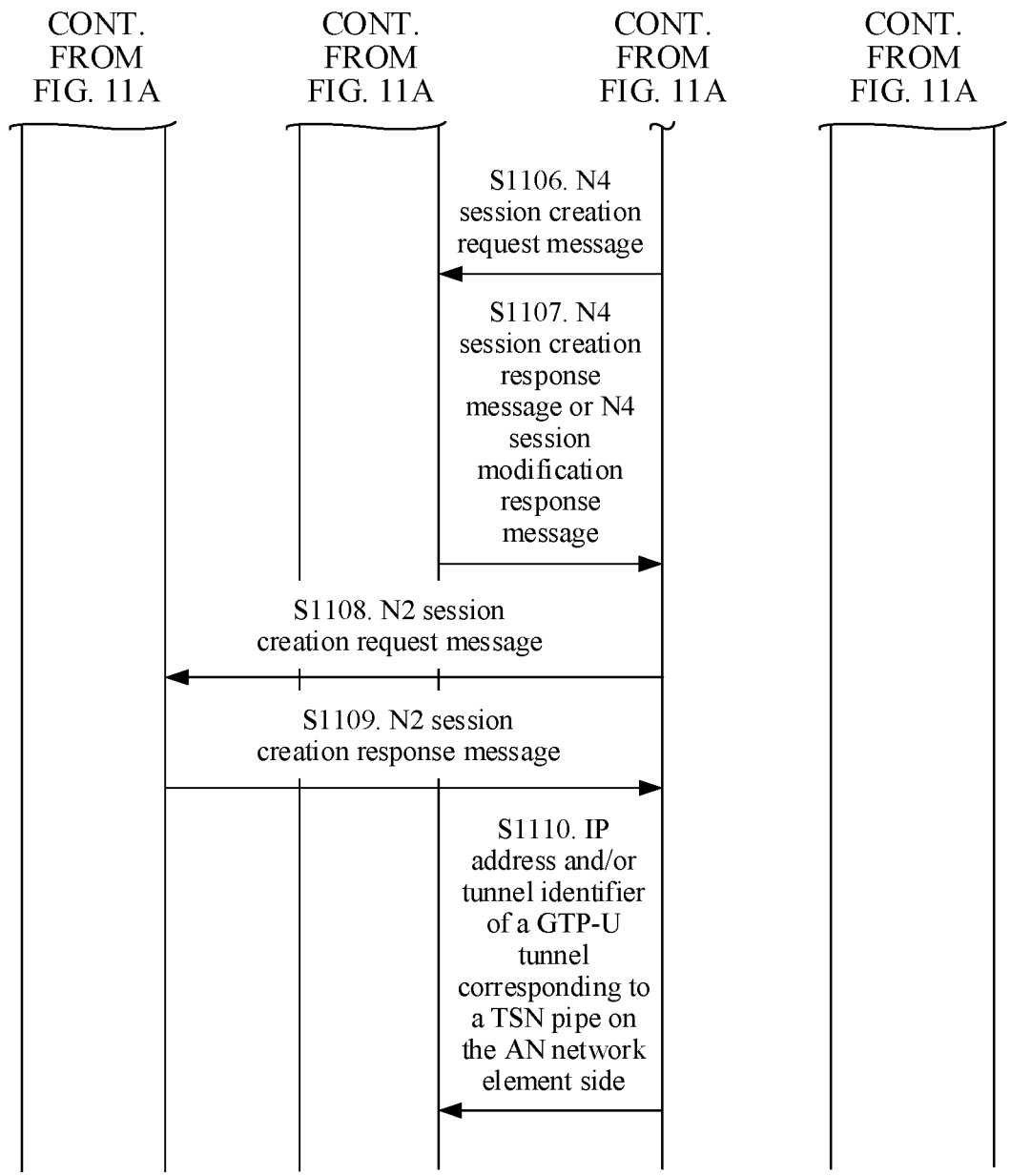

An embodiment of this application provides a communication method. As shown in FIG. 11A and FIG. 11B, the method includes the following operations.

S1101. A terminal device sends, to an SMF network element, information instructing the terminal device to send or receive a user stream.

Optionally, the terminal device may further send, to the SMF network element, information identifying the user stream.

The information instructing the terminal device to send or receive the user stream may be information indicating that the terminal device is a transmit end (talker) or a receive end (listener). The information identifying the user stream may include a stream identifier (ID), a destination MAC address, or a stream feature (for example, an IP address or a transmission control protocol (transmission control protocol, TCP) port number) of the user stream. Optionally, the terminal device may further send an identifier of a reliable-latency transmission network of the user stream on a DN side to the SMF network element. Optionally, the terminal device may further send bandwidth information of a user stream of the terminal device to the SMF network element.

The foregoing information may be carried in a packet data unit (PDU) session creation request message. For example, the terminal device may send the PDU session creation request message to an AN network element by using a non-access stratum (NAS) message, the AN network element sends the PDU session creation request message to an AMF network element, and the AMF network element sends the PDU session creation request message to the SMF network element. Alternatively, the SMF may obtain the foregoing information in another manner. For example, after receiving the PDU session creation request message, the SMF network element obtains the foregoing information from a policy and charging function (PCF) network element or a unified data management (UDM) network element, or from a server on the DN side, or from a function network element on the DN side by using a UPF network element.

In addition, because the PDU session creation request message is forwarded by the AMF network element to the SMF network element, the AMF network element simultaneously sends a device identifier of the AN network element when sending the message to the SMF network element.

S1102. The SMF network element sends the device identifier of the AN network element to an NRF network element.

The foregoing information is used to request the NRF network element to select the UPF network element. The foregoing information may be carried in an NRF service-based interface message.

S1103. The NRF network element obtains a device identifier/IP address of the UPF network element based on the device identifier of the AN network element, and sends the device identifier/IP address of the UPF network element to the SMF network element.

The NRF network element stores reachability information of the AN network element and the UPF network element in a reliable-latency transmission network. The reachability information of the AN network element and the UPF network element in the reliable-latency transmission network is used to indicate that the AN network element and the UPF network element are located in the same reliable-latency transmission network. For example, the reachability information may indicate the device identifier of the AN network element and the device identifier of the UPF network element that are located in the same reliable-latency transmission network. The NRF network element may obtain the device identifier/IP address of the UPF network element based on the device identifier of the AN network element and the stored reachability information of the AN network element and the UPF network element in the reliable-latency transmission network.

S1104. The SMF network element sends, to a control device, the device identifier of the AN network element, the device identifier of the UPF network element, information indicating that the AN network element is the transmit end or the receive end, and bandwidth information of a user stream transmitted between the AN network element and the UPF network element.

The foregoing information is used to request the control device to select a TSN pipe and allocate bandwidth to the TSN pipe.

The SMF network element may determine, based on the information instructing the terminal device to send or receive the user stream, the information indicating that the AN network element is the transmit end or the receive end. For example, if the terminal device sends the user stream, the AN network element is the transmit end; or if the terminal device receives the user stream, the AN network element is the receive end.

The SMF network element may obtain, based on the bandwidth information that is of the user stream of the terminal device and that is received from the terminal device, the bandwidth information of the user stream transmitted between the AN network element and the UPF network element. Alternatively, the SMF network element may obtain, based on a configuration, a policy, or an orchestration, the bandwidth information of the user stream transmitted between the AN network element and the UPF network element.

S1105. The control device obtains, based on the device identifier of the AN network element, the device identifier of the UPF network element, and the information indicating that the AN network element is the transmit end or the receive end, information identifying a data stream for a TSN pipe between the AN network element and the UPF network element and determines the TSN pipe, allocates bandwidth from the TSN pipe based on the bandwidth information of the user stream transmitted between the AN network element and the UPF network element, and sends, to the SMF network element, the information identifying the data stream.

Correspondingly, the SMF network element receives the information identifying the data stream from the control device.

The control device stores information about a TSN pipe corresponding to the device identifier of the AN network element and the device identifier of the UPF network element, for example, bandwidth information of the TSN pipe and the information identifying the data stream.

Because the same TSN pipe corresponding to the device identifier of the AN network element and the device identifier of the UPF network element may include an uplink TSN pipe or a downlink TSN pipe, the TSN pipe is not only related to the device identifier of the AN network element and the device identifier of the UPF network element, but also related to which network element in the AN network element or the UPF network element is the transmit end and which network element is the receive end. The information indicating that the AN network element is the transmit end or the receive end can indicate a direction of a user stream, to indicate which network element in the AN network element or the UPF network element is the transmit end and which network element is the receive end. Therefore, the control device may obtain, based on the device identifier of the AN network element, the device identifier of the UPF network element, and the information indicating that the AN network element is the transmit end or the receive end, the information identifying the data stream for the TSN pipe and determine the corresponding TSN pipe. Further, the control device may obtain, based on the device identifier of the AN network element, the device identifier of the UPF network element, the information indicating that the AN network element is the transmit end or the receive end, and the bandwidth information of the user stream transmitted between the AN network element and the UPF network element, first information identifying the data stream, obtain the information identifying the data stream for the TSN pipe, and determine the corresponding TSN pipe. For example, a TSN pipe whose bandwidth is greater than bandwidth of the user stream transmitted between the AN network element and the UPF network element may be selected.

The control device may allocate bandwidth to the user stream from the TSN pipe based on the bandwidth information of the user stream transmitted between the AN network element and the UPF network element. It should be noted that the control device does not need to notify another network element of bandwidth allocated to a user stream from the TSN pipe, and may store only information about remaining bandwidth of the TSN pipe, to allocate bandwidth to another user stream.

If the control device finds no available TSN pipe based on the foregoing information, the control device initiates a TSN pipe creation process.

In an embodiment, the information about the TSN pipe stored in the control device may include GTP-U tunnel information. For example, the information about the TSN pipe may include an IP address of a GTP-U tunnel corresponding to the TSN pipe, and the control device may store a port identifier of the AN network element, a port identifier of the UPF network element, and the IP address and/or a tunnel identifier of the GTP-U tunnel corresponding to the TSN pipe. The control device may send, to the SMF network element, the port identifier of the AN network element, the port identifier of the UPF network element, and the IP address and/or the tunnel identifier of the GTP-U tunnel corresponding to the TSN pipe. The IP address and/or the tunnel identifier of the GTP-U tunnel corresponding to the TSN pipe include/includes at least one of an IP address and/or a tunnel identifier of the GTP-U tunnel corresponding to the TSN pipe on the AN network element side and an IP address and/or a tunnel identifier of the GTP-U tunnel corresponding to the TSN pipe on the UPF network element side.

Taking a unicast address as an example, a TEID of the GTP-U tunnel in the GTP-U tunnel information is stored in the information about the TSN pipe or is allocated by the receive end. Taking a multicast address as an example, a multicast IP address and a TEID of the GTP-U tunnel in the GTP-U tunnel information are stored in the information about the TSN pipe, or are allocated by the transmit end and then sent by the SMF network element to the receive end.

S1106. The SMF network element sends an N4 session creation request message to the UPF network element.

The N4 session creation request message may include the information identifying the data stream.

In an embodiment, the SMF network element may further send, to the UPF network element, the port identifier of the UPF network element, the IP address and/or the tunnel identifier of the GTP-U tunnel corresponding to the TSN pipe on the AN network element side and/or the UPF network element side, and the information identifying the user stream.

The foregoing information may be carried in the session creation request message.

S1107. The UPF network element sends an N4 session creation response message or an N4 session modification response message to the SMF network element.

Optionally, the UPF network element may store the information about the TSN pipe corresponding to the port identifier of the UPF network element, for example, the information identifying the data stream. The UPF network element may determine the TSN pipe based on the information that is used for identifying the data stream and that is received from the SMF network element. The UPF network element may receive the port identifier of the UPF network element from the SMF network element or determine the port identifier of the UPF network element based on the locally stored information.

In an embodiment, the UPF network element may store the IP address and/or the tunnel identifier of the GTP-U tunnel corresponding to the TSN pipe on the UPF network element side. If the UPF network element does not receive the IP address and/or the tunnel identifier of the GTP-U tunnel on the UPF network element side from the SMF network element, the UPF network element may allocate the IP address and/or the tunnel identifier of the GTP-U tunnel on the UPF network element side, or determine, based on the locally stored information, the IP address and/or the tunnel identifier of the GTP-U tunnel corresponding to the TSN pipe on the UPF network element side. Correspondingly, the foregoing message sent in operation S1107 may include the IP address and/or the tunnel identifier of the GTP-U tunnel corresponding to the TSN pipe on the UPF network element side.

In an embodiment, when the UPF network element receives an uplink user stream from the AN network element and uses a unicast address, or when the UPF network element sends a downlink user stream to the AN network element side and uses a multicast address, the UPF network element may allocate the IP address and/or the tunnel identifier of the GTP-U tunnel corresponding to the TSN pipe on the UPF network element side.

After determining the foregoing information, the UPF network element stores a correspondence among the TSN pipe, the port identifier of the UPF network element on the AN network element side, the GTP-U tunnel (including the IP address and/or the tunnel identifier), and the user stream (the information identifying the user stream).

S1108. The SMF network element sends an N2 session creation request message to the AN network element.

The N2 session creation request message may include the information identifying the data stream.

In an embodiment, the SMF network element may further send, to the AN network element, the port identifier of the AN network element, the information identifying the user stream, and one of the following information: the IP address and/or the tunnel identifier of the GTP-U tunnel corresponding to the TSN pipe, and the IP address and/or the tunnel identifier of the GTP-U tunnel on the UPF network element side. The IP address and/or the tunnel identifier of the GTP-U tunnel corresponding to the TSN pipe correspond/corresponds to a scenario in which the TSN pipe is bound to the GTP-U tunnel. If the IP address and/or the tunnel identifier of the GTP-U tunnel on the UPF network element side correspond/corresponds to a scenario in which the TSN pipe is not bound to the GTP-U tunnel, the AN network element allocates the IP address on the AN side, and then sends the IP address to the SMF network element, and the SMF network element sends the IP address to the UPF network element in a subsequent operation.

For the uplink user stream, in the IP address of the GTP-U tunnel corresponding to the TSN pipe, a source IP address is an IP address of the AN network element, and a destination IP address is an IP address or a multicast address of the UPF network element. For the downlink user stream, in the IP address of the GTP-U tunnel corresponding to the TSN pipe, a destination IP address is the IP address or a multicast address of the AN network element, and a source IP address is the IP address of the UPF network element.

The foregoing information may be carried in the N2 session creation request message. It should be noted that the N2 session creation request sent by the SMF network element to the AN network element may include the port identifier of the AN network element.

It should be noted that operations S1106 and S1108 are optional. For the uplink user stream, only S1108 may be performed, and for the downlink user stream, only S1106 may be performed. In addition, S1108 may not be performed for an uplink user stream that is created at a session granularity.

S1109. The AN network element sends an N2 session creation response message to the SMF network element.

In an embodiment, the AN network element may store the information that is used for identifying the data stream and that is corresponding to the port identifier of the AN network element. The AN network element may determine the TSN pipe based on the information identifying the data stream. The AN network element may determine the port identifier of the AN network element based on the port identifier of the AN network element in the N2 session creation request message or based on the locally stored information. It should be noted that when the AN network element determines the port identifier of the AN network element based on the locally stored information, the N2 session creation request sent by the AN network element to the SMF network element may include the port identifier of the AN network element.

The AN network element may store the IP address and/or the tunnel identifier of the GTP-U tunnel corresponding to the TSN pipe on the AN network element side. If the N2 session creation request message does not include the IP address and/or the tunnel identifier of the GTP-U tunnel corresponding to the TSN pipe on the AN network element side, the AN network element allocates the IP address and/or the tunnel identifier of the GTP-U tunnel corresponding to the TSN pipe on the AN network element side, or determine, based on the locally stored information, the IP address and/or the tunnel identifier of the GTP-U tunnel corresponding to the TSN pipe on the AN network element side.

In an embodiment, when the AN network element receives a downlink user stream from the UPF network element and uses a unicast address, or when the AN network element sends an uplink data stream to the UPF network element and uses a multicast address, the AN network element may allocate the IP address and/or the tunnel identifier of the GTP-U tunnel corresponding to the TSN pipe on the AN network element side. Optionally, the N2 session creation response message may include the IP address and/or the tunnel identifier of the GTP-U tunnel corresponding to the TSN pipe on the AN network element side.

After determining the foregoing information, the AN network element stores a correspondence among the TSN pipe, the port identifier of the AN network element on the UPF side, the GTP-U tunnel (including the IP address and/or the tunnel identifier), and the user stream (the information identifying the user stream).

S1110. The SMF network element sends, to the UPF network element, the IP address and/or the tunnel identifier of the GTP-U tunnel corresponding to the TSN pipe on the AN network element side.

The IP address and/or the tunnel identifier of the GTP-U tunnel corresponding to the TSN pipe on the AN network element side may be carried in a session modification request message.

It should be noted that this operation is optional. If the SMF network element does not send, to the UPF network element in operation S1106, the IP address and/or the tunnel identifier of the GTP-U tunnel corresponding to the TSN pipe on the AN network element side, operation S1110 is performed.

It should be noted that if the control device and the SMF network element are disposed in an integrated manner, interaction between the SMF network element and the control device in FIG. 11A and FIG. 11B may be omitted. This is the same for FIG. 12A and FIG. 12B to FIG. 21H below, and details are not described herein again.

Figure 12A:
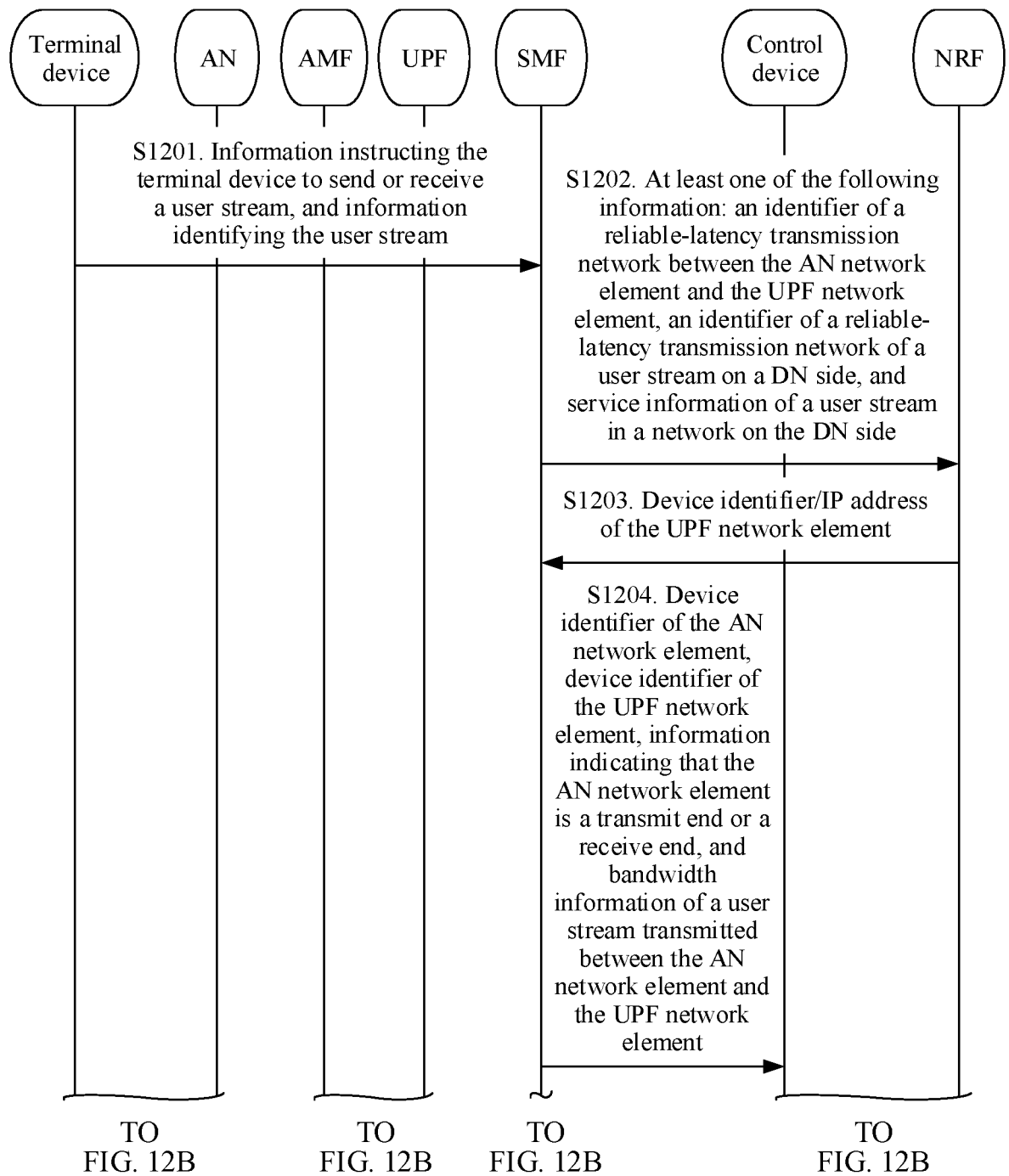
FIG. 12A and FIG. 12B are a schematic diagram 2 of a communication method according to an embodiment of this application.
Figure 12B:
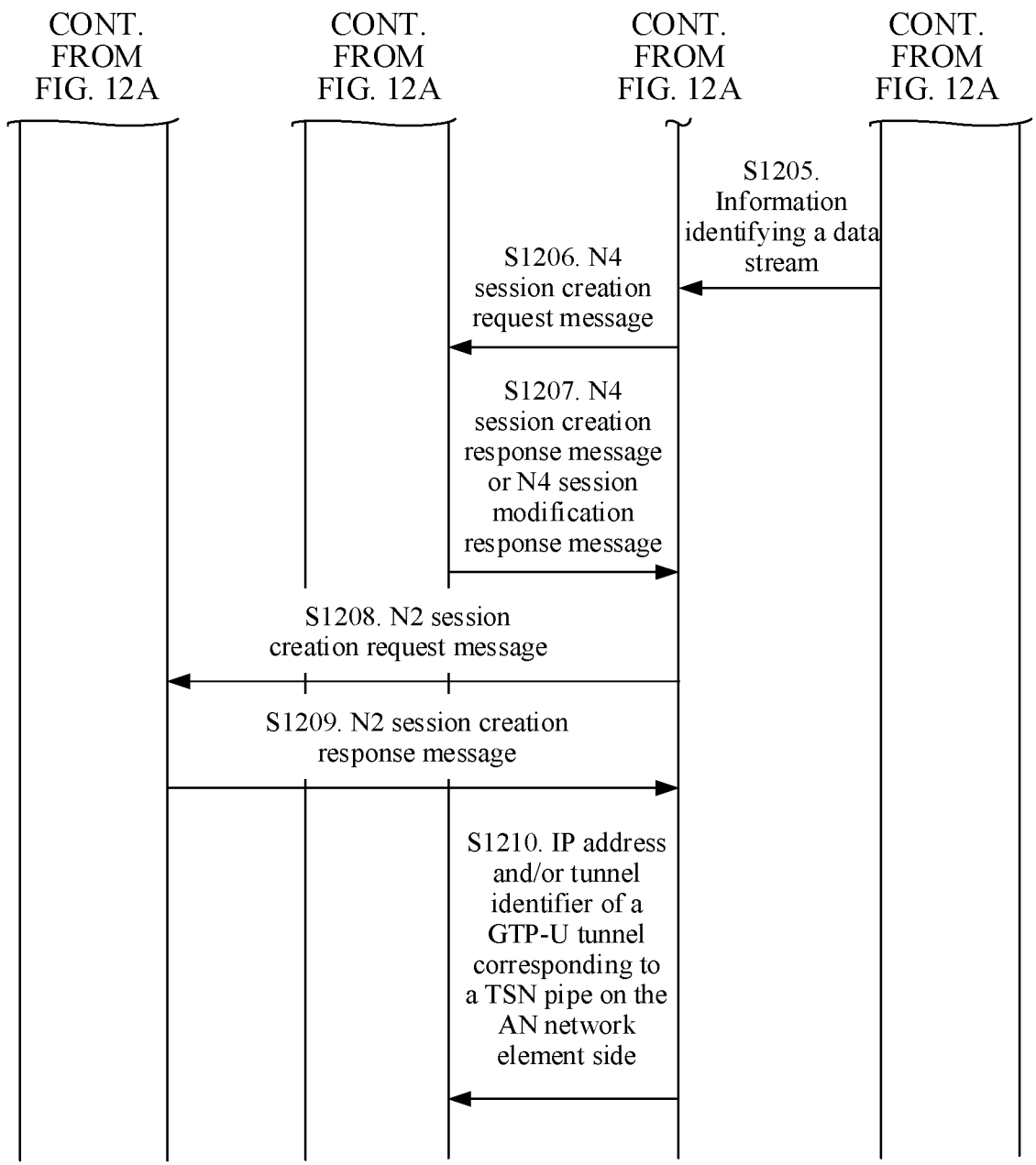

An embodiment of this application provides a communication method. As shown in FIG. 12A and FIG. 12B, the method includes the following operations.

S1201. A terminal device sends, to an SMF network element, information instructing the terminal device to send or receive a user stream, and information identifying the user stream.

For descriptions of this operation, refer to operation S1101. A difference from operation S1101 is described below.

In an embodiment, the terminal device may further send, to the SMF network element by using an AN network element, an identifier of a reliable-latency transmission network of the user stream on a DN side and/or service information (for example, a service identifier and a server address) of the user stream in a network on the DN side.

In an embodiment, when sending a PDU session creation request message to the SMF network element, an AMF network element may send a device identifier of the AN network element and an identifier of a reliable-latency transmission network between the AN network element and a UPF network element to the SMF network element.

S1202. The SMF network element sends, to an NRF network element, at least one of the following information: the identifier of the reliable-latency transmission network between the AN network element and the UPF network element, the identifier of the reliable-latency transmission network of the user stream on the DN side, and the service information of the user stream in the network on the DN side.

The foregoing information is used to request the NRF network element to select the UPF network element.

S1203. The NRF network element obtains a device identifier/IP address of the UPF network element based on at least one of the following information: the identifier of the reliable-latency transmission network between the AN network element and the UPF network element, the identifier of the reliable-latency transmission network of the user stream on the DN side, and the service information of the user stream in the network on the DN side, and sends the device identifier/IP address of the UPF network element to the SMF network element.

For example, a service with a relatively small access range corresponds to a relatively small quantity of AN network elements and UPF network elements, and the corresponding AN network elements and UPF network elements are all located in a TSN network, and the service information of the user stream in the network on the DN side is used to indicate that the TSN network needs to be used for transmission. In this case, the NRF network element may select the UPF network element based on the service information of the user stream in the network on the DN side.

For the identifier of the reliable-latency transmission network between the AN network element and the UPF network element, a TSN network between the AN network element and the UPF network element has a name or an identifier, and is unique in a specific range (for example, a management range of the NRF network element). Therefore, the NRF network element may determine a reachable UPF network element based on the identifier of the reliable-latency transmission network between the AN network element and the UPF network element.

The NRF network element may store a correspondence between the identifier of the reliable-latency transmission network between the AN network element and the UPF network element and the device identifier/IP address of the UPF network element. If the NRF network element receives the identifier of the reliable-latency transmission network between the AN network element and the UPF network element from the SMF network element, the NRF network element may obtain the device identifier/IP address of the corresponding UPF network element based on the identifier of the reliable-latency transmission network between the AN network element and the UPF network element.

The NRF network element may store a correspondence between the identifier of the reliable-latency transmission network of the user stream on the DN side and the device identifier/IP address of the UPF network element. If the NRF network element receives the identifier of the reliable-latency transmission network of the user stream on the DN side from the SMF network element, the NRF network element may obtain the device identifier/IP address of the UPF network element based on the identifier of the reliable-latency transmission network of the user stream on the DN side.

The NRF network element may store a correspondence between the service information (for example, the service identifier and the server address) of the user stream in the network on the DN side and the device identifier/IP address of the UPF network element. If the NRF network element receives the service information of the user stream in the network on the DN side from the SMF network element, the NRF network element may obtain the device identifier/IP address of the UPF network element based on the service information of the user stream in the network on the DN side.

For operations S1204 to S1210, refer to operations S1104 to S1110. Details are not described herein again.

Figure 13A:
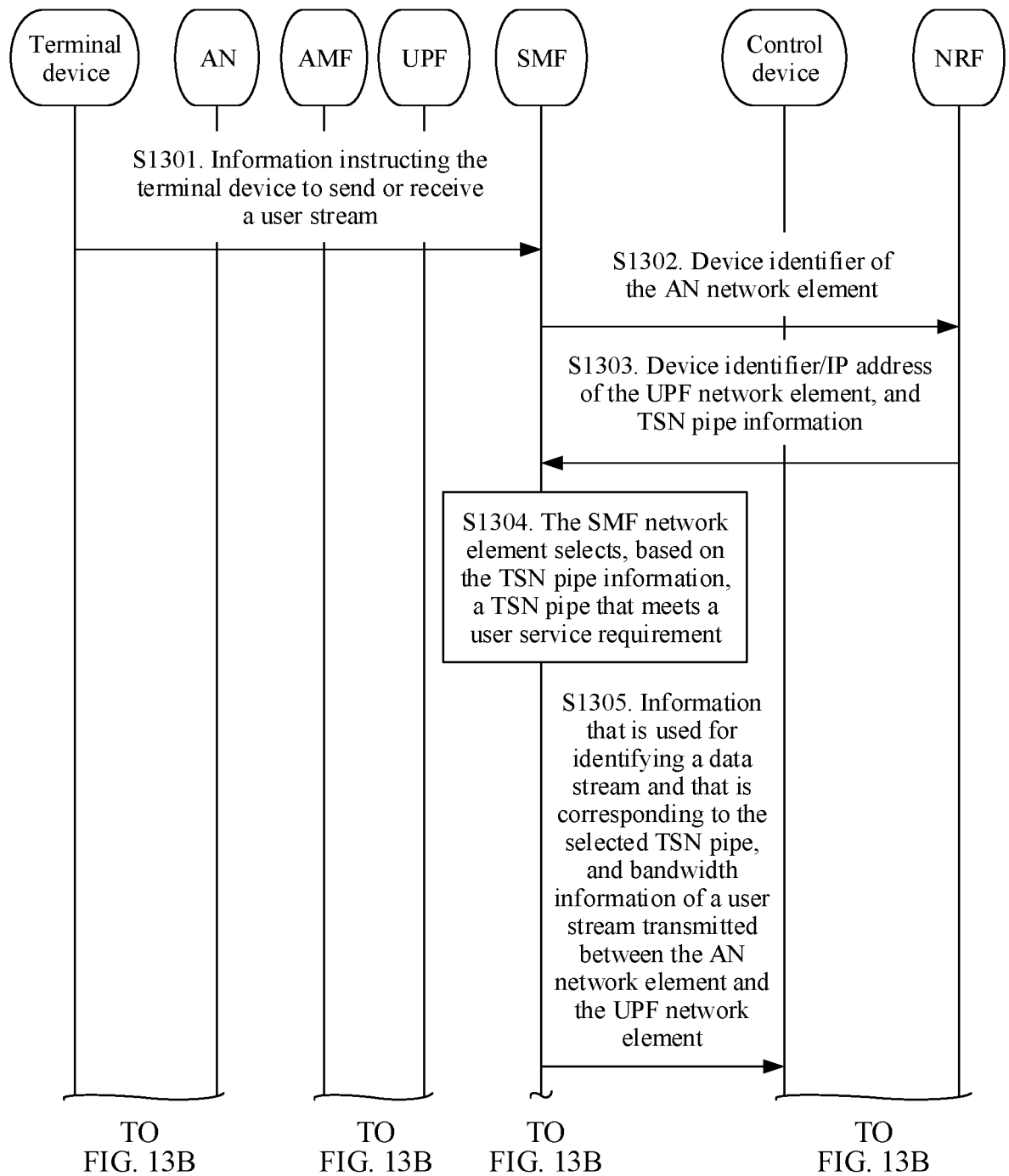
FIG. 13A and FIG. 13B are a schematic diagram 3 of a communication method according to an embodiment of this application.
Figure 13B:
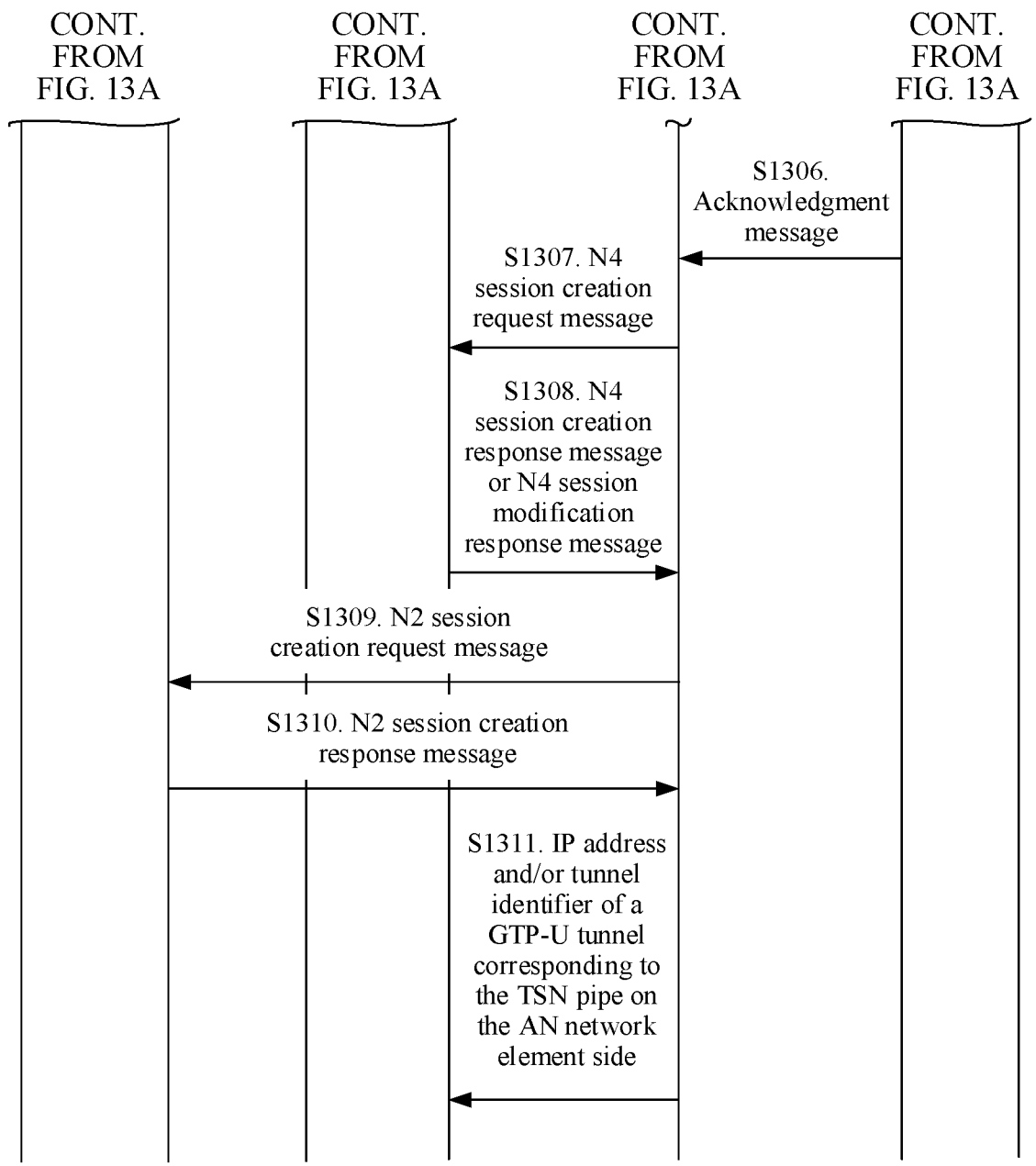

An embodiment of this application provides a communication method. As shown in FIG. 13A and FIG. 13B, the method includes the following operations.

For operations S1301 and S1302, refer to operations S1101 and S1102. Details are not described herein again.

S1303. The NRF network element obtains a device identifier/IP address of the UPF network element and TSN pipe information based on the device identifier of the AN network element, and sends the device identifier/IP address of the UPF network element and the TSN pipe information to the SMF network element.

The NRF network element stores TSN pipe information of a TSN pipe corresponding to the device identifier of the AN network element and the device identifier of the UPF network element, for example, information identifying a data stream, the device identifier of the AN network element, the device identifier of the UPF network element, and bandwidth information of a user stream transmitted between the AN network element and the UPF network element. The NRF network element may obtain, based on the device identifier of the AN network element, a device identifier/IP address of a peer UPF network element that has a TSN pipe between the UPF network element and the AN network element, and TSN pipe information of the TSN pipe between the AN network element and the UPF network element. It should be noted that there may be a plurality of TSN pipes that use the AN network element as the transmit end or the receive end, and correspondingly, there may also be a plurality of information identifying the data stream.

Correspondingly, the SMF network element receives the device identifier/IP address of the UPF network element and the TSN pipe information from the NRF network element.

S1304. The SMF network element selects, based on the TSN pipe information, a TSN pipe that meets a user service requirement.

For example, after the SMF network element receives the TSN pipe information, the SMF network element may select, based on a case in which bandwidth of the data stream is greater than bandwidth required by a user stream, the TSN pipe that meets the user service requirement, or the SMF network element may select, based on a transmission latency of the data stream, the TSN pipe that meets the user service requirement.

S1305. The SMF network element sends, to a control device, information that is used for identifying a data stream and that is corresponding to the selected TSN pipe, and the bandwidth information of the user stream transmitted between the AN network element and the UPF network element.

For example, the SMF network element may obtain, through operation S1301 based on bandwidth information that is of a user stream of the terminal device and that is received from the terminal device, the bandwidth information of the user stream transmitted between the AN network element and the UPF network element. Alternatively, the SMF network element may obtain, based on a configuration, a policy, or an orchestration, the bandwidth information of the user stream transmitted between the AN network element and the UPF network element.

The foregoing information is used to request the control device to allocate bandwidth to the user stream.

S1306. The control device determines the TSN pipe based on the information identifying the data stream, allocates bandwidth from the TSN pipe based on the bandwidth information of the user stream transmitted between the AN network element and the UPF network element, and sends an acknowledgment message to the SMF network element.

For example, the SMF network element sends a pipe identifier "1" to the control device, to indicate that the control device selects a TSN pipe whose pipe identifier is "1", and the control device sends a pipe identifier "2" to the SMF network element, to indicate that the TSN pipe 1 is unavailable and a TSN pipe 2 is to be used.

The control device stores the TSN pipe information, for example, bandwidth information of the TSN pipe and the information identifying the data stream. The control device determines the corresponding TSN pipe based on the information identifying the data stream, allocates the bandwidth to the user stream from the TSN pipe based on the bandwidth information of the user stream transmitted between the AN network element and the UPF network element, and sends, to the SMF network element, the information identifying the data stream for the TSN pipe. Correspondingly, the SMF network element receives the information identifying the data stream from the control device.

For operations S1307 to S1311, refer to operations S1106 to S1110. Details are not described herein again.

Figure 14A:
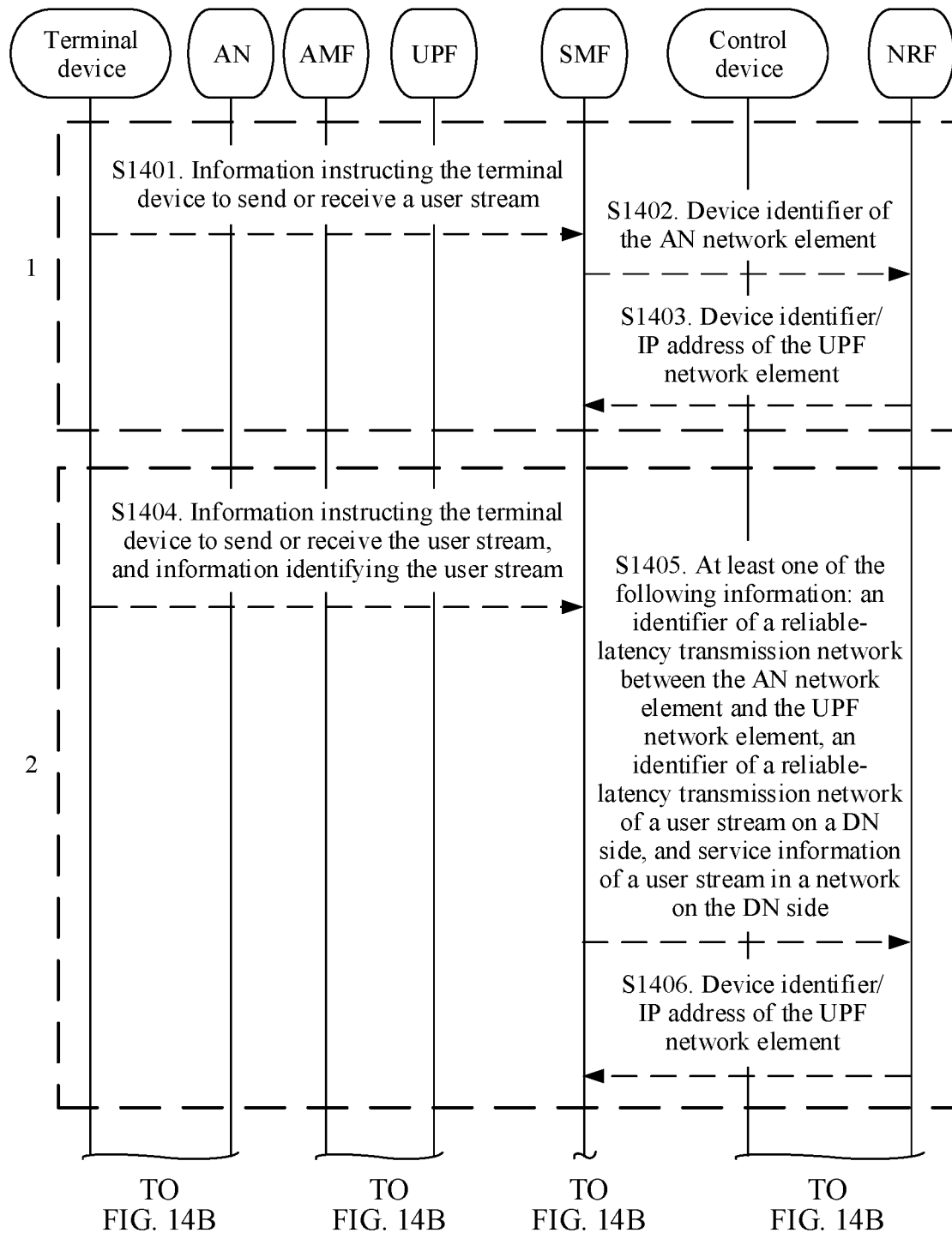
FIG. 14A and FIG. 14B are a schematic diagram 4 of a communication method according to an embodiment of this application.
Figure 14B:
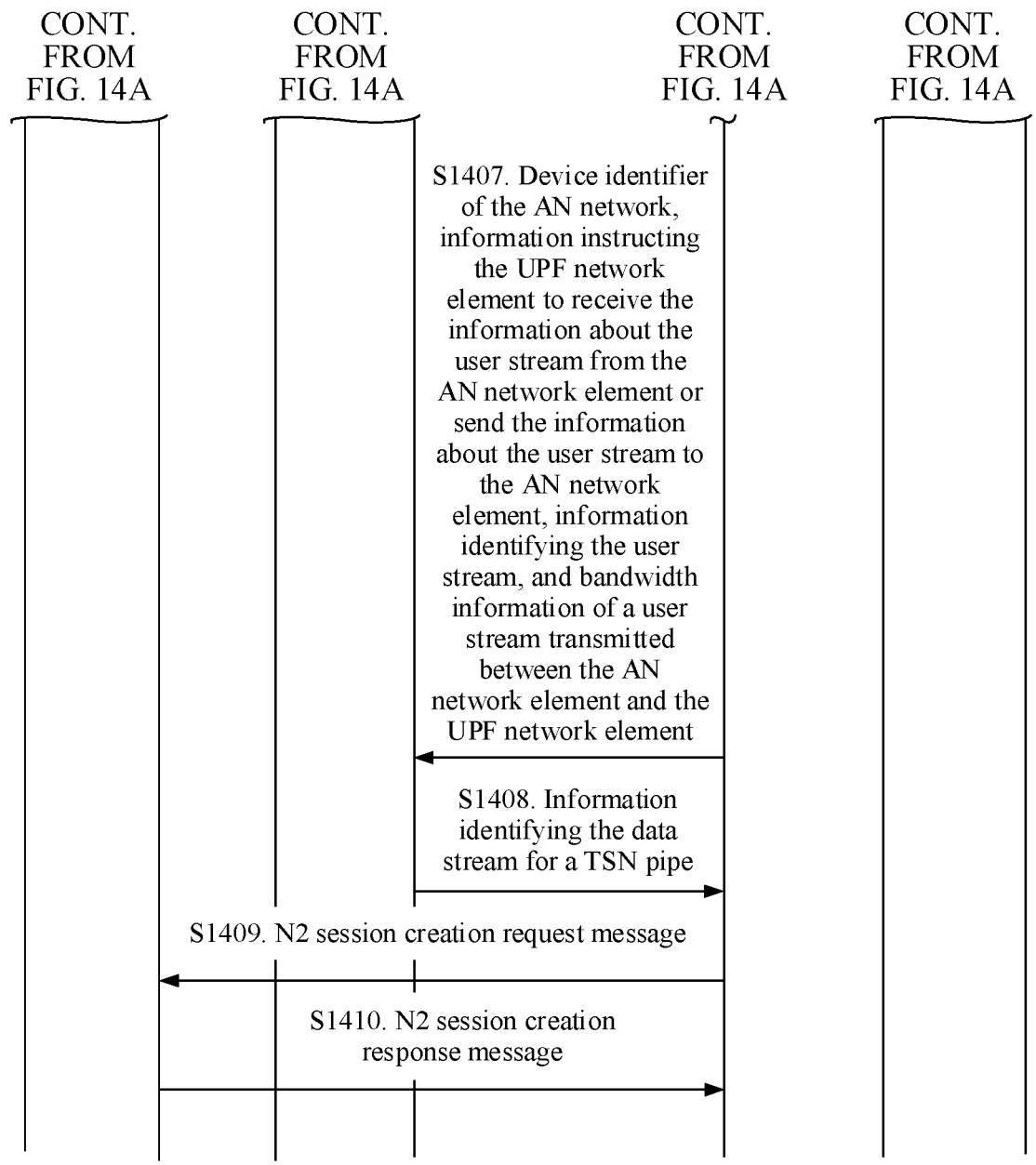

An embodiment of this application provides a communication method. As shown in FIG. 14A and FIG. 14B, the method includes the following operations.

For operations S1401 to S1403, refer to operations S1101 to S1103, and for operations S1404 to S1406, refer to operations S1201 to S1203. Details are not described herein again. It should be noted that operations S1401 to S1403 and operations S1404 to S1406 are two optional parallel solutions.

S1407. The SMF network element sends the device identifier of the AN network element to the UPF network element, and instructs the UPF network element to receive or send, from the AN network element or to the AN network element, information about the user stream, the information identifying the user stream, and bandwidth information of a user stream transmitted between the AN network element and the UPF network element.

The SMF network element may determine, based on the information instructing the terminal device to send or receive the user stream, to instruct the UPF network element to receive or send the information about the user stream from the AN network element or to the AN network element. For example, if the terminal device sends the user stream, the UPF network element receives the user stream from the AN network element; or if the terminal device receives the user stream, the UPF network element sends the user stream to the AN network element.

In operation S1101 corresponding to operation S1401 and operation S1201 corresponding to operation S1404, how the SMF network element obtains the information identifying the user stream and instructs the terminal device to send or receive the information about the user stream, the information identifying the user stream, and the bandwidth information of the user stream transmitted between the AN network element and the UPF network element are described in detail, and details are not described herein again.

The foregoing information may be carried in a session creation request message.

S1408. The UPF network element determines a TSN pipe based on the device identifier of the AN network element and the information instructing the UPF network element to receive or send the information about the user stream from the AN network element or to the AN network element, allocates bandwidth from the TSN pipe based on the bandwidth information of the user stream transmitted between the AN network element and the UPF network element, and sends, to the SMF network element, information identifying a data stream for the TSN pipe.

The UPF network element stores TSN pipe information corresponding to the device identifier of the AN network element, for example, bandwidth information of the TSN pipe and the information identifying the data stream. The TSN pipe is not only related to the device identifier of the AN network element and the device identifier of the UPF network element, but also related to which network element in the AN network element or the UPF network element is the transmit end and which network element is the receive end. Therefore, the UPF network element determines the corresponding TSN pipe based on the device identifier of the AN network element, the device identifier of the UPF network element, and the information instructing the UPF network element to receive or send the information about the user stream from the AN network element or to the AN network element, and obtains the information identifying the data stream for the TSN pipe. Further, the UPF network element may allocate bandwidth to the user stream from the TSN pipe based on the bandwidth information of the user stream transmitted between the AN network element and the UPF network element, and send, to the SMF network element, the information identifying the data stream for the TSN pipe. Correspondingly, the SMF network element receives the information identifying the data stream from the UPF network element.

The foregoing information may be carried in a session creation response message.

If the UPF network element finds no available TSN pipe based on the device identifier of the AN network element/the identifier of the reliable-latency transmission network between the AN network element and the UPF network element, the UPF network element may send, to the SMF network element, information indicating that there is no available TSN pipe or information instructing to create a TSN pipe.

The UPF network element may identify a downlink user stream on the DN side based on the information identifying the user stream. The UPF network element may prestore an IP address and/or a tunnel identifier of a GTP-U tunnel corresponding to the TSN pipe. The UPF network element stores a correspondence among the user stream (the information identifying the user stream), the TSN pipe (the information identifying the data stream), and the GTP-U tunnel (the IP address and/or the tunnel identifier) based on the foregoing information.

S1409. The SMF network element sends an N2 session creation request message to the AN network element.

The N2 session creation request message may include the information identifying the data stream.

In an embodiment, the N2 session creation request message may further include the information identifying the user stream.

S1410. The AN network element sends an N2 session creation response message to the SMF network element.

The AN network element may prestore the IP address and/or the tunnel identifier of the GTP-U tunnel corresponding to the TSN pipe. The AN network element may store the correspondence among the user stream (the information identifying the user stream), the TSN pipe (the information identifying the data stream), and the GTP-U tunnel (the IP address and/or the tunnel identifier) based on the foregoing information.

Figure 15A:
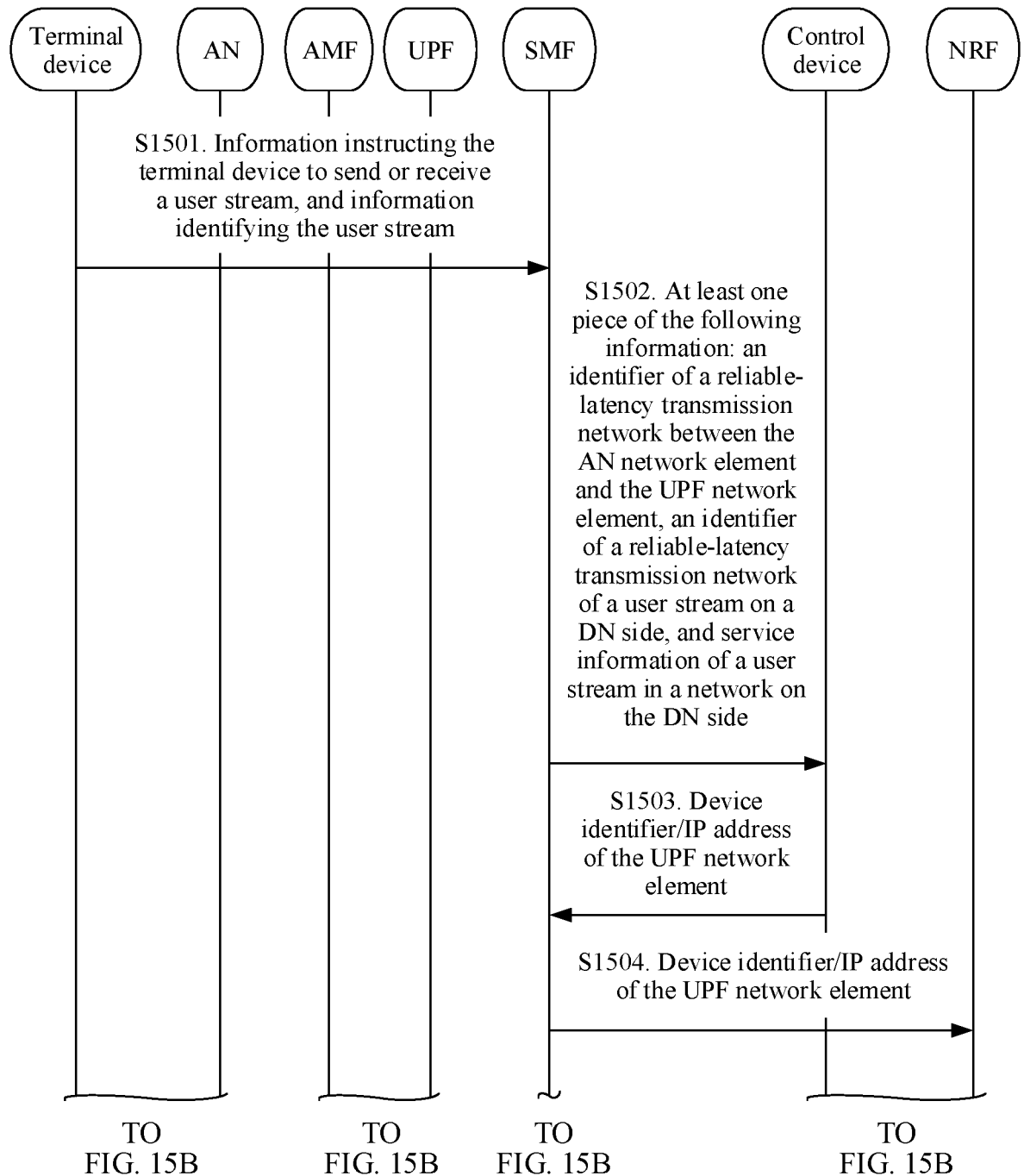
FIG. 15A and FIG. 15B are a schematic diagram 5 of a communication method according to an embodiment of this application.
Figure 15B:
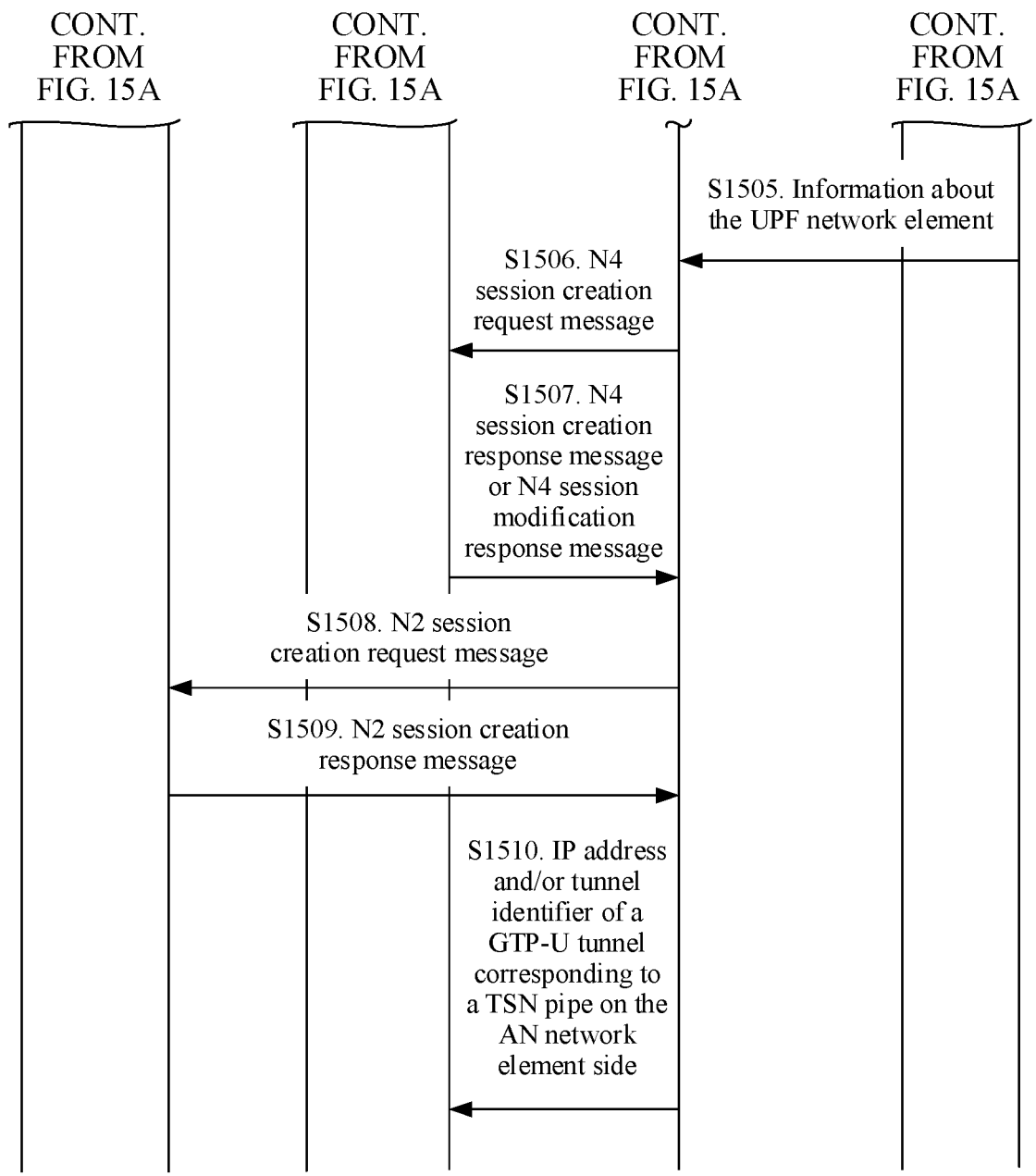

An embodiment of this application provides a communication method. As shown in FIG. 15A and FIG. 15B, the method includes the following operations.

S1501. A terminal device sends, to an SMF network element, information instructing the terminal device to send or receive a user stream, and information identifying the user stream.

For descriptions of this operation, refer to operation S1201. Details are not described herein again.

S1502. The SMF network element sends, to a control device, at least one of the following information: an identifier of a reliable-latency transmission network between an AN network element and a UPF network element, an identifier of a reliable-latency transmission network of the user stream on a DN side, and service information of the user stream in a network on the DN side.

The foregoing information is used to request the control device to select the UPF network element.

S1503. The control device obtains a device identifier/IP address of the UPF network element based on at least one of the following information: the identifier of the reliable-latency transmission network between the AN network element and the UPF network element, the identifier of the reliable-latency transmission network of the user stream on the DN side, and the service information of the user stream in the network on the DN side, and sends the device identifier/IP address of the UPF network element to the SMF network element.

The control device may store a correspondence between the identifier of the reliable-latency transmission network between the AN network element and the UPF network element and the device identifier/IP address of the UPF network element. If the control device receives the identifier of the reliable-latency transmission network between the AN network element and the UPF network element from the SMF network element, the control device may obtain the device identifier/IP address of the UPF network element based on the identifier of the reliable-latency transmission network between the AN network element and the UPF network element.

The control device may store a correspondence between the identifier of the reliable-latency transmission network of the user stream on the DN side and the device identifier/IP address of the UPF network element. If the control device receives the identifier of the reliable-latency transmission network of the user stream on the DN side from the SMF network element, the control device may obtain the device identifier/IP address of the UPF network element based on the identifier of the reliable-latency transmission network of the user stream on the DN side.

The control device may store a correspondence between the service information (for example, a service identifier and a server address) of the user stream in the network on the DN side and the device identifier/IP address of the UPF network element. If the control device receives the service information of the user stream in the network on the DN side from the SMF network element, the control device may obtain the device identifier/IP address of the UPF network element based on the service information of the user stream in the network on the DN side.

S1504. The SMF network element sends the device identifier/IP address of the UPF network element to an NRF network element.

The foregoing information is used to request other information about the UPF network element, for example, a supported service and an address corresponding to the service.

S1505. The NRF network element sends information about the UPF network element to the SMF network element.

For operations S1506 to S1510, refer to operations S1206 to S1210. Details are not described herein again.

Figure 16:
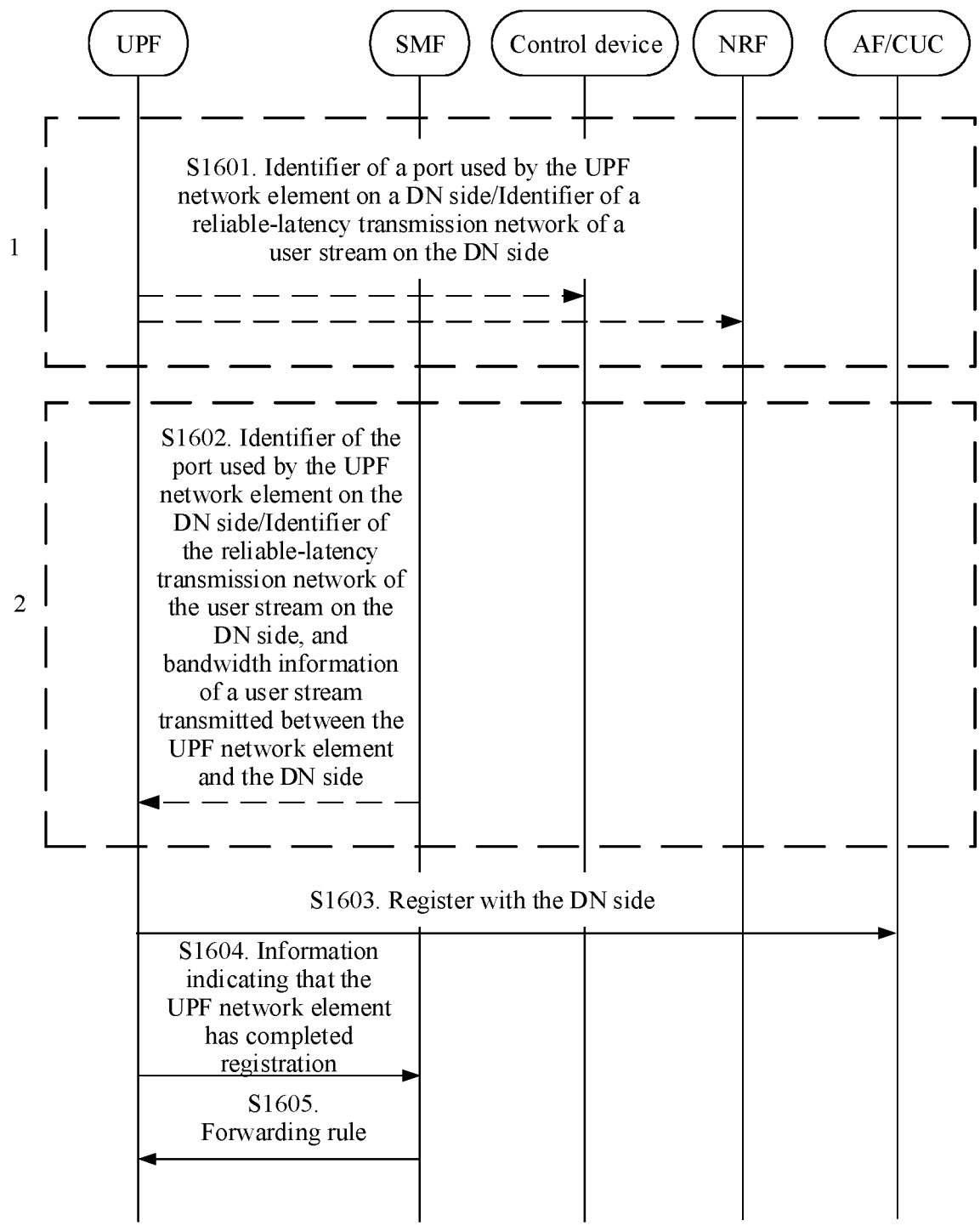
FIG. 16 is a schematic diagram 6 of a communication method according to an embodiment of this application.
Figure 17:
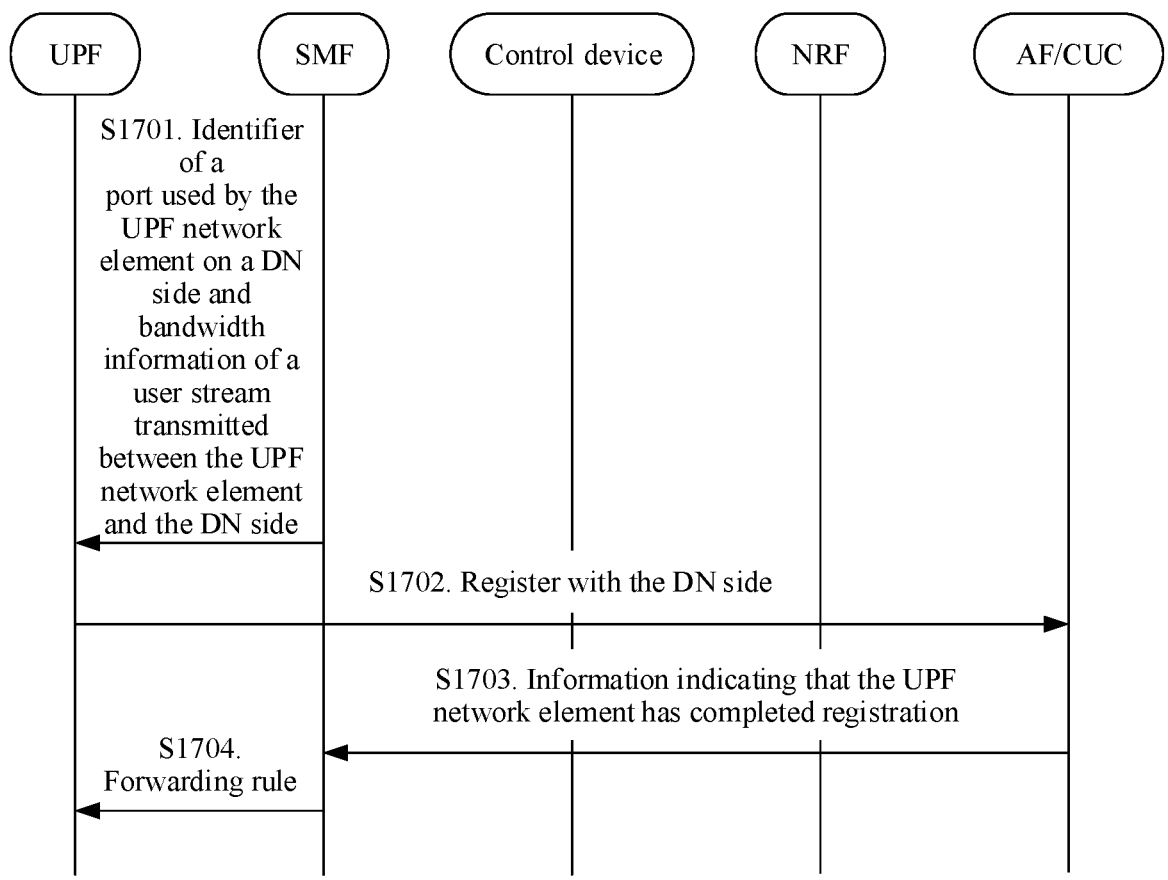
FIG. 17 is a schematic diagram 7 of a communication method according to an embodiment of this application.
Figure 18:
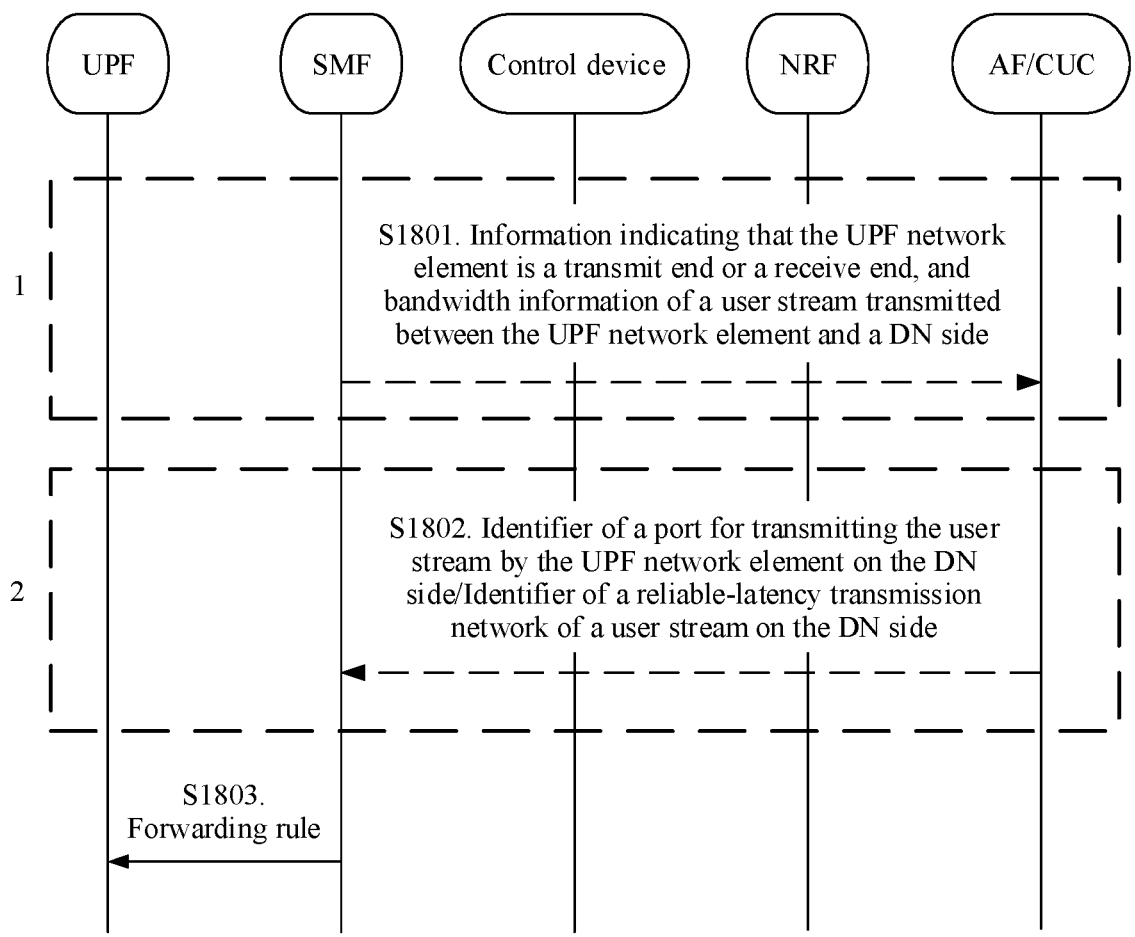
FIG. 18 is a schematic diagram 8 of a communication method according to an embodiment of this application.
Figure 19A:
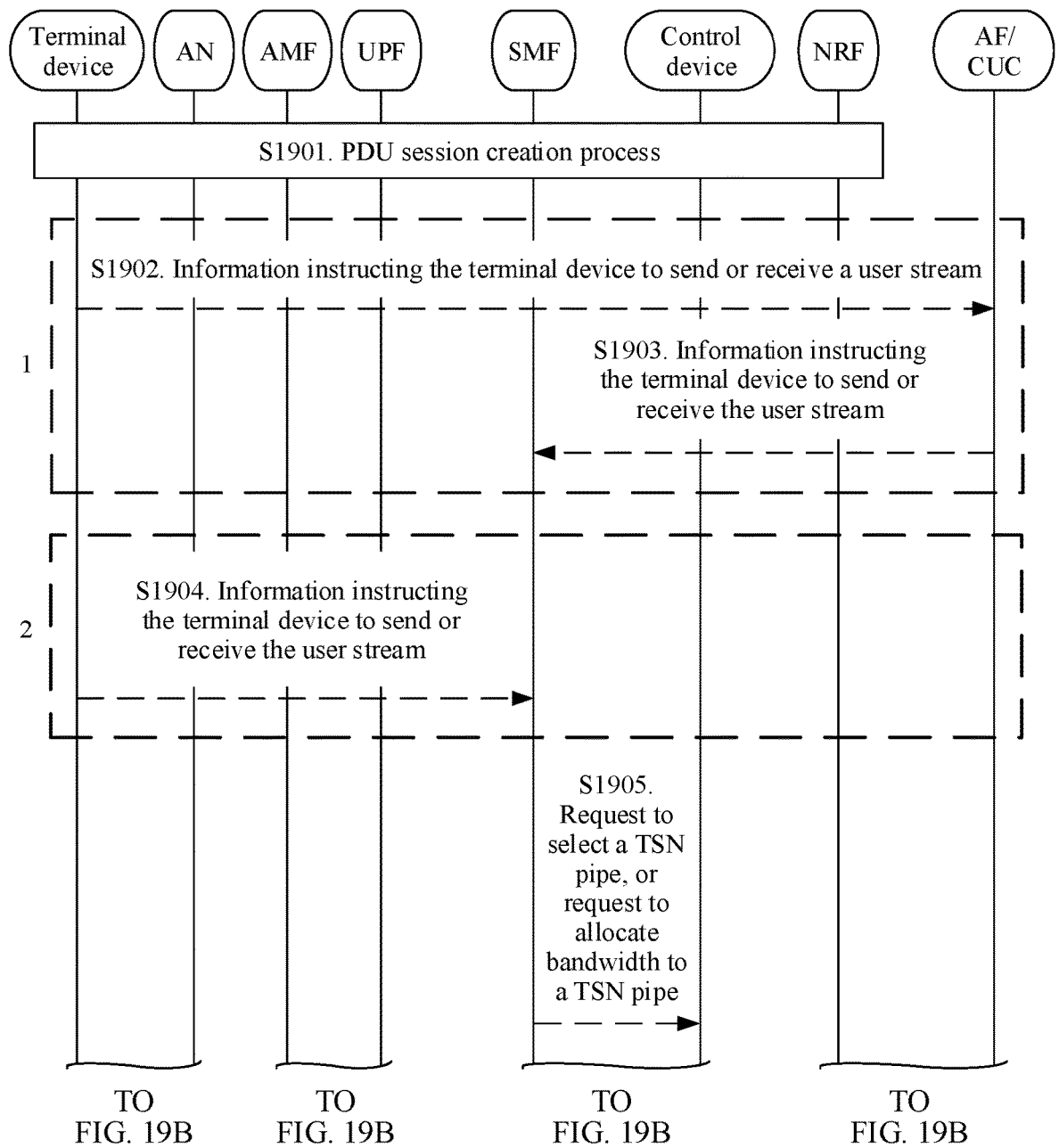
FIG. 19A and FIG. 19B are a schematic diagram 9 of a communication method according to an embodiment of this application.
Figure 19B:
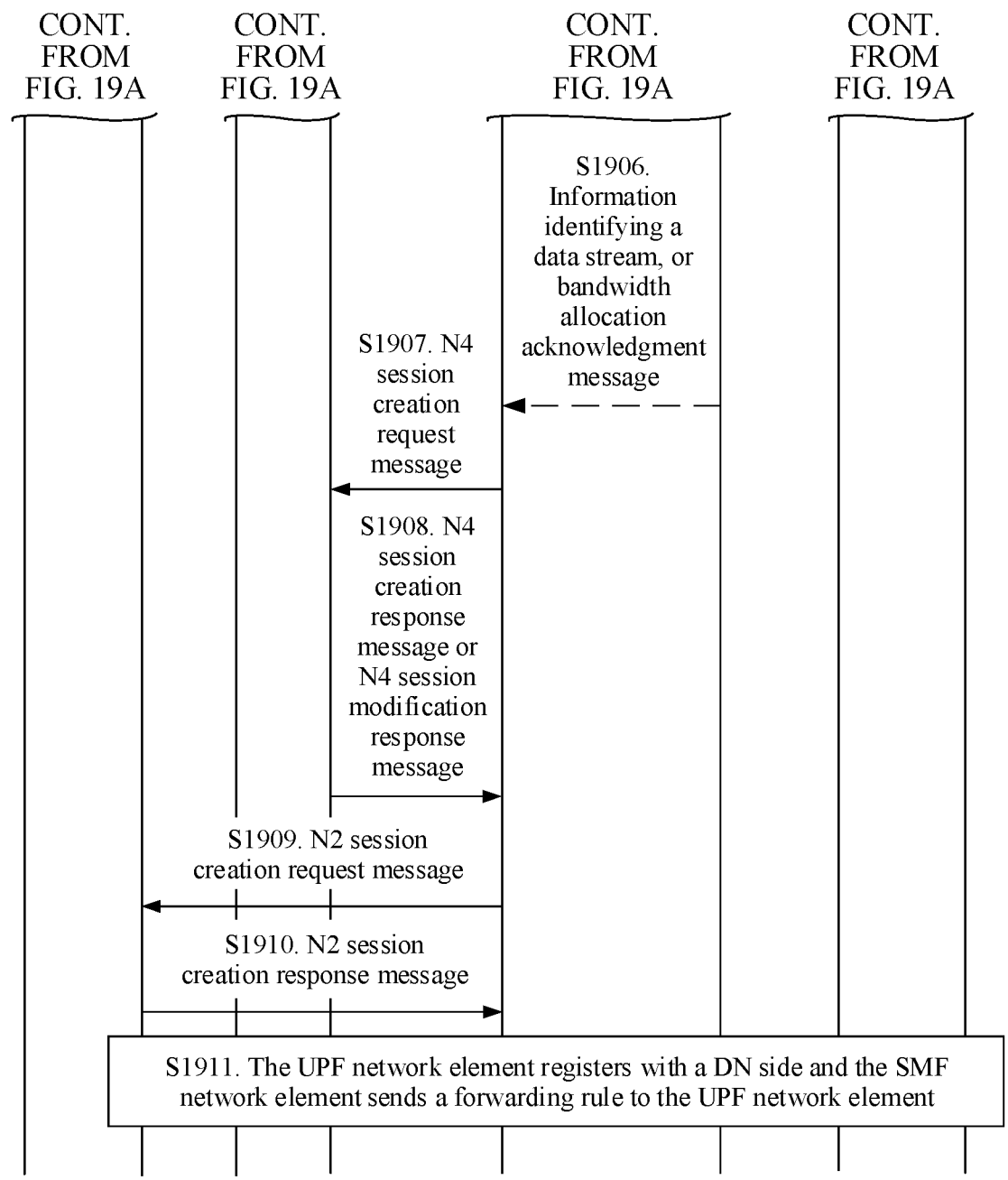

In processes in FIG. 16 to FIG. 18, a forwarding channel is finally created on a DN side, and a forwarding rule of transmitting a user stream by a UPF network element on the DN side is created on the UPF network element.

For sending of a user stream by a user, the UPF network element sends the user stream to the DN by using a specific port on the DN side.

For receiving of a user stream by a user, the UPF network element receives the user stream from a specific port on the DN side.

An embodiment of this application provides a communication method, and the communication method is used by a control plane network element to select a port for transmitting a user stream by a UPF network element on a DN side. As shown in FIG. 16, the method includes the following operations. Operation S1601 and operation S1602 are two parallel optional solutions, and either of the two solutions may be performed.

S1601. A UPF network element sends, to a control device or an NRF network element, an identifier of a port for transmitting a user stream by the UPF network element on a DN side/an identifier of a reliable-latency transmission network of the user stream on the DN side.

A function of operation 1601 is that the UPF network element registers with the control device or the NRF network element. After this operation is performed, processes of selecting the UPF network element and determining a TSN pipe between an AN network element and the UPF network element in FIG. 11A and FIG. 11B to FIG. 15A and FIG. 15B may be performed. The NRF network element or the control device may determine a device identifier/IP address of the UPF network element (or in other words, select the UPF network element) based on the foregoing information, and send, to an SMF network element, the port identifier for instructing the UPF network element to transmit the user stream on the DN side/the identifier of the reliable-latency transmission network of the user stream on the DN side. Correspondingly, the SMF network element may obtain, from the NRF network element or the control device, the identifier of the port for transmitting the user stream by the UPF network element on the DN side/the identifier of the reliable-latency transmission network of the user stream on the DN side. The SMF network element may determine, based on the identifier of the port for transmitting the user stream by the UPF network element on the DN side/the identifier of the reliable-latency transmission network of the user stream on the DN side, the identifier of the port for transmitting the user stream by the UPF network element on the DN side. Therefore, operation 1601 is a prerequisite. In addition, that the UPF network element registers with the NRF network element is a prerequisite for the UPF network element to implement another function.

The identifier of the reliable-latency transmission network of the user stream on the DN side is associated with the identifier of the port for transmitting the user stream by the UPF network element on the DN side.

S1602. An SMF network element sends, to a UPF network element, an identifier of a port for transmitting a user stream by the UPF network element on a DN side/an identifier of a reliable-latency transmission network of the user stream on the DN side, and bandwidth information of a user stream transmitted between the UPF network element and the DN side.

The foregoing information is used to instruct the UPF network element to register a transmit end or a receive end with the DN side. The identifier of the reliable-latency transmission network of the user stream on the DN side corresponds to the identifier that is determined by the UPF network element and that is of the port for transmitting the user stream by the UPF network element on the DN side.

In an embodiment, the SMF network element may further send, to the UPF network element, information identifying the user stream.

S1603. The UPF network element registers with the DN side.

The UPF network element sends, to a network element in a TSN network on the DN side, the identifier of the port for transmitting the user stream by the UPF network element on the DN side/the identifier of the reliable-latency transmission network of the user stream on the DN side, the bandwidth information of the user stream transmitted between the UPF network element and the DN side, and information indicating that the UPF network element is the transmit end or the receive end, to be registered as the transmit end or the receive end in the TSN network on the DN side.

Alternatively, the UPF network element sends an SRP request message by using a specific port corresponding to the identifier of the port, and waits for a response. The SRP request message includes the foregoing information. In this case, the UPF network element is registered as the transmit end in the TSN network on the DN side. Alternatively, the UPF network element waits for an SRP request message on a specific port on the DN side and sends an SRP response message to the port. The SRP response message includes the foregoing information. In this case, the UPF network element is registered as the receive end in the TSN network on the DN side.

In an embodiment, when the UPF network element registers with the DN side, or the sent SRP request message or SRP response message may further include the information identifying the user stream, the information identifying the user stream is used by a network element on the DN side to identify the user stream.

The UPF network element may obtain, based on a direction of the TSN pipe between the AN network element and the UPF network element, the information indicating that the UPF network element is the transmit end or the receive end.

For example, the network element in the TSN network on the DN side may be an AF network element or a CUC network element in the TSN network on the DN side.

S1604. After completing the registration, the UPF network element sends, to the SMF network element, information indicating that the UPF network element has completed the registration.

S1605. The SMF network element sends a forwarding rule to the UPF network element.

As shown in FIG. 11A and FIG. 11B to FIG. 15A and FIG. 15B, in the process of determining the TSN pipe between the AN network element and the UPF network element, the SMF network element sends, to the UPF network element, information that is used for identifying a data stream and that is of the UPF network element on the AN side or an identifier of a port for transmitting a user stream by the UPF network element on the AN side by using the TSN pipe. In addition, after performing operation S1601 or S1602, the UPF network element learns of the identifier of the port for transmitting the user stream by the UPF network element on the DN side.

Therefore, the UPF network element may associate a forwarding rule on the DN side with a forwarding rule on the AN side. For example, the UPF network element may establish the following correspondence: a correspondence between the identifier of the port for transmitting the user stream by the UPF network element on the DN side and the information that is used for identifying the data stream and that is of the UPF network element on the AN side, or a correspondence between the identifier of the port for transmitting the user stream by the UPF network element on the DN side and the identifier of the port for transmitting the user stream by the UPF network element on the AN side by using the TSN pipe. It should be noted that, that the UPF network element determines the forwarding rule on the DN side based on the identifier of the port for transmitting the user stream by the UPF network element on the DN side is an implementation in which the UPF network element transmits the user stream on the DN side.

An embodiment of this application provides a communication method, and the communication method is used by a UPF network element to select a port for transmitting a user stream by the UPF network element on a DN side. As shown in FIG. 17, the method includes the following operations.

S1701. An SMF network element sends, to a UPF network element, an identifier of a reliable-latency transmission network of a user stream on a DN side and bandwidth information of a user stream transmitted between the UPF network element and the DN side.

The foregoing information is used to instruct the UPF network element to register a transmit end or a receive end with the DN side. For example, the identifier of the reliable-latency transmission network of the user stream on the DN side corresponds to a TSN pipe that is on the DN side and that is selected by the SMF network element, or the identifier of the reliable-latency transmission network of the user stream on the DN side is used to request the UPF network element to select a TSN pipe in a subsequent process of registering with the DN side. The selected TSN pipe includes data stream direction information. The UPF network element may indirectly determine, based on the data stream direction information, whether the UPF network element is the receive end or the transmit end on the DN side.

In an embodiment, the SMF network element may send, to the UPF network element, information identifying the user stream. The information identifying the user stream is used by the UPF network element to identify the user stream on the DN side, and is used to identify the user stream when a reliable-latency transmission stream of the UPF on the DN side is created.

S1702. The UPF network element registers with the DN side.

The UPF network element may obtain, based on the identifier of the reliable-latency transmission network of the user stream on the DN side, an identifier of a port for transmitting the user stream by the UPF network element in a TSN network.

For a process in which the UPF network element registers with the DN side, refer to the descriptions of operation S1603. Details are not described herein again.

For operations S1703 and S1704, refer to operations S1604 and S1605. Details are not described herein again.

An embodiment of this application provides a communication method. As shown in FIG. 18, the method includes operations S1801 to S1803. Operations S1801 and S1802 are parallel optional solutions, and either of the parallel optional solutions may be performed.

S1801. An SMF network element sends, to a network element on a DN side, information indicating that a UPF network element is a transmit end or a receive end, and bandwidth information of a user stream transmitted between the UPF network element and the DN side The foregoing information is used to instruct the network element on the DN side to register the UPF network element as the transmit end or the receive end.

In an embodiment, the SMF network element may send, to the network element on the DN side, an identifier of a port for transmitting the user stream by the UPF network element on the DN side/an identifier of a reliable-latency transmission network of the user stream on the DN side, and information identifying the user stream. The information identifying the user stream is used by the UPF network element to identify the user stream on the DN side, and is used to identify the user stream when a reliable-latency transmission user stream of the UPF network element on the DN side is created.

For example, the network element on the DN side may be an AF network element or a CUC network element on the DN side.

S1802. A network element on a DN side sends, to an SMF network element, an identifier of a port for transmitting a user stream by a UPF network element on the DN side/an identifier of a reliable-latency transmission network of the user stream on the DN side.

The identifier of the reliable-latency transmission network of the user stream on the DN side is associated with the identifier of the port for transmitting the user stream by the UPF network element on the DN side.

The foregoing message may be carried in a registration response message.

It should be noted that operation S1802 may be performed by the network element on the DN side when the SMF network element does not perform S1801.

S1803. The SMF network element sends a forwarding rule to the UPF network element.

The SMF network element may send, to the UPF network element, the identifier of the port for transmitting the user stream by the UPF network element on the DN side/the identifier of the reliable-latency transmission network of the user stream on the DN side. The identifier of the reliable-latency transmission network of the user stream on the DN side is used by the UPF network element to determine the identifier of the port for transmitting the user stream by the UPF network element on the DN side.

The SMF network element may further send, to the UPF network element, information that is used for identifying a data stream and that is of the UPF network element on an AN side and an identifier of a port for transmitting the user stream by the UPF network element on the AN side by using a TSN pipe. The UPF network element associates a forwarding rule on the DN side with a forwarding rule on the AN side. For related content, refer to operation S1605. Details are not described herein again.

In a process in FIG. 19A and FIG. 19B, a forwarding rule of transmitting a user stream by a UPF network element on a DN side is created on the UPF network element, and the forwarding rule of transmitting the user stream by the UPF network element on the DN side is created.

An embodiment of this application provides a communication method. As shown in FIG. 19A and FIG. 19B, the method includes the following operations.

S1901. PDU session creation process.

In this process, a process of selecting a UPF network element in FIG. 12A and FIG. 12B to FIG. 16 is performed, and GTU-U tunnel information such as an IP address and/or an identifier of a GTP-U tunnel on an AN network element and the UPF network element is determined. However, a terminal device does not indicate, in a session creation request, information identifying a user stream and bandwidth information of a user stream of the terminal device.

After creation of a PDU session is completed, optionally, operations S1902 and S1903 may be performed or S1904 may be performed.

S1902. The terminal device sends, to a network element on a DN side, information instructing the terminal device to send or receive the user stream.

In an embodiment, the terminal device may send, to the network element on the DN side, the information identifying the user stream, and/or an identifier of a reliable-latency transmission network of the user stream on the DN side, and/or service information of the user stream in a network on the DN side. The terminal device may obtain, through configuration or from a server by using an application layer, the information identifying the user stream, and/or the identifier of the reliable-latency transmission network of the user stream on the DN side, and/or the service information of the user stream in the network on the DN side.

In an embodiment, the terminal device may send, to the network element on the DN side, bandwidth information of a user stream transmitted between the UPF network element and the DN side.

The bandwidth information of the user stream transmitted between the UPF network element and the DN side may be obtained by the terminal device from a network side network element, or may be obtained by the terminal device from the server by using the application layer.

For example, the network element on the DN side may be an AF network element or a CUC network element on the DN side.

S1903. The network element on the DN side sends, to an SMF network element, the information instructing the terminal device to send or receive the user stream.

In an embodiment, the network element on the DN side may send, to the SMF network element, the information identifying the user stream, and/or the identifier of the reliable-latency transmission network of the user stream on the DN side, and/or the service information of the user stream in the network on the DN side. The SMF network element may determine, based on the information identifying the user stream or the service information of the user stream in the network on the DN side, the identifier of the reliable-latency transmission network of the user stream on the DN side, or an identifier of a port for transmitting the user stream by the UPF network element on the DN side.

In an embodiment, the network element on the DN side may send, to the SMF network element, the bandwidth information of the user stream transmitted between the UPF network element and the DN side.

In an embodiment, the network element on the DN side may further send, to the SMF network element, the identifier of the port for transmitting the user stream by the UPF network element on the DN side or the identifier of the reliable-latency transmission network of the user stream on the DN side. The identifier of the reliable-latency transmission network of the user stream on the DN side is associated with the identifier of the port for transmitting the user stream by the UPF network element on the DN side.

It should be noted that operation S1902 is optional. The network element on the DN side may actively perform operation S1903, and the network element on the DN side may obtain the foregoing sent information based on configuration information (for example, service data of a user). For example, for a user stream, the terminal device may be configured as a transmit end, and for another stream, the terminal device may be configured as a receive end.

S1904. The terminal device sends, to an SMF network element, information instructing the terminal device to send or receive the user stream.

In an embodiment, the terminal device may send, to the SMF network element, the information identifying the user stream, and/or an identifier of a reliable-latency transmission network of the user stream on a DN side, and/or service information of the user stream in a network on the DN side. The SMF network element may determine, based on the information identifying the user stream or the service information of the user stream in the network on the DN side, the identifier of the reliable-latency transmission network of the user stream on the DN side, or an identifier of a port for transmitting the user stream by the UPF network element on the DN side.

In an embodiment, the terminal device may send, to the network element on the DN side, bandwidth information of a user stream transmitted between the UPF network element and the DN side.

The following operations S1905 and S1906 are optional, and are used by a control device to select a TSN pipe to transmit the user stream. If operations S1905 and S1906 are not performed, the SMF network element may select the TSN pipe.

S1905. The SMF network element sends, to the control device, a message of requesting to select the TSN pipe, or after selecting the TSN pipe, the SMF network element requests the control device to allocate bandwidth from the TSN pipe.

The SMF network element may determine a transmission direction of the user stream based on the information instructing the terminal device to send or receive the user stream, to select the TSN pipe corresponding to the transmission direction, or request the control device to select the TSN pipe. The SMF network element obtains, based on the selected TSN pipe, the corresponding information identifying the data stream The SMF network element requests the control device to select the TSN pipe. Alternatively, the SMF network element selects the TSN pipe, and when requesting the control device to allocate the bandwidth from the TSN pipe, the SMF network element indicates, to the control device, bandwidth information of a user stream transmitted between the AN network element and the UPF network element. That is, the SMF network element directly calculates the bandwidth information of the user stream transmitted between the AN network element and the UPF network element, and indicates the bandwidth information to the control device. Alternatively, because GTP-U packet header encapsulation or the like needs to be added to the user stream transmitted between the AN network element and the UPF network element, and occupied bandwidth changes, the SMF network element may instruct the control device to calculate, based on the bandwidth information of the user stream transmitted between the UPF network element and the DN side, the bandwidth information required for the user stream transmitted between the AN network element and the UPF network element.

S1906. The control device sends, to the SMF network element, the information identifying the data stream, or a bandwidth allocation acknowledgment message.

For operations S1907 to S1910, refer to operations S1106 to S1109. A difference lies in that because the GTU-U tunnel information such as the IP address and/or the identifier of the GTP-U tunnel on the AN network element and the UPF network element is determined in operation S1901, the GTU-U tunnel information such as the IP address and/or the identifier of the GTP-U tunnel may not need to be sent to the AN network element and the UPF network element in operations S1907 to S1910.

S1911. The UPF network element registers with the DN side, and the SMF network element sends a forwarding rule to the UPF network element.

For operation S1911, refer to operations S1602 to S1605, or operations S1702 to S1705, or operations S1802 to S1804. Details are not described herein again.

It should be noted that operation S1911 may be performed at any time after operation S1902, and operation S1911 may be alternatively performed in combination with operations S1907 and S1908.

Figure 20:
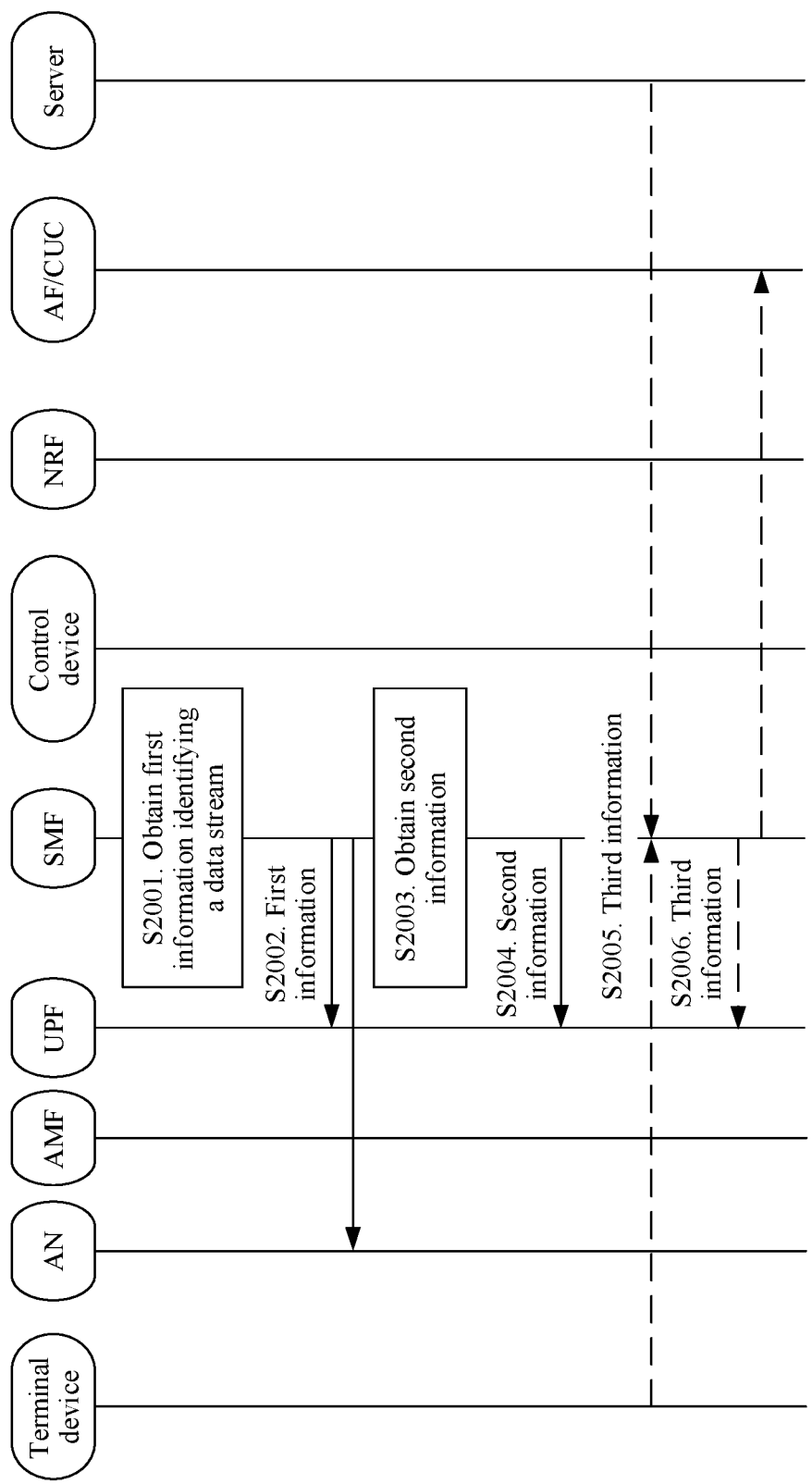
FIG. 20 is a schematic diagram 10 of a communication method according to an embodiment of this application.

An embodiment of this application provides a communication method. As shown in FIG. 20, the method includes the following operations.

S2001. An SMF network element obtains first information identifying a data stream.

The first information is used to instruct a transmit end to send a user stream by using the data stream and is further used to instruct a receive end to receive the user stream by using the data stream; and the receive end is an AN network element, and the transmit end is a UPF network element, or the receive end is the UPF network element, and the transmit end is the AN network element.

The SMF network element may obtain, in the following several manners, the first information identifying the data stream.

In an embodiment, a control device may send the first information to the SMF network element. Correspondingly, the SMF network element may receive the first information from the control device. For this implementation, refer to operation S1906. Details are not described herein again.

In an embodiment, the SMF network element may send a device identifier of the AN network element, a device identifier of the UPF network element, and first indication information to a control device, where the first indication information is used to indicate that the AN network element is the transmit end or the receive end. Correspondingly, the control device receives the device identifier of the AN network element, the device identifier of the UPF network element, and the first indication information from the SMF network element. The control device obtains, based on the device identifier of the AN network element, the device identifier of the UPF network element, and the first indication information, the first information identifying the data stream. The control device sends the first information to the SMF network element. Correspondingly, the SMF network element receives, from the control device, the first information corresponding to the following: the device identifier of the AN network element, the device identifier of the UPF network element, and the first indication information. For this implementation, refer to operations S1104 and S1105. Details are not described herein again.

Further, in a possible implementation, the SMF network element may further send first bandwidth information to the control device, where the first bandwidth information is bandwidth information of a user stream transmitted between the AN network element and the UPF network element. Correspondingly, the control device receives the first bandwidth information from the SMF network element. The control device obtains, based on the device identifier of the AN network element, the device identifier of the UPF network element, the first indication information, and the first bandwidth information, the first information identifying the data stream. The control device sends the first information to the SMF network element. Correspondingly, the SMF network element receives, from the control device, the first information corresponding to the following: the device identifier of the AN network element, the device identifier of the UPF network element, the first indication information, and the first bandwidth information. For this implementation, refer to operation S1104. Details are not described herein again.

The following describes how to obtain the first bandwidth information, the first indication information, the device identifier of the AN network element, and the device identifier of the UPF network element.

The SMF network element may obtain the first bandwidth information in the following manner.

In an embodiment, a terminal device may send second bandwidth information to the SMF network element, where the second bandwidth information is bandwidth information of a user stream of the terminal device. Correspondingly, the SMF network element may receive the second bandwidth information from the terminal device. The SMF network element obtains the first bandwidth information based on the second bandwidth information. For this implementation, refer to operations S1101 and S1104. Details are not described herein again.

It should be noted that the control device may not only obtain the first bandwidth information from the SMF network element, but also obtain the first bandwidth information based on a configuration, a policy, or an orchestration.

The SMF network element may obtain the first indication information in the following manners.

In an embodiment, the SMF network element may obtain the first indication information based on second indication information, where the second indication information is used to instruct the terminal device to send or receive the user stream. For this implementation, refer to operation S1104. Details are not described herein again.

Further, in a possible embodiment, the terminal device may send the second indication information to the SMF network element. Correspondingly, the SMF network element may receive the second indication information from the terminal device. For this implementation, refer to operation S1101. Details are not described herein again.

The SMF network element may obtain the device identifier of the AN network element in the following manner.

In an embodiment, the SMF network element may receive the device identifier of the AN network element from the AN network element or an AMF network element. For this implementation, refer to operation S1101. Details are not described herein again.

The SMF network element may obtain the device identifier of the UPF network element in the following manner.

In an embodiment, the SMF network element may obtain the device identifier of the UPF network element based on third indication information, where the third indication information includes at least one of the following information: the device identifier of the AN network element, an identifier of a reliable-latency transmission network between the AN network element and the UPF network element, an identifier of a reliable-latency transmission network of the user stream on a DN side, and service information of the user stream in a network on the DN side. For this implementation, refer to operations S1103, and S1202 and S1203. Details are not described herein again.

In an embodiment, the SMF network element may receive the third indication information from the AN network element or the AMF network element. The terminal device may send, to the SMF network element by using the AN network element, the identifier of the reliable-latency transmission network of the user stream on the DN side and/or the service information of the user stream in the network on the DN side. For this implementation, refer to operation S1201. Details are not described herein again.

In an embodiment, the SMF network element may send the third indication information to a first network element. Correspondingly, the first network element receives the third indication information from the SMF network element. The first network element sends, to the SMF network element, the device identifier that is of the UPF network element and that is corresponding to the third indication information. Correspondingly, the SMF network element receives, from an NRF network element or the control device, the device identifier that is of the UPF network element and that is corresponding to the third indication information. The first network element may be the NRF network element or the control device. For this implementation, refer to operations S1502 and S1503. Details are not described herein again.

S2002. The SMF network element sends the first information to the UPF network element and/or the AN network element.

Correspondingly, the UPF network element and/or the AN network element receive/receives the first information from the SMF network element.

For this implementation, refer to operations S1106 and S1108. Details are not described herein again.

S2003. The SMF network element obtains second information.

The second information is used to indicate a forwarding rule of transmitting the user stream by the UPF network element on the DN side.

In an embodiment, the second information may include the identifier of the reliable-latency transmission network of the user stream on the DN side, or an identifier of a port for transmitting the user stream by the UPF network element on the DN side. The identifier of the reliable-latency transmission network of the user stream on the DN side is associated with the identifier of the port for transmitting the user stream by the UPF network element on the DN side. Optionally, the second information may further include third bandwidth information, and the third bandwidth information is bandwidth information of a user stream transmitted between the UPF network element and the DN side.

The SMF network element may obtain the second information in the following several manners.

In an embodiment, at least one of the following network elements may send the second information to the SMF network element. Correspondingly, the SMF network element may receive the second information from at least one of the following network elements: the NRF network element, the control device, and an AF network element on the DN side or a CUC network element on the DN side. For this implementation, refer to operation S1601, S1802, or S1903. Details are not described herein again.

In an embodiment, the SMF network element may obtain the second information based on information identifying the user stream or the service information of the user stream in the network on the DN side. For this implementation, refer to operation S1903 or S1904. Details are not described herein again.

Further, in a possible embodiment, the terminal device may send the third bandwidth information to the SMF network element. Correspondingly, the SMF network element receives the third bandwidth information from the terminal device. For this implementation, refer to operation S1904. Details are not described herein again.

S2004. The SMF network element sends the second information to the UPF network element.

Correspondingly, the UPF network element receives the second information from the SMF network element.

For this implementation, refer to operations S1605 and S1911. Details are not described herein again.

In an embodiment, when the second information includes the identifier of the reliable-latency transmission network of the user stream on the DN side, the UPF network element may obtain, based on the identifier of the reliable-latency transmission network of the user stream on the DN side, the identifier of the port for transmitting the user stream by the UPF network element on the DN side.

Further, in a possible embodiment, the UPF network element may send, to the SMF network element, the identifier of the port for transmitting the user stream by the UPF network element on the DN side. For this implementation, refer to operation S1601. Details are not described herein again.

According to the communication method provided in an embodiment of this application, the SMF network element obtains the first information and the second information. The first information is used to instruct the transmit end to send the user stream by using the data stream and is further used to instruct the receive end to receive the user stream by using the data stream; and the receive end is the AN network element, and the transmit end is the UPF network element, or the receive end is the UPF network element, and the transmit end is the AN network element. The second information is used to indicate the forwarding rule of transmitting the user stream by the UPF network element on the DN side. In other words, the first information indicates a data stream transmitted between the AN network element and the UPF network element. The SMF network element sends the first information and the second information to the UPF network element, so that the UPF network element can determine, based on the first information, how to transmit the data stream between the AN network element and the UPF network element, and determine, based on the second information, how to transmit the data stream between the UPF network element and the DN. In this way, a forwarding path between the AN network element and the DN is implemented on the UPF network element.

Figure 1:
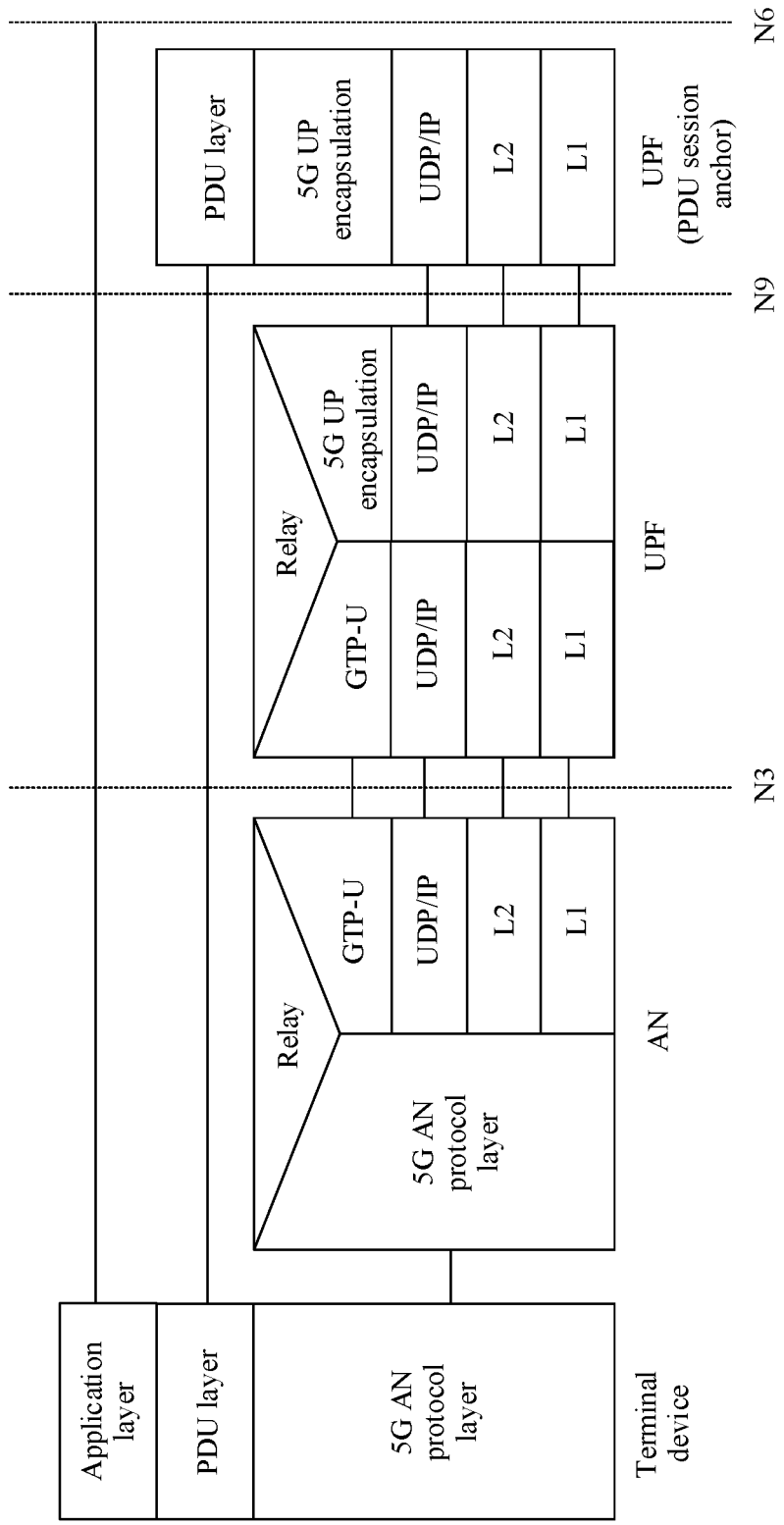
FIG. 1 is a schematic diagram of a GTP-U protocol stack according to an embodiment of this application.

In addition, as shown in FIG. 1, when a user packet is transmitted between the AN network element and the UPF network element, the user packet is encapsulated in a payload of a GTP-U packet. Therefore, a TSN forwarding device between the AN network element and the UPF network element cannot obtain address information in the user packet, and forwarding cannot be performed based on the address information in the user packet, but based on address information in a header of the GTP-U packet. However, the address information in the header of the GTP-U packet is the same for a plurality of different data streams. Therefore, a TSN network between the AN network element and the UPF network element cannot distinguish between different data streams based on the address information in the header of the GTP-U packet. According to the communication method provided in this embodiment of this application, the SMF network element sends the first information to the AN network element and the UPF network element. The first information is used to instruct the transmit end to send the user stream by using the data stream and is further used to instruct the receive end to receive the user stream by using the data stream; and the receive end is the AN network element, and the transmit end is the UPF network element, or the receive end is the UPF network element, and the transmit end is the AN network element. In this way, the TSN network between the AN network element and the UPF network element can forward the data stream based on the first information, thereby resolving a problem that the TSN network between the AN network element and the UPF network element cannot distinguish between different data streams based on the address information in the header of the GTP-U packet.

In an embodiment, as shown in FIG. 20, the communication method may further include the following operations.

S2005. The terminal device or a server on the DN side sends third information to the SMF network element.

The third information may be the foregoing information identifying the user stream, and the third information may include at least one of the following information: an identifier of the user stream, a destination MAC address of the user stream, and a stream feature of the user stream.

Correspondingly, the SMF network element receives the third information from the terminal device or the server on the DN side.

For this implementation, refer to operation S1101. Details are not described herein again.

S2006. The SMF network element sends the third information to the UPF network element or a network element on the DN side.

Correspondingly, the UPF network element or the CUC network element on the DN side receives the third information from the SMF network element. For example, the network element on the DN side may be the AF network element or the CUC network element on the DN side.

For this embodiment, refer to operation S1106 or S1801. Details are not described herein again.

Figure 21A:
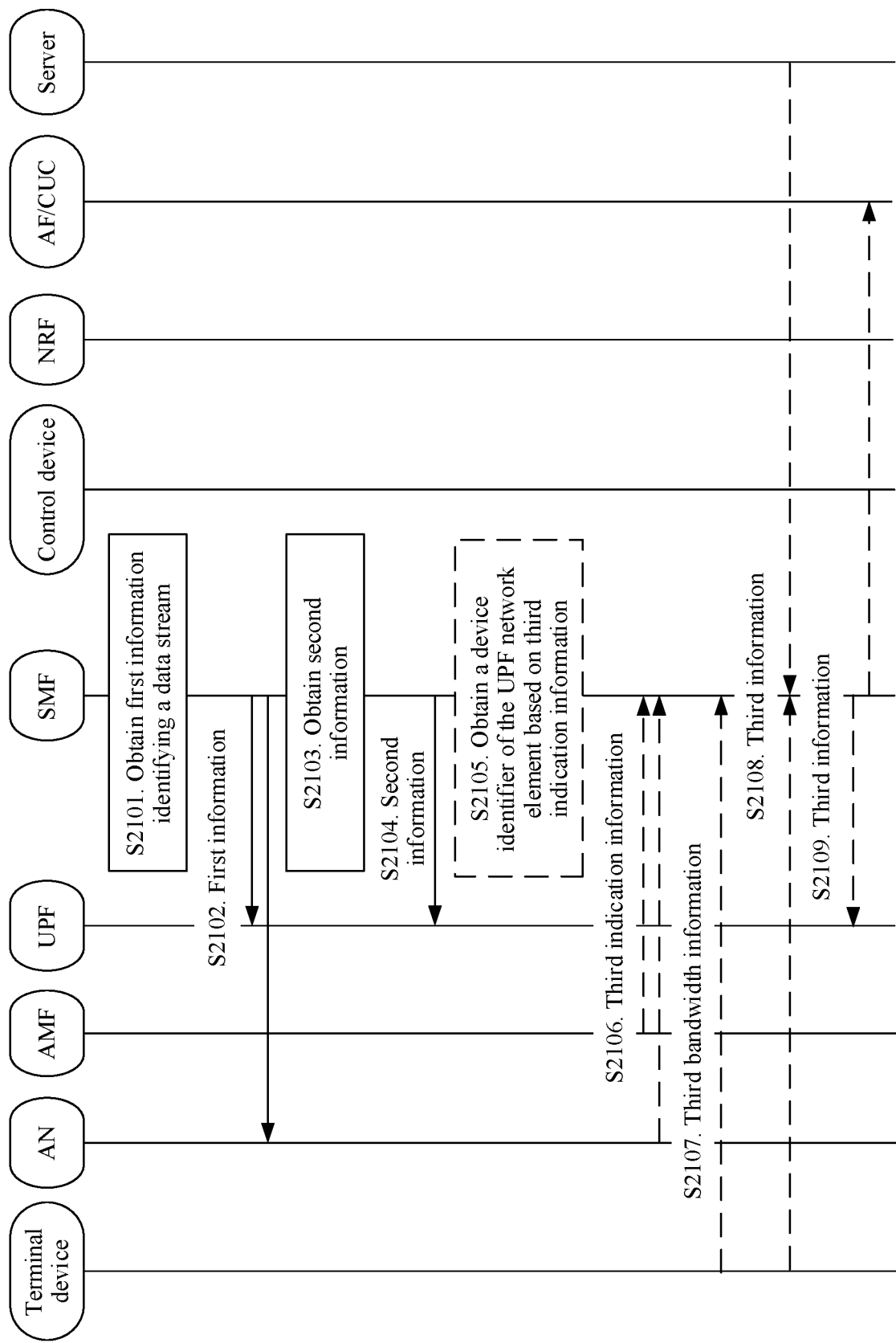
FIG. 21A is a schematic diagram 11 of a communication method according to an embodiment of this application.

With reference to the foregoing descriptions of FIG. 11A and FIG. 11B to FIG. 20, an embodiment of this application discloses a communication method. As shown in FIG. 21A, the method includes the following operations.

S2101. An SMF network element obtains first information identifying a data stream.

The first information is used to instruct a transmit end to send a user stream by using the data stream and is further used to instruct a receive end to receive the user stream by using the data stream; and the receive end is an AN network element, and the transmit end is a UPF network element, or the receive end is the UPF network element, and the transmit end is the AN network element.

S2102. The SMF network element sends the first information to the UPF network element and/or the AN network element.

S2103. The SMF network element obtains second information.

The second information is used to indicate a forwarding rule of transmitting the user stream by the user plane function network element on a data network side.

In an embodiment, the second information includes an identifier of a reliable-latency transmission network of the user stream on the DN side, or an identifier of a port for transmitting the user stream by the UPF network element on the DN side. The identifier of the reliable-latency transmission network of the user stream on the DN side is associated with the identifier of the port for transmitting the user stream by the UPF network element on the DN side.

S2104. The SMF network element sends the second information to the UPF network element.

In an embodiment, as shown in FIG. 21A, the communication method may further include:

S2105. The SMF network element obtains a device identifier of the UPF network element based on third indication information.

The third indication information includes at least one of the following information: a device identifier of the AN network element, an identifier of a reliable-latency transmission network between the AN network element and the UPF network element, the identifier of the reliable-latency transmission network of the user stream on the DN side, and service information of the user stream in a network on the DN side.

In an embodiment, as shown in FIG. 21A, the communication method may further include:

S2106. The SMF network element receives the third indication information from the AN network element or an AMF network element.

In an embodiment, as shown in FIG. 21A, the communication method may further include:

S2107. The SMF network element receives third bandwidth information from a terminal device.

The third bandwidth information is bandwidth information of a user stream transmitted between the UPF network element and the DN side.

In an embodiment, as shown in FIG. 21A, the communication method may further include:

S2108. The SMF network element receives third information from the terminal device or a server on the DN side.

The third information includes at least one of the following information: an identifier of the user stream, a destination MAC address of the user stream, and a stream feature of the user stream.

S2109. The SMF network element sends the third information to the UPF network element, or an AF network element on the DN side, or a CUC network element on the DN side.

Figures 1, 21B:
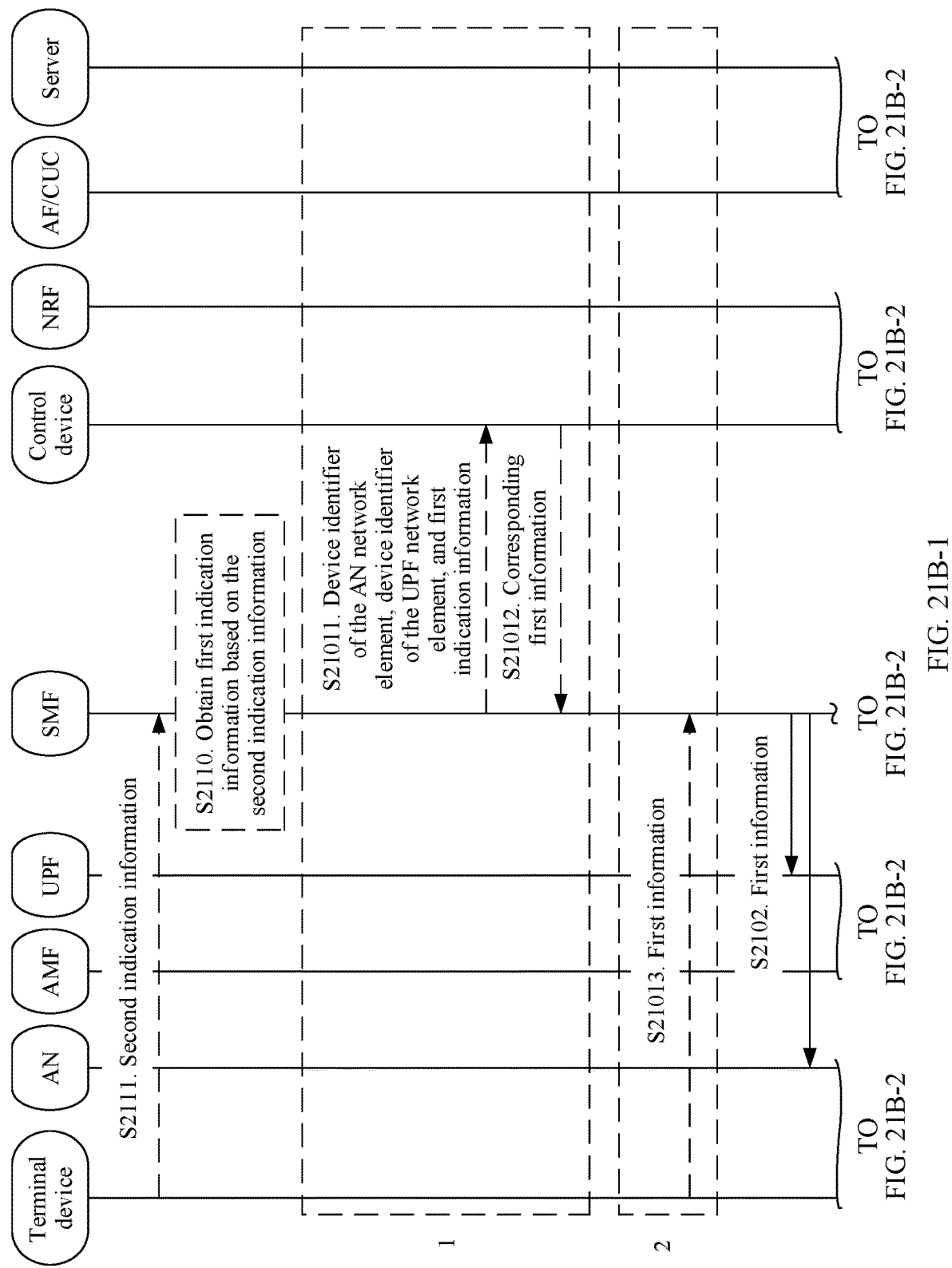

In an embodiment, as shown in FIG. 21B-1 and FIG. 21B-2, operation S2101 may include:

S21011. The SMF network element sends a device identifier of the AN network element, a device identifier of the UPF network element, and first indication information to a control device.

The first indication information is used to indicate that the AN network element is the transmit end or the receive end.

S21012. The SMF network element receives, from the control device, the first information corresponding to the following: the device identifier of the AN network element, the device identifier of the UPF network element, and the first indication information.

In an embodiment, as shown in FIG. 21B-1 and FIG. 21B-2, the communication method may further include:

S2110. The SMF network element obtains the first indication information based on second indication information.

The second indication information is used to instruct the terminal device to send or receive the user stream.

In an embodiment, as shown in FIG. 21B-1 and FIG. 21B-2, the communication method may further include:

S2111. The SMF network element receives the second indication information from the terminal device.

In an embodiment, as shown in FIG. 21B-1 and FIG. 21B-2, operation S2101 may include:

S21013. The SMF network element receives the first information from a control device.

In an embodiment, as shown in FIG. 21B-1 and FIG. 21B-2, operation S2103 may include:

S21031. The SMF network element receives the second information from at least one of the following network elements: an NRF network element, the control device, the AF network element on the DN side, or the CUC network element on the DN side.

In an embodiment, as shown in FIG. 21B-1 and FIG. 21B-2, operation S2103 may include:

S21032. The SMF network element obtains the second information based on the first information, or the SMF network element obtains the second information based on fourth indication information.

The fourth indication information is used to instruct the UPF network element to send or receive the user stream.

Figures 1, 21C:
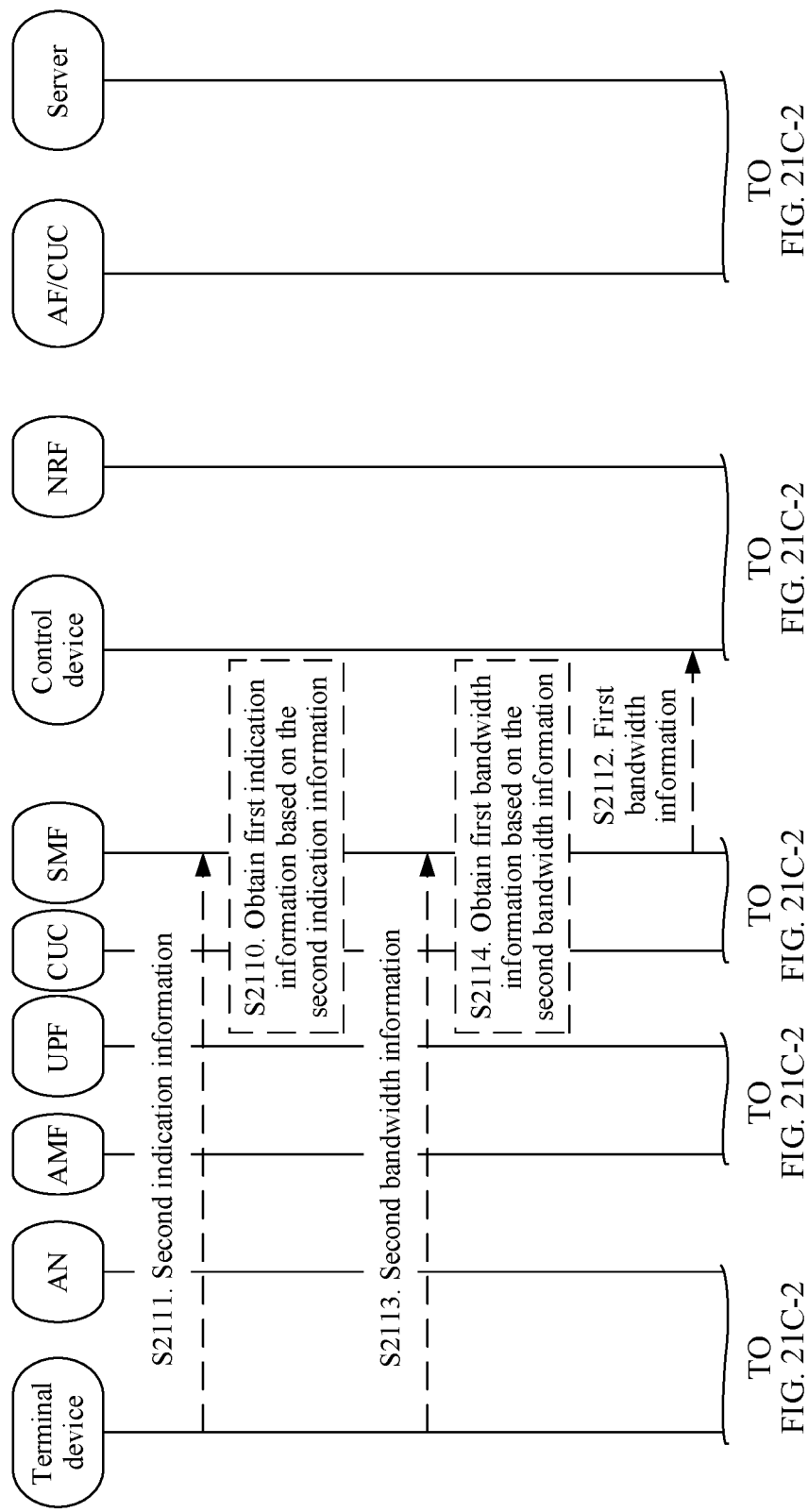
Figures 2, 21C:
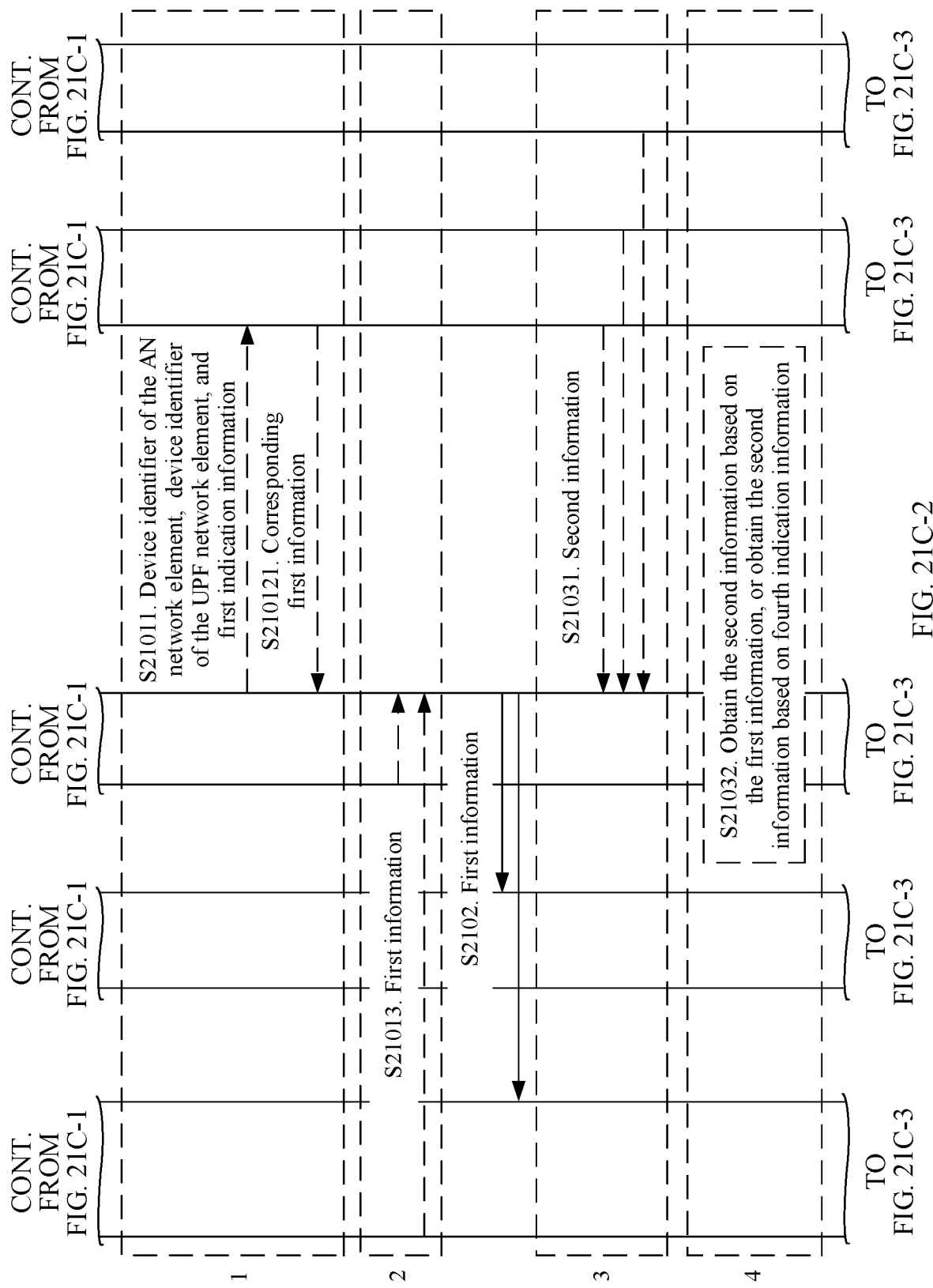
Figures 3, 21C:
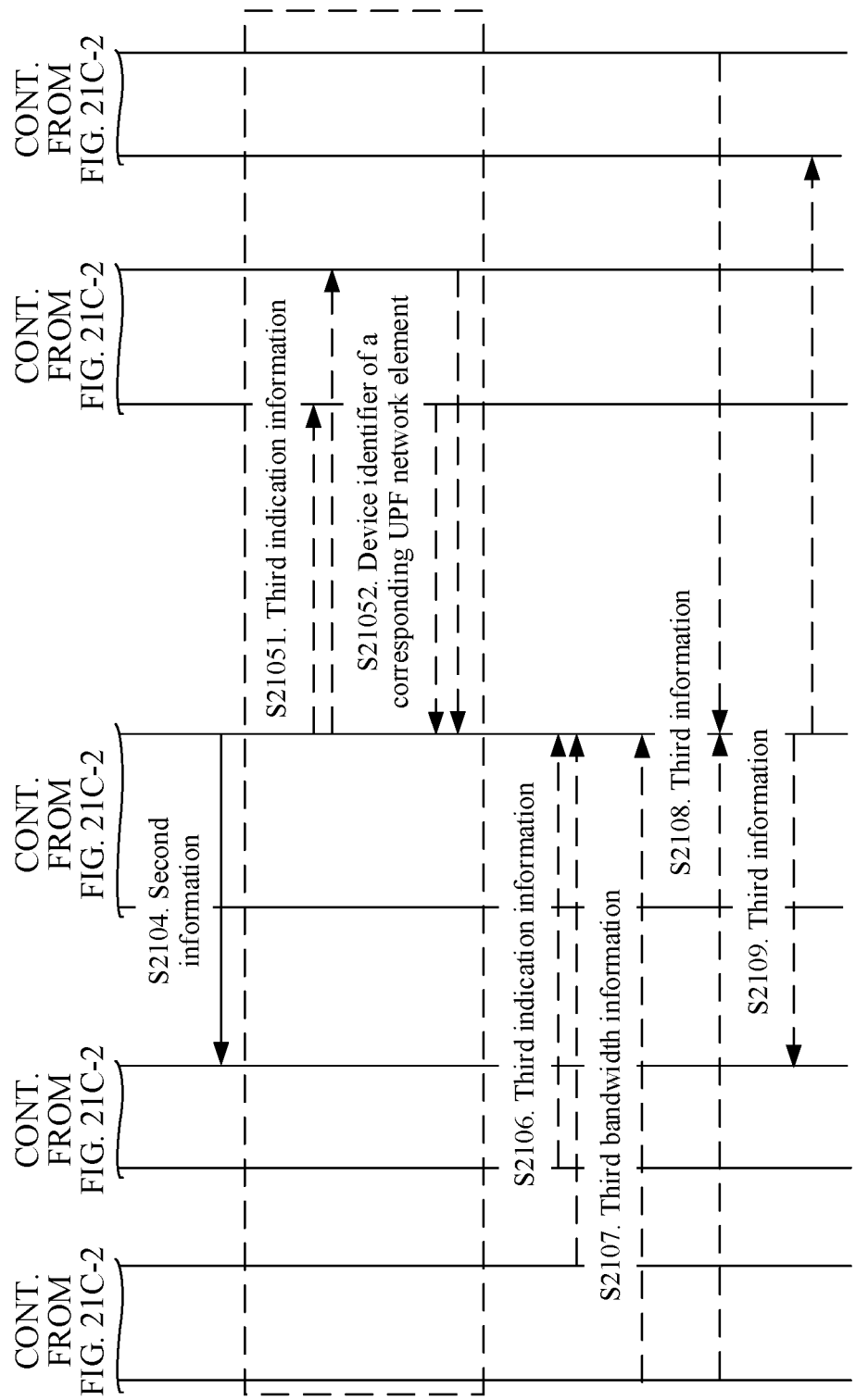

In an embodiment, as shown in FIG. 21C-1 to FIG. 21C-3, the communication method may further include:

S2112. The SMF network element sends first bandwidth information to the control device.

The first bandwidth information is bandwidth information of a user stream transmitted between the AN network element and the UPF network element.

Operation S21012 includes S210121.

S210121. The SMF network element receives, from the control device, the first information corresponding to the following: the device identifier of the AN network element, the device identifier of the UPF network element, the first indication information, and the first bandwidth information.

In an embodiment, as shown in FIG. 21C-1 to FIG. 21C-3, the communication method may further include:

S2113. The SMF network element receives second bandwidth information from the terminal device.

The second bandwidth information is bandwidth information of a user stream of the terminal device.

S2114. The SMF network element obtains the first bandwidth information based on the second bandwidth information.

In an embodiment, as shown in FIG. 21C-1 to FIG. 21C-3, operation S2105 may include:

S21051. The SMF network element sends the third indication information to a first network element.

The first network element may be the NRF network element or the control device.

S21052. The SMF network element receives, from the first network element, the device identifier that is of the UPF network element and that is corresponding to the third indication information.

Figure 21D:
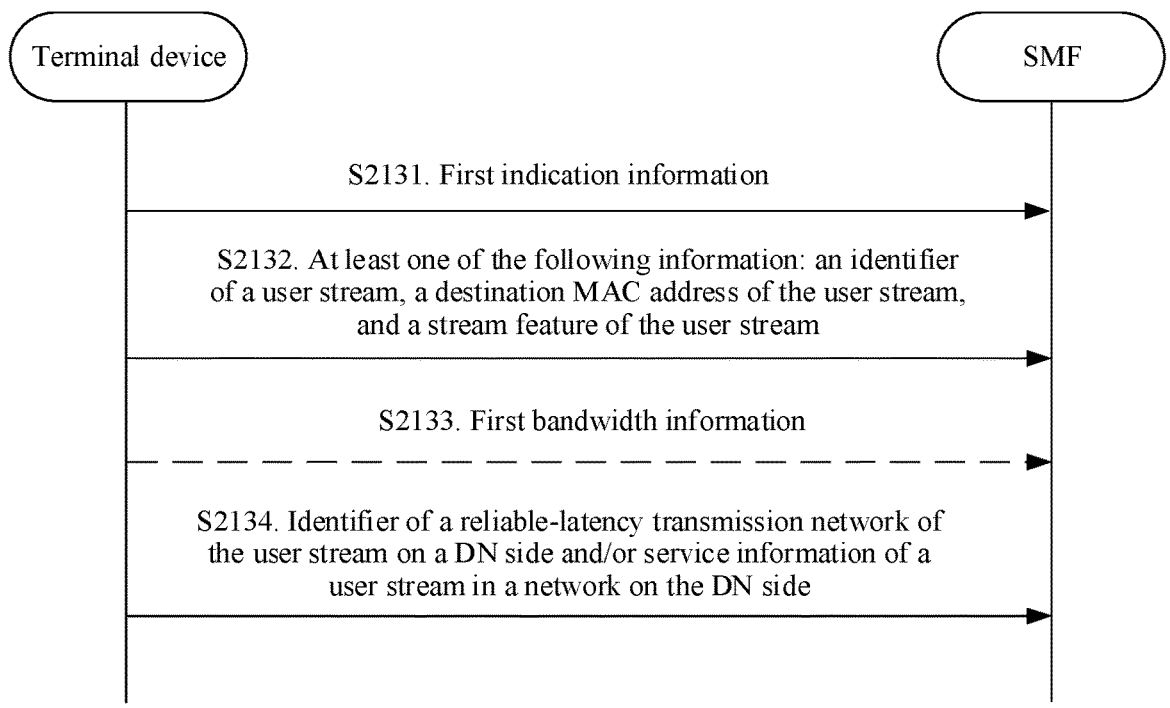
FIG. 21D is a schematic diagram 14 of a communication method according to an embodiment of this application.

With reference to the foregoing descriptions of FIG. 11A and FIG. 11B to FIG. 20, an embodiment of this application discloses a communication method. As shown in FIG. 21D, the method includes the following operations.

S2131. A terminal device sends first indication information to an SMF network element.

The first indication information is used to instruct the terminal device to send or receive a user stream and is used to determine whether an AN network element is a transmit end or a receive end that transmits the user stream by using a data stream, and the first indication information is used to create the user stream.

S2132. The terminal device sends, to the SMF network element, at least one of the following information: an identifier of the user stream, a destination MAC address of the user stream, and a stream feature of the user stream.

In an embodiment, as shown in FIG. 21D, the communication method may further include:

S2133. The terminal device sends first bandwidth information to the SMF network element.

The first bandwidth information is bandwidth information of a user stream of the terminal device or bandwidth information of a user stream transmitted between a UPF network element and a DN side.

In an embodiment, as shown in FIG. 21D, the communication method may further include:

S2134. The terminal device sends, to the SMF network element, an identifier of a reliable-latency transmission network of the user stream on the DN side and/or service information of the user stream in a network on the DN side.

Figure 21E:
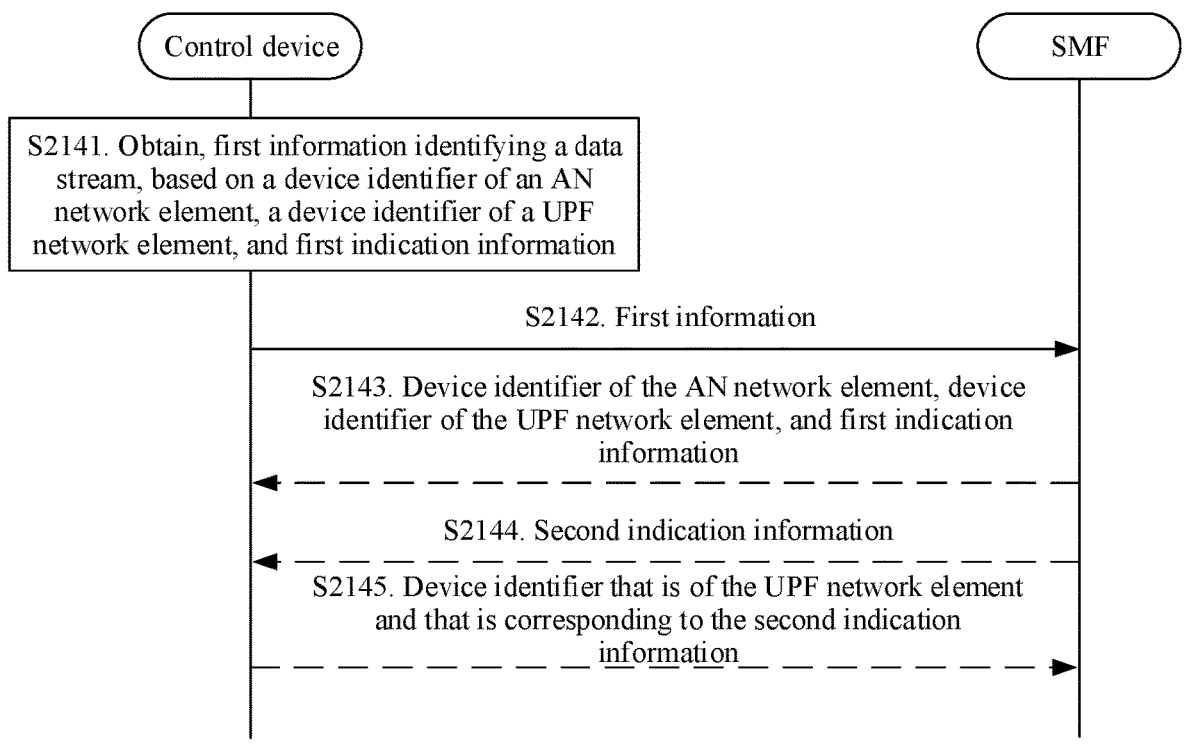
FIG. 21E is a schematic diagram 15 of a communication method according to an embodiment of this application.

With reference to the foregoing descriptions of FIG. 11A and FIG. 11B to FIG. 20, an embodiment of this application discloses a communication method. As shown in FIG. 21E, the method includes the following operations.

S2141. A control device obtains, based on a device identifier of an AN network element, a device identifier of a UPF network element, and first indication information, first information identifying a data stream.

The first indication information is used to indicate that the AN network element is a transmit end or a receive end that performs communication by using the data stream, and the first information is used to instruct the transmit end to send the data stream by using the data stream and is further used to instruct the receive end to receive a user stream by using the data stream.

S2142. The control device sends the first information to an SMF network element.

In an embodiment, as shown in FIG. 21E, the communication method may further include:

S2143. The control device receives the device identifier of the AN network element, the device identifier of the UPF network element, and the first indication information from the SMF network element.

In an embodiment, as shown in FIG. 21E, the communication method may further include:

S2144. The control device receives second indication information from the SMF network element.

The second indication information includes at least one of the following information: the device identifier of the AN network element, an identifier of a reliable-latency transmission network between the AN network element and the UPF network element, an identifier of a reliable-latency transmission network of the user stream on a data network side, and service information of the user stream in a network on the data network side.

S2145. The control device sends, to the SMF network element, the device identifier that is of the UPF network element and that is corresponding to the second indication information.

Figure 21F:
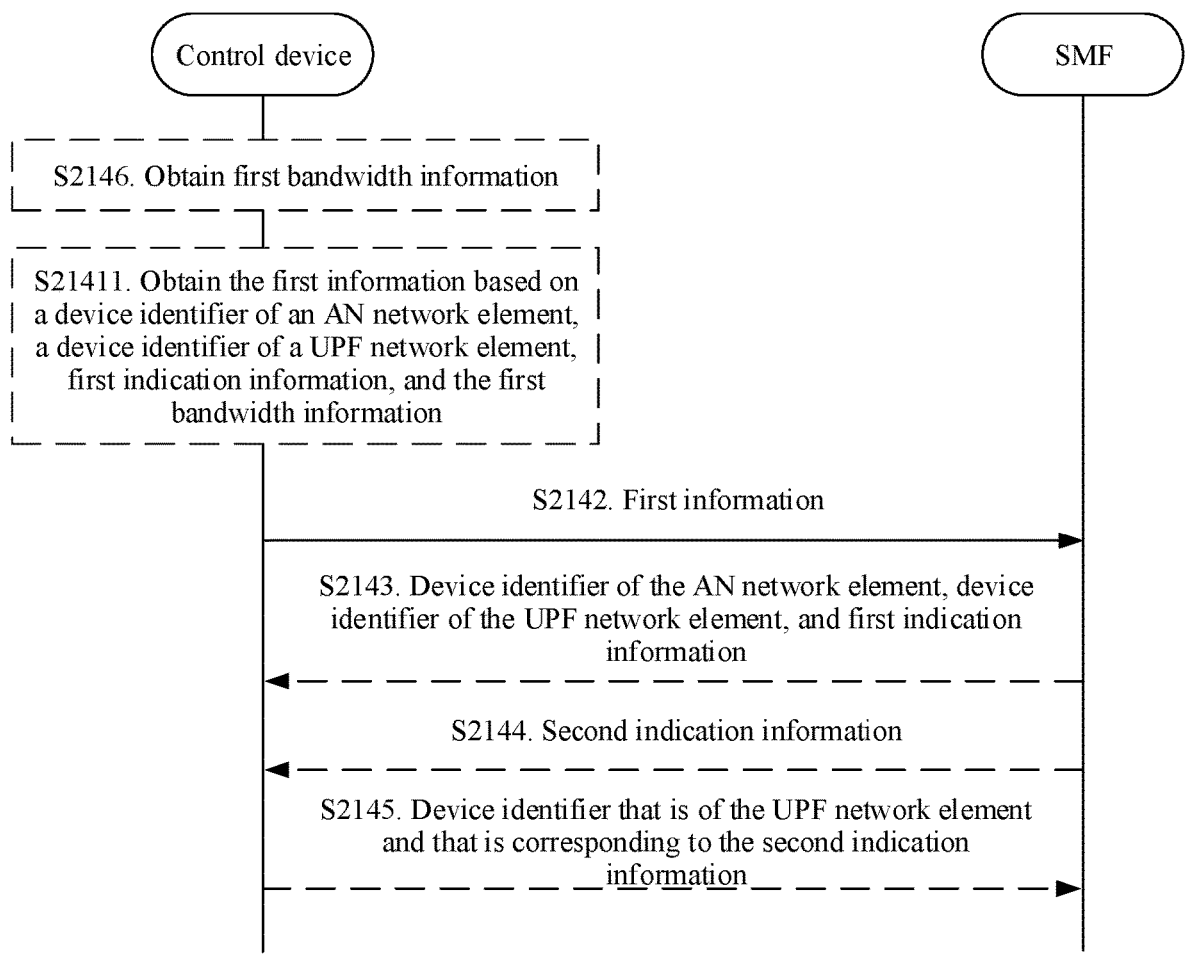
FIG. 21F is a schematic diagram 16 of a communication method according to an embodiment of this application.

In an embodiment, as shown in FIG. 21F, the communication method may further include:

S2146. The control device obtains first bandwidth information.

The first bandwidth information is bandwidth information of a user stream transmitted between the AN network element and the UPF network element.

Operation S2141 may include:

S21411. The control device obtains the first information based on the device identifier of the AN network element, the device identifier of the UPF network element, the first indication information, and the first bandwidth information.

Figure 21G:
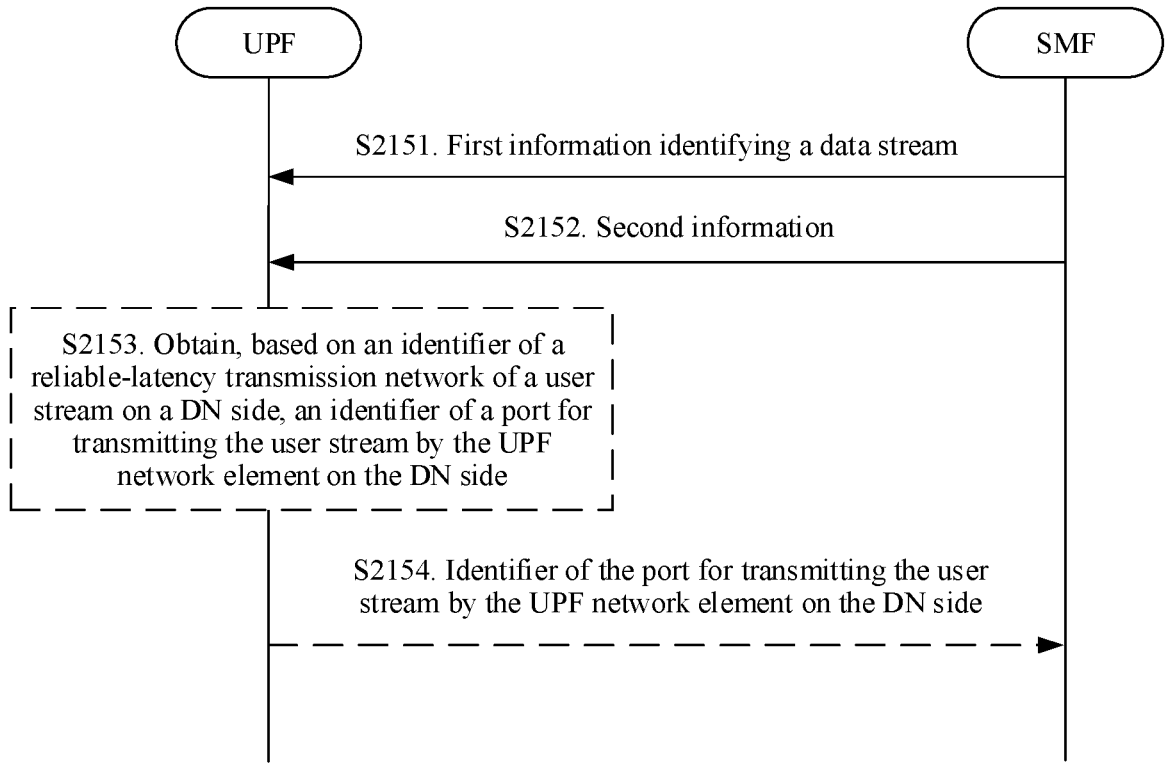
FIG. 21G is a schematic diagram 17 of a communication method according to an embodiment of this application.

With reference to the foregoing descriptions of FIG. 11A and FIG. 11B to FIG. 20, an embodiment of this application discloses a communication method. As shown in FIG. 21G, the method includes the following operations.

S2151. A UPF network element receives, from an SMF network element, first information identifying a data stream.

The first information is used to instruct a transmit end to send a user stream by using the data stream and is further used to instruct a receive end to receive the user stream by using the data stream; and the access end is an AN network element, and the transmit end is the UPF network element, or the access end is the UPF network element, and the transmit end is the AN network element.

S2152. The UPF network element receives second information from the SMF network element.

The second information is used to indicate a forwarding rule of transmitting the user stream by the UPF network element on a DN side.

In an embodiment, the second information includes an identifier of a reliable-latency transmission network of the user stream on the DN side, or an identifier of a port for transmitting the user stream by the UPF network element on the DN side, where the identifier of the reliable-latency transmission network of the user stream on the DN side is associated with the identifier of the port for transmitting the user stream by the UPF network element on the DN side.

In an embodiment, as shown in FIG. 21G, when the second information includes the identifier of the reliable-latency transmission network of the user stream on the DN side, the communication method may further include:

S2153. The UPF network element obtains, based on the identifier of the reliable-latency transmission network of the user stream on the DN side, the identifier of the port for transmitting the user stream by the UPF network element on the DN side.

In an embodiment, as shown in FIG. 21G, the communication method may further include:

S2154. The UPF network element sends, to the SMF network element, the identifier of the port for transmitting the user stream by the UPF network element on the DN side.

Figure 21H:
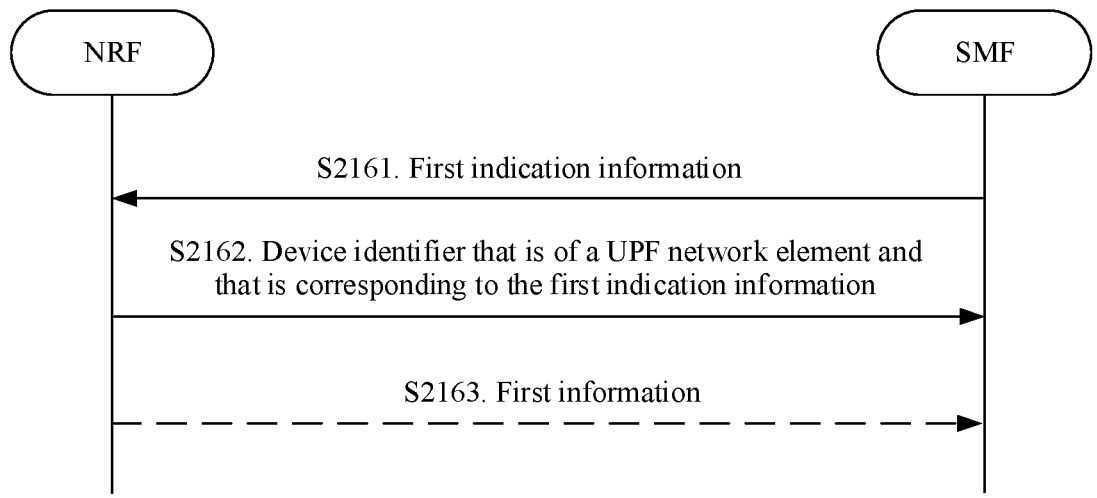
FIG. 21H is a schematic diagram 18 of a communication method according to an embodiment of this application.

With reference to the foregoing descriptions of FIG. 11A and FIG. 11B to FIG. 20, an embodiment of this application discloses a communication method. As shown in FIG. 21H, the method includes the following operations.

S2161. An NRF network element receives first indication information from an SMF network element.

The first indication information includes at least one of the following information: a device identifier of an AN network element, an identifier of a reliable-latency transmission network between the AN network element and a UPF network element, an identifier of a reliable-latency transmission network of a user stream on a DN side, and service information of the user stream in a network on the DN side. The AN network element is a receive end that transmits the user stream by using a data stream, and the UPF network element is a transmit end that transmits the user stream by using the data stream, or the AN network element is the transmit end that transmits the user stream by using the data stream, and the UPF network element is the receive end that transmits the user stream by using the data stream.

S2162. The NRF network element sends, to the SMF network element, a device identifier that is of the UPF network element and that is corresponding to the first indication information.

In an embodiment, as shown in FIG. 21H, the communication method may further include:

S2163. The NRF network element sends first information to the SMF network element.

The first information is used to indicate a port for transmitting the user stream by the UPF network element on the DN side. An embodiment of this application further provides a communications apparatus, and the communications apparatus may be configured to perform a function of the SMF network element in the foregoing method. In this embodiment of this application, the communications apparatus may be divided into function modules based on the foregoing method example. For example, each function module may be obtained through division based on each corresponding function, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 22:
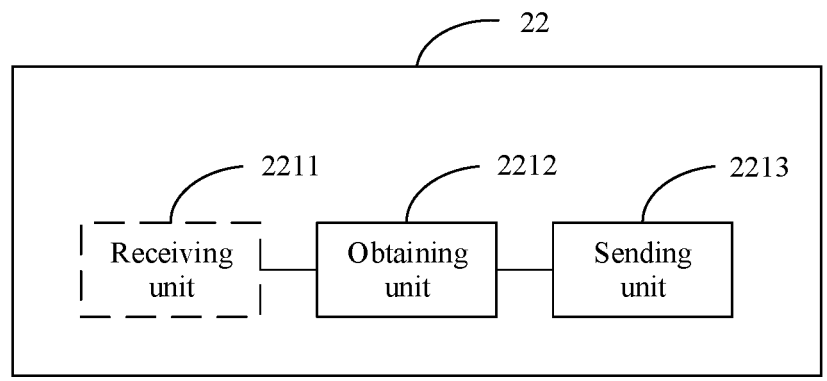
FIG. 22 is a schematic structural diagram 1 of a first communications apparatus according to an embodiment of this application.

When each function module is obtained through division based on each corresponding function, FIG. 22 is a possible schematic structural diagram of the communications apparatus in the foregoing embodiment. A communications apparatus 22 may include a receiving unit 2211, an obtaining unit 2212, and a sending unit 2213. The foregoing units are configured to support the communications apparatus in performing the related method of the SMF network element in any one of FIG. 11A and FIG. 11B to FIG. 18. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again. It should be noted that the foregoing units are optional. For example, the communications apparatus 22 may include the obtaining unit 2212 and the sending unit 2213. Optionally, the communications apparatus 22 may further include the receiving unit 2211.

For example, the receiving unit 2211 is configured to support the communications apparatus 22 in performing the processes S1101, S1103, S1105, S1107, and S1109 in FIG. 11A and FIG. 11B, or the processes S1201, S1203, S1205, S1207, and S1209 in FIG. 12A and FIG. 12B, or the processes S1301, S1303, S1306, S1308, and S1310 in FIG. 13A and FIG. 13B, or the processes S1401, S1403, S1404, S1406, S1408, and S1410 in FIG. 14A and FIG. 14B, or the processes S1501, S1503, S1505, S1507, and S1509 in FIG. 15A and FIG. 15B, or the process S1604 in FIG. 16, or the process S1703 in FIG. 17, or the process S1802 in FIG. 18, or the processes S1903, S1904, S1906, S1908, and S1910 in FIG. 19A and FIG. 19B, or the process S2005 in FIG. 20, or the processes S2106 and S2108 in FIG. 21A, or the processes S2111, S21012, S21013, S21031, S2106, and S2108 in FIG. 21B-1 and FIG. 21B-2, or the processes S2111, S2113, S21013, S21052, S2106, S2107, and S2108 in FIG. 21C-1 to FIG. 21C-3, or the processes S2131 to S2134 in FIG. 21D, or the processes S2142 and S2145 in FIG. 21E, or the processes S2142 and S2145 in FIG. 21F, or the process S2154 in FIG. 21G, or the processes S2162 and S2163 in FIG. 21H. The obtaining unit 2212 is configured to support the communications apparatus 22 in performing the process S1304 in FIG. 13A and FIG. 13B, or the processes S2001 and S2003 in FIG. 20, or the processes S2101, S2103, and S2105 in FIG. 21A, or the processes S2110, S21032, and S2105 in FIG. 21B-1 and FIG. 21B-2, or the processes S2110, S2114, and S21032 in FIG. 21C-1 to FIG. 21C-3. The sending unit 2213 is configured to support the communications apparatus 22 in performing the processes S1102, S1104, S1106, S1108, and S1110 in FIG. 11A and FIG. 11B, or the processes S1202, S1204, S1206, S1208, and S1210 in FIG. 12A and FIG. 12B, or the processes S1302, S1305, S1307, S1309, and S1311 in FIG. 13A and FIG. 13B, or the processes S1402, S1405, S1407, and S1409 in FIG. 14A and FIG. 14B, or the processes S1502, S1504, S1506, S1508, and S1510 in FIG. 15A and FIG. 15B, or the process S1605 in FIG. 16, or the processes S1701 and S1704 in FIG. 17, or the processes S1801 and S1803 in FIG. 18, or the processes S1905, S1907, S1909, and S1911 in FIG. 19A and FIG. 19B, or the processes S2002, S2004, and S2006 in FIG. 20, or the processes S2102, S2104, and S2109 in FIG. 21A, or the processes S21011, S2102, S2104, and S2109 in FIG. 21B-1 and FIG. 21B-2, or the processes S2112, S21011, S2102, S2104, and S21051, and S2109 in FIG. 21C-1 to FIG. 21C-3, or the processes S2143 and S2144 in FIG. 21E, or the processes S2143 and S2144 in FIG. 21F, or the processes S2151 and S2152 in FIG. 21G, or the process S2161 in FIG. 21H. All content related to the operations in the foregoing method embodiments may be cited in function descriptions of corresponding function modules. Details are not described herein again.

In an embodiment, the obtaining unit 2212 is configured to obtain first information identifying a data stream, where the first information is used to instruct a transmit end to send a user stream by using the data stream and is further used to instruct a receive end to receive the user stream by using the data stream; and the receive end is an access network element, and the transmit end is a user plane function network element, or the receive end is the user plane function network element, and the transmit end is the access network element. The sending unit 2213 is configured to send the first information obtained by the obtaining unit to the user plane function network element and/or the access network element. The obtaining unit 2212 is further configured to obtain second information, where the second information is used to indicate a forwarding rule of transmitting the user stream by the user plane function network element on a data network side. The sending unit 2213 is further configured to send the second information to the user plane function network element.

In an embodiment, the communications apparatus further includes the receiving unit 2211. The sending unit 2213 is configured to send a device identifier of the access network element, a device identifier of the user plane function network element, and first indication information to a control device, where the first indication information is used to indicate that the access network element is the transmit end or the receive end. The receiving unit 2211 is configured to receive, from the control device, the first information corresponding to the following: the device identifier of the access network element, the device identifier of the user plane function network element, and the first indication information.

In an embodiment, the sending unit 2213 is further configured to send first bandwidth information to the control device, where the first bandwidth information is bandwidth information of a user stream transmitted between the access network element and the user plane function network element. The receiving unit 2211 is configured to receive, from the control device, the first information corresponding to the following: the device identifier of the access network element, the device identifier of the user plane function network element, the first indication information, and the first bandwidth information.

In an embodiment, the receiving unit 2211 is further configured to receive second bandwidth information from a terminal device, where the second bandwidth information is bandwidth information of a user stream of the terminal device. The obtaining unit 2212 is configured to obtain the first bandwidth information based on the second bandwidth information.

In an embodiment, the obtaining unit 2212 is configured to obtain the first indication information based on second indication information, where the second indication information is used to instruct the terminal device to send or receive the user stream.

In an embodiment, the receiving unit 2211 is further configured to receive the second indication information from the terminal device.

In a possible implementation, the communications apparatus further includes the receiving unit 2211, and the receiving unit 2211 is configured to receive the first information from a control device.

In an embodiment, the obtaining unit 2212 is further configured to obtain the device identifier of the user plane function network element based on third indication information, where the third indication information includes at least one of the following information: the device identifier of the access network element, an identifier of a reliable-latency transmission network between the access network element and the user plane function network element, an identifier of a reliable-latency transmission network of the user stream on the data network side, and service information of the user stream in a network on the data network side.

In an embodiment, the sending unit 2213 is further configured to send the third indication information to a first network element. The receiving unit 2211 is further configured to receive, from the first network element, the device identifier that is of the user plane function network element and that is corresponding to the third indication information, where the first network element is a network function repository function network element or the control device.

In an embodiment, the receiving unit 2211 is further configured to receive the third indication information from the access network element or an access and mobility management network element.

In an embodiment, the receiving unit 2211 is configured to receive the second information from at least one of the following network elements: the network function repository function network element, the control device, and an application function network element on the data network side or a centralized user configuration network element on the data network side.

In an embodiment, the obtaining unit 2212 is configured to obtain the second information based on information identifying the user stream or the service information of the user stream in the network on the data network side.

In an embodiment, the second information includes the identifier of the reliable-latency transmission network of the user stream on the data network side, or an identifier of a port for transmitting the user stream by the user plane function network element on the data network side, where the identifier of the reliable-latency transmission network of the user stream on the data network side is associated with the identifier of the port of the user plane function network element on the data network side.

In an embodiment, the receiving unit 2211 is further configured to receive third bandwidth information from the terminal device, where the third bandwidth information is bandwidth information of a user stream transmitted between the user plane function network element and the data network side.

In an embodiment, the receiving unit 2211 is further configured to receive third information from the terminal device or a server on the data network side, where the third information includes at least one of the following information: an identifier of the user stream, a destination media access control MAC address of the user stream, and a stream feature of the user stream. The sending unit 2213 is further configured to send the third information to the user plane function network element, the application function network element on the data network side, or the centralized user configuration network element on the data network side.

Figure 23:
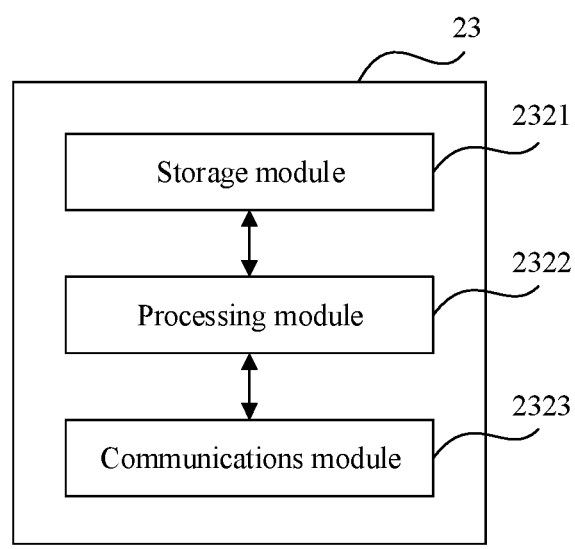
FIG. 23 is a schematic structural diagram 2 of a first communications apparatus according to an embodiment of this application.

FIG. 23 is still another possible schematic structural diagram of the communications apparatus in an embodiment. A communications apparatus 23 includes a processing module 2322 and a communications module 2323. Optionally, the communications apparatus 23 may further include a storage module 2321. The foregoing modules are configured to support the communications apparatus in performing the related method of the SMF network element in any one of FIG. 11A and FIG. 11B to FIG. 21H. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 2322 is configured to control and manage an action of the communications apparatus 23 or perform a corresponding processing function, for example, perform a function of the obtaining unit 2212. The communications module 2323 is configured to support the communications apparatus 23 in performing functions of the receiving unit 2211 and the sending unit 2213. The storage module 2321 is configured to store program code and/or data of the communications apparatus.

The processing module 2322 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2323 may be a network interface, a communications interface, or the like. The storage module 2321 may be a memory.

In an embodiment, the processing module 2322 may be the processor 501 in FIG. 5, the communications module 2323 may be the communications interface 504 in FIG. 5, and the storage module 2321 may be the memory 503 in FIG. 5. One or more programs are stored in the memory, the one or more programs include an instruction, and when the instruction is executed by the communications apparatus, the communications apparatus is enabled to perform the related method of the SMF network element in any one of FIG. 11A and FIG. 11B to FIG. 21H.

An embodiment of this application further provides a communications apparatus, including a processor and a memory. The memory is configured to store a program, and the processor invokes the program stored in the memory, so that the communications apparatus is enabled to perform the related method of the SMF network element in any one of FIG. 11A and FIG. 11B to FIG. 21H.

An embodiment of this application further provides a computer storage medium storing one or more programs. The computer storage medium stores a computer program, and when the computer program is executed by a processor, a communications apparatus is enabled to perform the related method of the SMF network element in any one of FIG. 11A and FIG. 11B to FIG. 21H.

An embodiment of this application further provides a computer program product including an instruction. When the computer program product runs on a communications apparatus, the communications apparatus is enabled to perform the related method of the SMF network element in any one of FIG. 11A and FIG. 11B to FIG. 21H.

An embodiment of this application provides a chip system. The chip system includes a processor, configured to support a communications apparatus in performing the related method of the SMF network element in any one of FIG. 11A and FIG. 11B to FIG. 21H. For example, a session management function network element obtains first information identifying a data stream, where the first information is used to instruct a transmit end to send a user stream by using the data stream and is further used to instruct a receive end to receive the user stream by using the data stream; and the receive end is an access network element, and the transmit end is a user plane function network element, or the receive end is the user plane function network element, and the transmit end is the access network element; the session management function network element sends the first information to the user plane function network element and/or the access network element; the session management function network element obtains second information, where the second information is used to indicate a forwarding rule of transmitting the user stream by the user plane function network element on a data network side; and the session management function network element sends the second information to the user plane function network element. In a possible design, the chip system further includes a memory, and the memory is configured to store a necessary program instruction and necessary data. The chip system may include a chip and an integrated circuit, or may include a chip and another discrete device. This is not limited in this embodiment of this application.

The communications apparatus, the computer storage medium, the computer program product, or the chip system provided in this application is configured to perform the corresponding method provided above. Therefore, for beneficial effects that can be achieved by the communications apparatus, the computer storage medium, the computer program product, or the chip system, refer to the beneficial effects in the corresponding method provided above. Details are not described herein again.

It may be understood that the communications apparatus may be an SMF network element, or may be a component (a chip, a circuit, or the like) that can be used for the SMF network element.

An embodiment of this application further provides a communications apparatus, and the communications apparatus may be configured to perform a function of the terminal device in the foregoing method. In this embodiment of this application, the communications apparatus may be divided into function modules based on the foregoing method example. For example, each function module may be obtained through division based on each corresponding function, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 24:
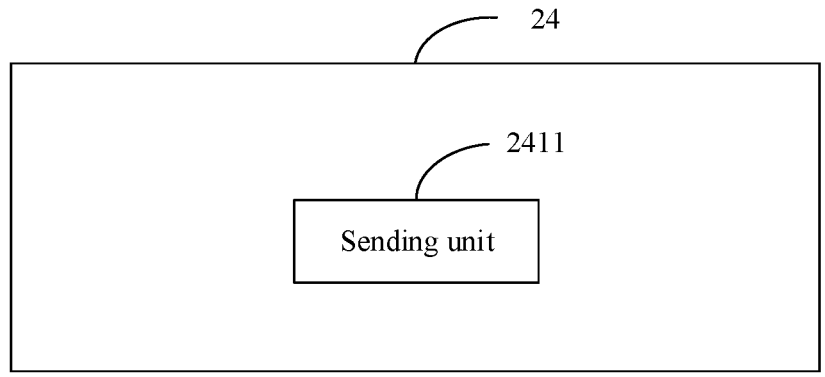
FIG. 24 is a schematic structural diagram 1 of a second communications apparatus according to an embodiment of this application.

When each function module is obtained through division based on each corresponding function, FIG. 24 is a possible schematic structural diagram of the communications apparatus in the foregoing embodiment. A communications apparatus 24 may include a sending unit 2411. The foregoing units are configured to support the communications apparatus in performing the related method of the terminal device in any one of FIG. 11A and FIG. 11B to FIG. 18. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

For example, the sending unit 2411 is configured to support the communications apparatus 24 in performing the process S1101 in FIG. 11A and FIG. 11B, or the process S1201 in FIG. 12A and FIG. 12B, or the process S1301 in FIG. 13A and FIG. 13B, or the processes S1401 and S1404 in FIG. 14A and FIG. 14B, or the process S1501 in FIG. 15A and FIG. 15B, or the processes S1901, S1902, and S1904 in FIG. 19A and FIG. 19B, or the process S2005 in FIG. 20, or the processes S2107 and S2108 in FIG. 21A, or the processes S2111, S21013, S2107, and S2108 in FIG. 21B-1 and FIG. 21B-2, or the processes S2111, S2113, S21013, S2107, and S2108 in FIG. 21C-1 to FIG. 21C-3, or the processes S2131 to S2134 in FIG. 21D. All content related to the operations in the foregoing method embodiments may be cited in function descriptions of corresponding function modules. Details are not described herein again.

In an embodiment, the sending unit 2411 is configured to send first indication information to a session management function network element, where the first indication information is used to instruct the terminal device to send or receive a user stream and is used to determine whether an access network element is a transmit end or a receive end that transmits the user stream by using a data stream, and the first indication information is used to create the user stream. The sending unit 2411 is further configured to send, to the session management function network element, at least one of the following information: an identifier of the user stream, a destination MAC address of the user stream, and a stream feature of the user stream.

In an embodiment, the sending unit 2411 is further configured to send first bandwidth information to the session management function network element, where the first bandwidth information is bandwidth information of a user stream of the terminal device or bandwidth information of a user stream transmitted between a user plane function network element and a data network side.

In an embodiment, the sending unit 2411 is further configured to send, to the session management function network element, an identifier of a reliable-latency transmission network of the user stream on the data network side and/or service information of the user stream in a network on the data network side.

Figure 25:
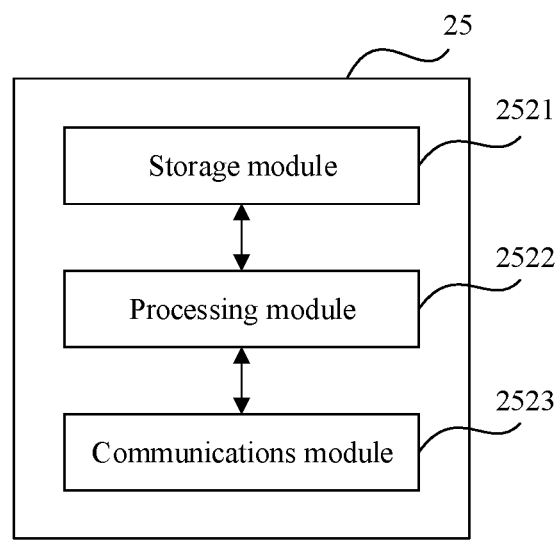
FIG. 25 is a schematic structural diagram 2 of a second communications apparatus according to an embodiment of this application.

FIG. 25 is still another possible schematic structural diagram of the communications apparatus in the foregoing embodiment. A communications apparatus 25 includes a processing module 2522 and a communications module 2523. Optionally, the communications apparatus 25 may further include a storage module 2521. The foregoing modules are configured to support the communications apparatus in performing the related method of the terminal device in any one of FIG. 11A and FIG. 11B to FIG. 21H. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 2522 is configured to control and manage an action of the communications apparatus 25 or perform a corresponding processing function. The communications module 2523 is configured to support the communications apparatus 25 in performing a function of the sending unit 2411. The storage module 2521 is configured to store program code and/or data of the communications apparatus.

The processing module 2522 may be a processor or a controller, such as a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2523 may be a network interface, a communications interface, or the like. The storage module 2521 may be a memory.

In an embodiment, the processing module 2522 may be the processor 308 in FIG. 3, the communications module 2523 may be the RF circuit 300 in FIG. 3, and the storage module 2521 may be the memory 320 in FIG. 3. One or more programs are stored in the memory, the one or more programs include an instruction, and when the instruction is executed by the communications apparatus, the communications apparatus is enabled to perform the related method of the terminal device in any one of FIG. 11A and FIG. 11B to FIG. 21H.

An embodiment of this application further provides a communications apparatus, including a processor and a memory. The memory is configured to store a program, and the processor invokes the program stored in the memory, so that the communications apparatus is enabled to perform the related method of the terminal device in any one of FIG. 11A and FIG. 11B to FIG. 21H.

An embodiment of this application further provides a computer storage medium storing one or more programs. The computer storage medium stores a computer program, and when the computer program is executed by a processor, a communications apparatus is enabled to perform the related method of the terminal device in any one of FIG. 11A and FIG. 11B to FIG. 21H.

An embodiment of this application further provides a computer program product including an instruction. When the computer program product runs on a communications apparatus, the communications apparatus is enabled to perform the related method of the terminal device in any one of FIG. 11A and FIG. 11B to FIG. 21H.

An embodiment of this application provides a chip system. The chip system includes a processor, configured to support a communications apparatus in performing the related method of the terminal device in any one of FIG. 11 to FIG. 21H. For example, a terminal device sends first indication information to a session management function network element, where the first indication information is used to instruct the terminal device to send or receive a user stream and is used to determine whether an access network element is a transmit end or a receive end that transmits the user stream by using a data stream, and the first indication information is used to create the user stream; and the terminal device sends, to the session management function network element, at least one of the following information: an identifier of the user stream, a destination MAC address of the user stream, and a stream feature of the user stream. In a possible design, the chip system further includes a memory, and the memory is configured to store a necessary program instruction and necessary data. The chip system may include a chip and an integrated circuit, or may include a chip and another discrete device. This is not limited in this embodiment of this application.

The communications apparatus, the computer storage medium, the computer program product, or the chip system provided in this application is configured to perform the corresponding method provided above. Therefore, for beneficial effects that can be achieved by the communications apparatus, the computer storage medium, the computer program product, or the chip system, refer to the beneficial effects in the corresponding method provided above. Details are not described herein again.

It may be understood that the communications apparatus may be a terminal device, or may be a component (a chip, a circuit, or the like) that can be used for the terminal device.

An embodiment of this application further provides a communications apparatus, and the communications apparatus may be configured to perform a function of the control device in the foregoing method. In this embodiment of this application, the communications apparatus may be divided into function modules based on the foregoing method example. For example, each function module may be obtained through division based on each corresponding function, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 26:
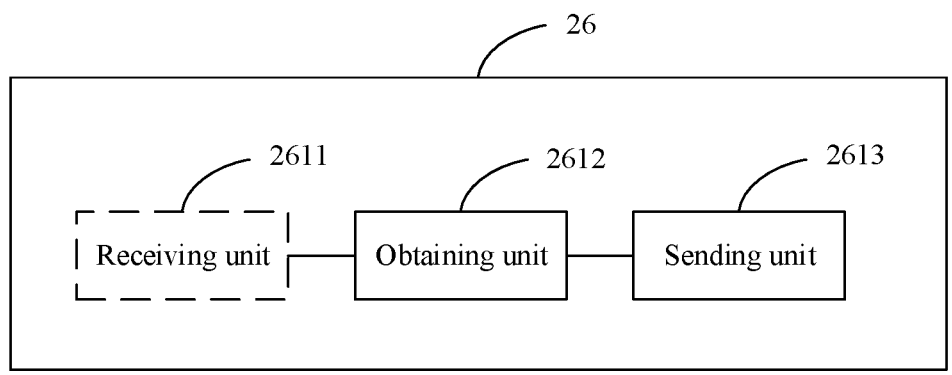
FIG. 26 is a schematic structural diagram 1 of a third communications apparatus according to an embodiment of this application.

When each function module is obtained through division based on each corresponding function, FIG. 26 is a possible schematic structural diagram of the communications apparatus in the foregoing embodiment. A communications apparatus 26 may include a receiving unit 2611, an obtaining unit 2612, and a sending unit 2613. The foregoing units are configured to support the communications apparatus in performing the related method of the control device in any one of FIG. 11A and FIG. 11B to FIG. 18. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again. It should be noted that the foregoing units are optional. For example, the communications apparatus 26 may include the obtaining unit 2612 and the sending unit 2613. Optionally, the communications apparatus 26 may further include the receiving unit 2611.

For example, the receiving unit 2611 is configured to support the communications apparatus 26 in performing the process S1104 in FIG. 11A and FIG. 11B, or the process S1204 in FIG. 12A and FIG. 12B, or the process S1305 in FIG. 13A and FIG. 13B or the process S1502 in FIG. 15A and FIG. 15B, or the process S1601 in FIG. 16, or the process S1905 in FIG. 19A and FIG. 19B, or the process S21011 in FIG. 21B-1 and FIG. 21B-2, or the processes S2112, S21011, and S21051 in FIG. 21C-1 to FIG. 21C-3, or the processes S2143 and S2144 in FIG. 21E, or processes S2143 and S2144 in FIG. 21F. The obtaining unit 2612 is configured to support the communications apparatus 26 in performing the process S2141 in FIG. 21E, or the processes S2146 and S21411 in FIG. 21F. The sending unit 2613 is configured to support the communications apparatus 26 in performing the process S1105 in FIG. 11A and FIG. 11B, or the process S1205 in FIG. 12A and FIG. 12B, or the process S1306 in FIG. 13A and FIG. 13B, or the process S1503 in FIG. 15A and FIG. 15B, or the process S1906 in FIG. 19A and FIG. 19B, or the processes S21012 and S21031 in FIG. 21B-1 and FIG. 21B-2, or the processes S210121, S21031, and S21052 in FIG. 21C-1 to FIG. 21C-3, or the processes S2142 and S2145 in FIG. 21E, or the process S2145 in FIG. 21F. All content related to the operations in the foregoing method embodiments may be cited in function descriptions of corresponding function modules. Details are not described herein again.

In an embodiment, the obtaining unit 2612 is configured to obtain, based on a device identifier of an access network element, a device identifier of a user plane function network element, and first indication information, first information identifying a data stream, where the first indication information is used to indicate that the access network element is a transmit end or a receive end that performs communication by using the data stream, and the first information is used to instruct the transmit end to send the data stream by using the data stream and is further used to instruct the receive end to receive a user stream by using the data stream. The sending unit 2613 is configured to send the first information to a session management function network element.

In an embodiment, the obtaining unit 2612 is further configured to: obtain first bandwidth information, where the first bandwidth information is bandwidth information of a user stream transmitted between the access network element and the user plane function network element; and obtain the first information based on the device identifier of the access network element, the device identifier of the user plane function network element, the first indication information, and the first bandwidth information.

In an embodiment, the communications apparatus further includes the receiving unit 2611, and the receiving unit 2611 is configured to receive the device identifier of the access network element, the device identifier of the user plane function network element, and the first indication information from the session management function network element.

In an embodiment, the communications apparatus further includes the receiving unit 2611. The receiving unit 2611 is configured to receive second indication information from the session management function network element, where the second indication information includes at least one of the following information: the device identifier of the access network element, an identifier of a reliable-latency transmission network between the access network element and the user plane function network element, an identifier of a reliable-latency transmission network of the user stream on a data network side, and service information of the user stream in a network on the data network side. The sending unit 2613 is configured to send, to the session management function network element, the device identifier that is of the user plane function network element and that is corresponding to the second indication information.

Figure 27:
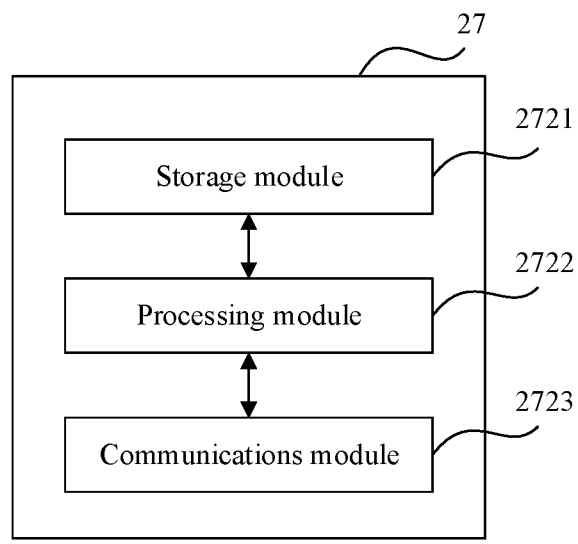
FIG. 27 is a schematic structural diagram 2 of a third communications apparatus according to an embodiment of this application.

FIG. 27 is still another possible schematic structural diagram of the communications apparatus in the foregoing embodiment. A communications apparatus 27 includes a processing module 2722 and a communications module 2723. Optionally, the communications apparatus 27 may further include a storage module 2721. The foregoing modules are configured to support the communications apparatus in performing the related method of the control device in any one of FIG. 11A and FIG. 11B to FIG. 21H. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 2722 is configured to control and manage an action of the communications apparatus 27 or perform a corresponding processing function, for example, perform a function of the obtaining unit 2212. The communications module 2723 is configured to support the communications apparatus 27 in performing functions of the receiving unit 2611 and the sending unit 2613. The storage module 2721 is configured to store program code and/or data of the communications apparatus.

The processing module 2722 may be a processor or a controller, such as a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2723 may be a network interface, a communications interface, or the like. The storage module 2721 may be a memory.

In an embodiment, the processing module 2722 may be the processor 501 in FIG. 5, the communications module 2723 may be the communications interface 504 in FIG. 5, and the storage module 2721 may be the memory 503 in FIG. 5. One or more programs are stored in the memory, the one or more programs include an instruction, and when the instruction is executed by the communications apparatus, the communications apparatus is enabled to perform the related method of the control device in any one of FIG. 11A and FIG. 11B to FIG. 21H.

An embodiment of this application further provides a communications apparatus, including a processor and a memory. The memory is configured to store a program, and the processor invokes the program stored in the memory, so that the communications apparatus is enabled to perform the related method of the control device in any one of FIG. 11A and FIG. 11B to FIG. 21H.

An embodiment of this application further provides a computer storage medium storing one or more programs. The computer storage medium stores a computer program, and when the computer program is executed by a processor, a communications apparatus is enabled to perform the related method of the control device in any one of FIG. 11A and FIG. 11B to FIG. 21H.

An embodiment of this application further provides a computer program product including an instruction. When the computer program product runs on a communications apparatus, the communications apparatus is enabled to perform the related method of the control device in any one of FIG. 11A and FIG. 11B to FIG. 21H.

An embodiment of this application provides a chip system. The chip system includes a processor, configured to support a communications apparatus in performing the related method of the control device in any one of FIG. 11A and FIG. 11B to FIG. 21H. For example, a session management function network element obtains first information identifying a data stream, where the first information is used to instruct a transmit end to send a user stream by using the data stream and is further used to instruct a receive end to receive the user stream by using the data stream; and the receive end is an access network element, and the transmit end is a user plane function network element, or the receive end is the user plane function network element, and the transmit end is the access network element; the session management function network element sends the first information to the user plane function network element and/or the access network element; the session management function network element obtains second information, where the second information is used to indicate a forwarding rule of transmitting the user stream by the user plane function network element on a data network side; and the session management function network element sends the second information to the user plane function network element. In a possible design, the chip system further includes a memory, and the memory is configured to store a necessary program instruction and necessary data. The chip system may include a chip and an integrated circuit, or may include a chip and another discrete device. This is not limited in this embodiment of this application.

The communications apparatus, the computer storage medium, the computer program product, or the chip system provided in this application is configured to perform the corresponding method provided above. Therefore, for beneficial effects that can be achieved by the communications apparatus, the computer storage medium, the computer program product, or the chip system, refer to the beneficial effects in the corresponding method provided above. Details are not described herein again.

It may be understood that the communications apparatus may be a control device, or may be a component (a chip, a circuit, or the like) that can be used for the control device.

An embodiment of this application further provides a communications apparatus, and the communications apparatus may be configured to perform a function of the UPF network element in the foregoing method. In this embodiment of this application, the communications apparatus may be divided into function modules based on the foregoing method example. For example, each function module may be obtained through division based on each corresponding function, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 28:
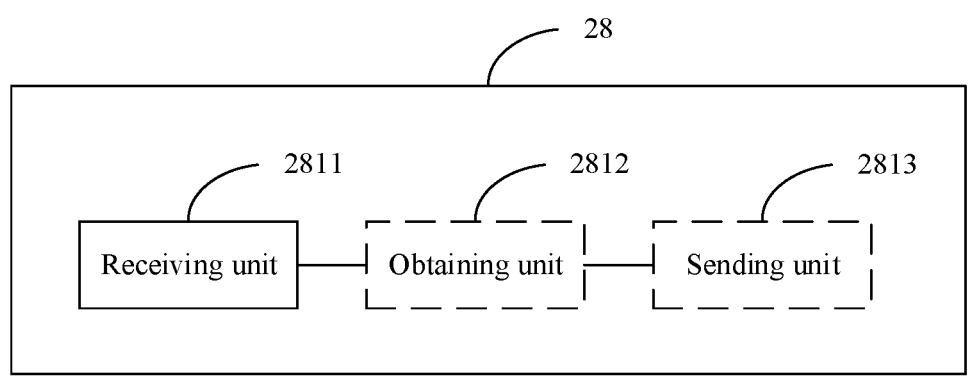
FIG. 28 is a schematic structural diagram 1 of a fourth communications apparatus according to an embodiment of this application.

When each function module is obtained through division based on each corresponding function, FIG. 28 is a possible schematic structural diagram of the communications apparatus in the foregoing embodiment. A communications apparatus 28 may include a receiving unit 2811, an obtaining unit 2812, and a sending unit 2813. The foregoing units are configured to support the communications apparatus in performing the related method of the UPF network element in any one of FIG. 11A and FIG. 11B to FIG. 18. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again. It should be noted that the foregoing units are optional. For example, the communications apparatus 28 may include the receiving unit 2811. Optionally, the communications apparatus 28 may further include the obtaining unit 2812 and the sending unit 2813.

For example, the receiving unit 2811 is configured to support the communications apparatus 28 in performing the processes S1106 and S1110 in FIG. 11A and FIG. 11B, or the processes S1206 and S1210 in FIG. 12A and FIG. 12B, or the processes S1307 and S1311 in FIG. 13A and FIG. 13B, or the process S1407 in FIG. 14A and FIG. 14B, or the processes S1506 and S1510 in FIG. 15A and FIG. 15B, or the processes S1602 and S1605 in FIG. 16, or the processes S1701 and S1704 in FIG. 17, or the process S1803 in FIG. 18, or the processes S1907 and S1911 in FIG. 19A and FIG. 19B, or the processes S2002, S2004, and S2006 in FIG. 20, or the processes S2102, S2104, and S2109 in FIG. 21A, or the processes S2102, S2104, and S2109 in FIG. 21B-1 and FIG. 21B-2, or the processes S2102, S2104, and S2109 in FIG. 21C-1 to FIG. 21C-3, or the process S215 in FIG. 21G. The obtaining unit 2812 is configured to support the communications apparatus 28 in performing the process S2153 in FIG. 21G. The sending unit 2813 is configured to support the communications apparatus 28 in performing the process S1107 in FIG. 11A and FIG. 11B, or the process S1207 in FIG. 12A and FIG. 12B, or the process S1308 in FIG. 13A and FIG. 13B, or the process S1408 in FIG. 14A and FIG. 14B, or the process S1507 in FIG. 15A and FIG. 15B, or the processes S1601, S1603, and S1604 in FIG. 16, or the process S1702 in FIG. 17, or the processes S1908 and S1911 in FIG. 19A and FIG. 19B, or the process S2154 in FIG. 21G. All content related to the operations in the foregoing method embodiments may be cited in function descriptions of corresponding function modules. Details are not described herein again.

In an embodiment, the receiving unit 2811 is configured to receive, from a session management function network element, first information identifying a data stream, where the first information is used to instruct a transmit end to send a user stream by using the data stream and is further used to instruct a receive end to receive the user stream by using the data stream; and the access end is an access network element, and the transmit end is the user plane function network element, or the access end is the user plane function network element, and the transmit end is the access network element; and receive second information from the session management function network element, where the second information is used to indicate a forwarding rule of transmitting the user stream by the user plane function network element on a data network side.

In an embodiment, the second information includes an identifier of a reliable-latency transmission network of the user stream on the data network side, or an identifier of a port for transmitting the user stream by the user plane function network element on the data network side, where the identifier of the reliable-latency transmission network of the user stream on the data network side is associated with the identifier of the port of the user plane function network element on the data network side.

In an embodiment, the communications apparatus further includes the obtaining unit 2812. When the second information includes the identifier of the reliable-latency transmission network of the user stream on the data network side, the obtaining unit 2812 is configured to obtain, based on the identifier of the reliable-latency transmission network of the user stream on the data network side, the identifier of the port for transmitting the user stream by the user plane function network element on the data network side.

In an embodiment, the communications apparatus further includes the sending unit 2813, configured to send, to the session management function network element, the identifier of the port for transmitting the user stream by the user plane function network element on the data network side.

Figure 29:
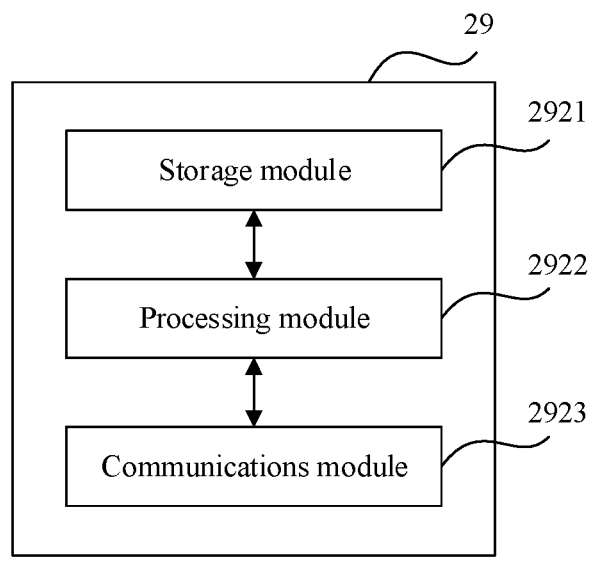
FIG. 29 is a schematic structural diagram 2 of a fourth communications apparatus according to an embodiment of this application.

FIG. 29 is still another possible schematic structural diagram of the communications apparatus in the foregoing embodiment. A communications apparatus 29 includes a processing module 2922 and a communications module 2923. Optionally, the communications apparatus 29 may further include a storage module 2921. The foregoing modules are configured to support the communications apparatus in performing the related method of the UPF network element in any one of FIG. 11A and FIG. 11B to FIG. 21H. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 2922 is configured to control and manage an action of the communications apparatus 29 or perform a corresponding processing function, for example, perform a function of the obtaining unit 2812. The communications module 2923 is configured to support the communications apparatus 29 in performing functions of the receiving unit 2811 and the sending unit 2813. The storage module 2921 is configured to store program code and/or data of the communications apparatus.

The processing module 2922 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2923 may be a network interface, a communications interface, or the like. The storage module 2921 may be a memory.

In an embodiment, the processing module 2922 may be the processor 501 in FIG. 5, the communications module 2923 may be the communications interface 504 in FIG. 5, and the storage module 2921 may be the memory 503 in FIG. 5. One or more programs are stored in the memory, the one or more programs include an instruction, and when the instruction is executed by the communications apparatus, the communications apparatus is enabled to perform the related method of the UPF network element in any one of FIG. 11A and FIG. 11B to FIG. 21H.

An embodiment of this application further provides a communications apparatus, including a processor and a memory. The memory is configured to store a program, and the processor invokes the program stored in the memory, so that the communications apparatus is enabled to perform the related method of the UPF network element in any one of FIG. 11A and FIG. 11B to FIG. 21H.

An embodiment of this application further provides a computer storage medium storing one or more programs. The computer storage medium stores a computer program, and when the computer program is executed by a processor, a communications apparatus is enabled to perform the related method of the UPF network element in any one of FIG. 11A and FIG. 11B to FIG. 21H.

An embodiment of this application further provides a computer program product including an instruction. When the computer program product runs on a communications apparatus, the communications apparatus is enabled to perform the related method of the UPF network element in any one of FIG. 11A and FIG. 11B to FIG. 21H.

An embodiment of this application provides a chip system. The chip system includes a processor, configured to support a communications apparatus in performing the related method of the UPF network element in any one of FIG. 11A and FIG. 11B to FIG. 21H. For example, a user plane function network element receives, from a session management function network element, first information identifying a data stream, where the first information is used to instruct a transmit end to send a user stream by using the data stream and is further used to instruct a receive end to receive the user stream by using the data stream; and the access end is an access network element, and the transmit end is the user plane function network element, or the access end is the user plane function network element, and the transmit end is the access network element; and the user plane function network element receives second information from the session management function network element, where the second information is used to indicate a forwarding rule of transmitting the user stream by the user plane function network element on a data network side. In a possible design, the chip system further includes a memory, and the memory is configured to store a necessary program instruction and necessary data. The chip system may include a chip and an integrated circuit, or may include a chip and another discrete device. This is not limited in this embodiment of this application.

The communications apparatus, the computer storage medium, the computer program product, or the chip system provided in this application is configured to perform the corresponding method provided above. Therefore, for beneficial effects that can be achieved by the communications apparatus, the computer storage medium, the computer program product, or the chip system, refer to the beneficial effects in the corresponding method provided above. Details are not described herein again.

It may be understood that the communications apparatus may be a UPF network element, or may be a component (a chip, a circuit, or the like) that can be used for the UPF network element.

An embodiment of this application further provides a communications apparatus, and the communications apparatus may be configured to perform a function of the NRF network element in the foregoing method. In this embodiment of this application, the communications apparatus may be divided into function modules based on the foregoing method example. For example, each function module may be obtained through division based on each corresponding function, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 30:
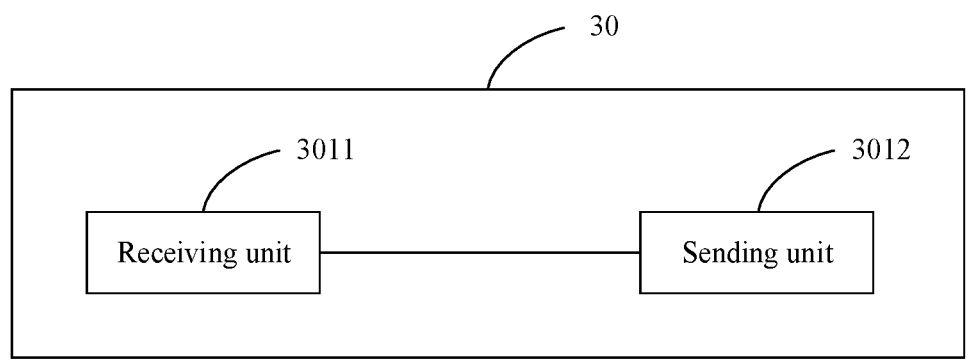
FIG. 30 is a schematic structural diagram 1 of a fifth communications apparatus according to an embodiment of this application.

When each function module is obtained through division based on each corresponding function, FIG. 30 is a possible schematic structural diagram of the communications apparatus in the foregoing embodiment. A communications apparatus 30 may include a receiving unit 3011 and a sending unit 3012. The foregoing units are configured to support the communications apparatus in performing the related method of the NRF network element in any one of FIG. 11A and FIG. 11B to FIG. 18. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

For example, the receiving unit 3011 is configured to support the communications apparatus 30 in performing the process S1102 in FIG. 11A and FIG. 11B, or the process S1202 in FIG. 12A and FIG. 12B, or the process S1302 in FIG. 13A and FIG. 13B, or the processes S1402 and S1405 in FIG. 14A and FIG. 14B, or the process S1504 in FIG. 15A and FIG. 15B, or the process S1601 in FIG. 16, or the process S21051 in FIG. 21C-1 to FIG. 21C-3, or the process S2161 in FIG. 21H. The sending unit 3012 is configured to support the communications apparatus 30 in performing the process S1103 in FIG. 11A and FIG. 11B, or the process S1203 in FIG. 12A and FIG. 12B, or the process S1303 in FIG. 13A and FIG. 13B, or the processes S1403 and S1406 in FIG. 14A and FIG. 14B, or the process S1505 in FIG. 15A and FIG. 15B, or the process S21031 in FIG. 21B-1 and FIG. 21B-2, or the processes S21031 and S21052 in FIG. 21C-1 to FIG. 21C-3, or the processes S2162 and S2163 in FIG. 21H. All content related to the operations in the foregoing method embodiments may be cited in function descriptions of corresponding function modules. Details are not described herein again.

In an embodiment, the receiving unit 3011 is configured to receive first indication information from a session management function network element, where the first indication information includes at least one of the following information: a device identifier of an access network element, an identifier of a reliable-latency transmission network between the access network element and a user plane function network element, an identifier of a reliable-latency transmission network of a user stream on a data network side, and service information of the user stream in a network on the data network side; and the access network element is a receive end that transmits the user stream by using a data stream, and the user plane function network element is a transmit end that transmits the user stream by using the data stream, or the access network element is the transmit end that transmits the user stream by using the data stream, and the user plane function network element is the receive end that transmits the user stream by using the data stream. The sending unit 3012 is configured to send, to the session management function network element, a device identifier that is of the user plane function network element and that is corresponding to the first indication information.

In an embodiment, the sending unit 3013 is further configured to send first information to the session management network element, where the first information is used to indicate a port for transmitting the user stream by the user plane function network element on the data network side.

Figure 31:
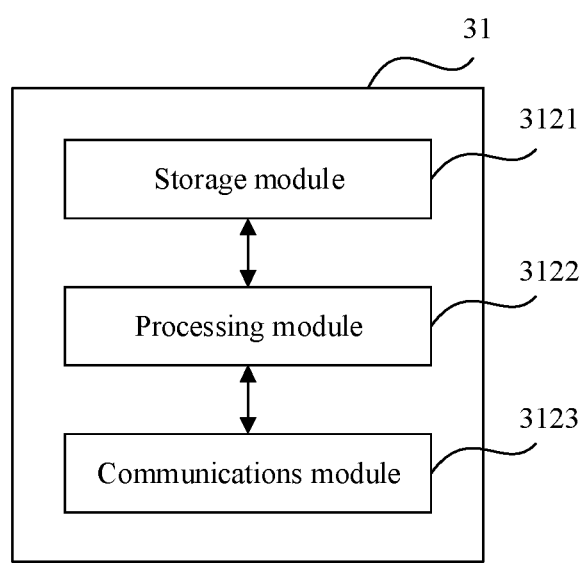
FIG. 31 is a schematic structural diagram 2 of a fifth communications apparatus according to an embodiment of this application.

FIG. 31 is still another possible schematic structural diagram of the communications apparatus in the foregoing embodiment. A communications apparatus 31 includes a processing module 3122 and a communications module 3123. Optionally, the communications apparatus 31 may further include a storage module 3121. The foregoing modules are configured to support the communications apparatus in performing the related method of the NRF network element in any one of FIG. 11A and FIG. 11B to FIG. 21H. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 3122 is configured to control and manage an action of the communications apparatus 31 or perform a corresponding processing function. The communications module 3123 is configured to support the communications apparatus 31 in performing functions of the receiving unit 3011 and the sending unit 3012. The storage module 3121 is configured to store program code and/or data of the communications apparatus.

The processing module 3122 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 3123 may be a network interface, a communications interface, or the like. The storage module 3121 may be a memory.

In an embodiment, the processing module 3122 may be the processor 501 in FIG. 5, the communications module 3123 may be the communications interface 504 in FIG. 5, and the storage module 3121 may be the memory 503 in FIG. 5. One or more programs are stored in the memory, the one or more programs include an instruction, and when the instruction is executed by the communications apparatus, the communications apparatus is enabled to perform the related method of the NRF network element in any one of FIG. 11A and FIG. 11B to FIG. 21H.

An embodiment of this application further provides a communications apparatus, including a processor and a memory. The memory is configured to store a program, and the processor invokes the program stored in the memory, so that the communications apparatus is enabled to perform the related method of the NRF network element in any one of FIG. 11A and FIG. 11B to FIG. 21H.

An embodiment of this application further provides a computer storage medium storing one or more programs. The computer storage medium stores a computer program, and when the computer program is executed by a processor, a communications apparatus is enabled to perform the related method of the NRF network element in any one of FIG. 11A and FIG. 11B to FIG. 21H.

An embodiment of this application further provides a computer program product including an instruction. When the computer program product runs on a communications apparatus, the communications apparatus is enabled to perform the related method of the NRF network element in any one of FIG. 11A and FIG. 11B to FIG. 21H.

An embodiment of this application provides a chip system. The chip system includes a processor, configured to support a communications apparatus in performing the related method of the NRF network element in any one of FIG. 11A and FIG. 11B to FIG. 21H. For example, a network function repository function network element receives first indication information from a session management function network element, where the first indication information includes at least one of the following information: a device identifier of an access network element, an identifier of a reliable-latency transmission network between the access network element and a user plane function network element, an identifier of a reliable-latency transmission network of a user stream on a data network side, and service information of the user stream in a network on the data network side; and the access network element is a receive end that transmits the user stream by using a data stream, and the user plane function network element is a transmit end that transmits the user stream by using the data stream, or the access network element is the transmit end that transmits the user stream by using the data stream, and the user plane function network element is the receive end that transmits the user stream by using the data stream; and the network function repository function network element sends, to the session management function network element, a device identifier that is of the user plane function network element and that is corresponding to the first indication information. In a possible design, the chip system further includes a memory, and the memory is configured to store a necessary program instruction and necessary data. The chip system may include a chip and an integrated circuit, or may include a chip and another discrete device. This is not limited in this embodiment of this application.

The communications apparatus, the computer storage medium, the computer program product, or the chip system provided in this application is configured to perform the corresponding method provided above. Therefore, for beneficial effects that can be achieved by the communications apparatus, the computer storage medium, the computer program product, or the chip system, refer to the beneficial effects in the corresponding method provided above. Details are not described herein again.

It may be understood that the communications apparatus may be an NRF network element, or may be a component (a chip, a circuit, or the like) that can be used for the NRF network element.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   obtaining, by a session management function network element, first information identifying a data stream, wherein the first information is used to instruct a transmit end to send a user stream using the data stream and to instruct a receive end to receive the user stream using the data stream; and the receive end is an access network element, and the transmit end is a user plane function network element, or the receive end is the user plane function network element, and the transmit end is the access network element;
   sending, by the session management function network element, the first information to the user plane function network element and/or the access network element;
   obtaining, by the session management function network element, second information used to indicate a forwarding rule of transmitting the user stream by the user plane function network element on a data network side;
   sending, by the session management function network element, the second information to the user plane function network element, and
   sending, by the session management function network element, a first indication information to a control device, wherein the first indication information is used to indicate that the access network element is the transmit end or the receive end.

2. The communication method according to claim 1, wherein obtaining first information identifying a data stream comprises:
   sending, by the session management function network element, a device identifier of the access network element and a device identifier of the user plane function network element; and
   receiving, by the session management function network element, from the control device, the first information corresponding to the device identifier of the access network element, the device identifier of the user plane function network element, and the first indication information.

3. The communication method according to claim 2, further comprising:
   sending, by the session management function network element, first bandwidth information to the control device, wherein the first bandwidth information is bandwidth information of a user stream transmitted between the access network element and the user plane function network element; and wherein receiving from the control device the first information comprises:

receiving, by the session management function network element, from the control device, the first information corresponding to the device identifier of the access network element, the device identifier of the user plane function network element, the first indication information, and the first bandwidth information.

4. The communication method according to claim 3, further comprising:

receiving, by the session management function network element, second bandwidth information from a terminal device, wherein the second bandwidth information is bandwidth information of a user stream of the terminal device; and obtaining, by the session management function network element, the first bandwidth information based on the second bandwidth information.

5. The communication method according to claim 2, further comprising:

obtaining, by the session management function network element, the first indication information based on second indication information, wherein the second indication information is used to instruct a terminal device to send or receive the user stream.

6. The communication method according to claim 5, further comprising:

receiving, by the session management function network element, the second indication information from the terminal device.

7. The communication method according to claim 1, wherein obtaining first information identifying a data stream comprises:

receiving, by the session management function network element, the first information from a control device.

8. The communication method according to claim 1, further comprising:

obtaining, by the session management function network element, a device identifier of the user plane function network element based on third indication information, wherein the third indication information comprises at least one of the following information: the device identifier of the access network element, an identifier of a reliable-latency transmission network between the access network element and the user plane function network element, an identifier of a reliable-latency transmission network of the user stream on the data network side, or service information of the user stream in a network on the data network side.

9. The communication method according to claim 8, wherein obtaining the device identifier of the user plane function network element based on third indication information comprises:

sending, by the session management function network element, the third indication information to a first network element; and receiving, by the session management function network element, from the first network element, the device identifier that is of the user plane function network element and corresponding to the third indication information; and the first network element is a network function repository function network element or the control device.

10. The communication method according to claim 8, further comprising:

receiving, by the session management function network element, the third indication information from the access network element or an access and mobility management network element.

11. The communication method according to claim 1, wherein obtaining second information comprises:

receiving, by the session management function network element, the second information from at least one of a network function repository function network element, the control device, an application function network element on the data network side, or a centralized user configuration network element on the data network side.

12. The communication method according to claim 1, wherein obtaining second information comprises:

obtaining, by the session management function network element, the second information based on information identifying the user stream or service information of the user stream in a network on the data network side.

13. The communication method according to claim 1, wherein the second information comprises:

an identifier of a reliable-latency transmission network of the user stream on the data network side, or an identifier of a port for transmitting the user stream by the user plane function network element on the data network side, and wherein the identifier of the reliable-latency transmission network of the user stream on the data network side is associated with the identifier of the port for transmitting the user stream by the user plane function network element on the data network side.

14. The communication method according to claim 1, further comprising:

receiving, by the session management function network element, third bandwidth information from a terminal device, wherein the third bandwidth information is bandwidth information of a user stream transmitted between the user plane function network element and the data network side.

15. The communication method according to claim 1, further comprising:

receiving, by the session management function network element, third information from a terminal device or a server on the data network side, wherein the third information comprises at least one of the following information: an identifier of the user stream, a destination media access control MAC address of the user stream, or a stream feature of the user stream; and sending, by the session management function network element, the third information to the user plane function network element, or an application function network element on the data network side, or a centralized user configuration network element on the data network side.

16. A communication method, comprising:

sending, by a terminal device, first indication information to a session management function network element, wherein the first indication information is used to instruct the terminal device to send or receive a user stream and is used to determine whether an access network element is a transmit end or a receive end that transmits the user stream by using a data stream, and the first indication information is used to create the user stream;

sending, by the terminal device, at least one of the following information to the session management function network element: an identifier of the user stream, a destination media access control (MAC) address of the user stream, or a stream feature of the user stream; and sending, by the terminal device, first bandwidth information to the session management function network element, wherein the first bandwidth information is bandwidth information of a user stream of the terminal device or bandwidth information of a user stream transmitted between a user plane function network element and a data network side.

17. The communication method according to claim 16, further comprising:

sending, by the terminal device, an identifier of a reliable-latency transmission network of the user stream on the data network side and/or service information of the user stream in a network on the data network side to the session management function network element.

18. A communication method, comprising:

obtaining, by a control device, based on a device identifier of an access network element, a device identifier of a user plane function network element, first indication information, and first information identifying a data stream, wherein the first indication information is used to indicate that the access network element is a transmit end or a receive end that performs communication by using the data stream, and the first information is used to instruct the transmit end to send the data stream using the data stream and to instruct the receive end to receive a user stream by using the data stream; and sending, by the control device, the first information to a session management function network element.

19. The communication method according to claim 18, further comprising:

obtaining, by the control device, first bandwidth information, wherein the first bandwidth information is bandwidth information of a user stream transmitted between the access network element and the user plane function network element; and wherein obtaining a device identifier of a user plane function network element, first indication information, and first information identifying a data stream comprises:

obtaining, by the control device, the first information based on the device identifier of the access network element, the device identifier of the user plane function network element, the first indication information, and the first bandwidth information.

\* \* \* \* \*